(12) United States Patent  (10) Patent No.: US 8,223,130 B2
Takashima et al.  (45) Date of Patent: Jul. 17, 2012

(54) TOUCH-SENSITIVE SHEET MEMBER, INPUT DEVICE AND ELECTRONIC APPARATUS

(75) Inventors: Kouichiro Takashima, Tokyo (JP); Shun Kayama, Saitama (JP); Yukiko Shimizu, Saitama (JP); Takashi Sawada, Kanagawa (JP)

(73) Assignee: Sony Corporation, Tokyo (JP)

( * ) Notice: Subject to any disclaimer, the term of this patent is extended or adjusted under 35 U.S.C. 154(b) by 727 days.

(21) Appl. No.: 12/269,498

(22) Filed: Nov. 12, 2008

(65) Prior Publication Data

US 2009/0135150 A1 May 28, 2009

(30) Foreign Application Priority Data

Nov. 28, 2007 (JP) .................................. 2007-308089
Jun. 12, 2008 (JP) .................................. 2008-154552

(51) Int. Cl.
*G06F 3/41* (2006.01)
(52) U.S. Cl. ........................................ 345/173; 345/178
(58) Field of Classification Search .......... 345/173–184, 345/156, 157; 178/18.01–18.11, 19.01–19.07; 359/601; 200/243, 16 C; 399/329; 463/37, 463/38; 708/143
See application file for complete search history.

(56) References Cited

U.S. PATENT DOCUMENTS

| | | | | |
|---|---|---|---|---|
| 3,699,294 A * | 10/1972 | Sudduth | ......................... | 200/243 |
| 4,545,023 A * | 10/1985 | Mizzi | ............................. | 708/143 |
| 6,262,717 B1 * | 7/2001 | Donohue et al. | .............. | 345/173 |
| 6,654,006 B2 * | 11/2003 | Kawashima et al. | ......... | 345/173 |
| 6,819,316 B2 * | 11/2004 | Schulz et al. | ................. | 345/174 |
| 7,390,099 B2 * | 6/2008 | Takao et al. | ................... | 359/601 |
| 7,963,660 B2 * | 6/2011 | Hamamoto et al. | .......... | 359/601 |
| 2002/0118982 A1 * | 8/2002 | Fuma | ............................ | 399/329 |
| 2002/0149572 A1 * | 10/2002 | Schulz et al. | ................. | 345/174 |
| 2003/0067449 A1 * | 4/2003 | Yoshikawa et al. | ........... | 345/173 |
| 2003/0071784 A1 * | 4/2003 | Sato et al. | ...................... | 345/156 |
| 2006/0131156 A1 * | 6/2006 | Voelckers | ..................... | 200/512 |
| 2006/0132922 A1 * | 6/2006 | Takao et al. | ................... | 359/601 |
| 2007/0063969 A1 * | 3/2007 | Wright | .......................... | 345/156 |
| 2007/0080951 A1 | 4/2007 | Maruyama et al. | | |
| 2007/0097073 A1 * | 5/2007 | Takashima et al. | ........... | 345/156 |
| 2008/0018596 A1 * | 1/2008 | Harley et al. | .................. | 345/157 |
| 2008/0186736 A1 * | 8/2008 | Rinko | ............................. | 362/615 |
| 2009/0277695 A1 * | 11/2009 | Liu et al. | ..................... | 178/18.03 |

FOREIGN PATENT DOCUMENTS

| | | |
|---|---|---|
| JP | 02-230310 | 9/1990 |
| JP | 2004-070505 | 3/2004 |
| JP | 2004-094389 | 3/2004 |
| JP | 2005-063227 | 3/2005 |

* cited by examiner

*Primary Examiner* — Prabodh M Dharia
(74) *Attorney, Agent, or Firm* — K&L Gates LLP

(57) ABSTRACT

A touch-sensitive sheet member contains a first raw material member having predetermined hardness and a second raw material member that presents sense of touch. The second raw material member is disposed in the first raw material member. The second raw material member has hardness different from the hardness of the first raw material member.

33 Claims, 48 Drawing Sheets

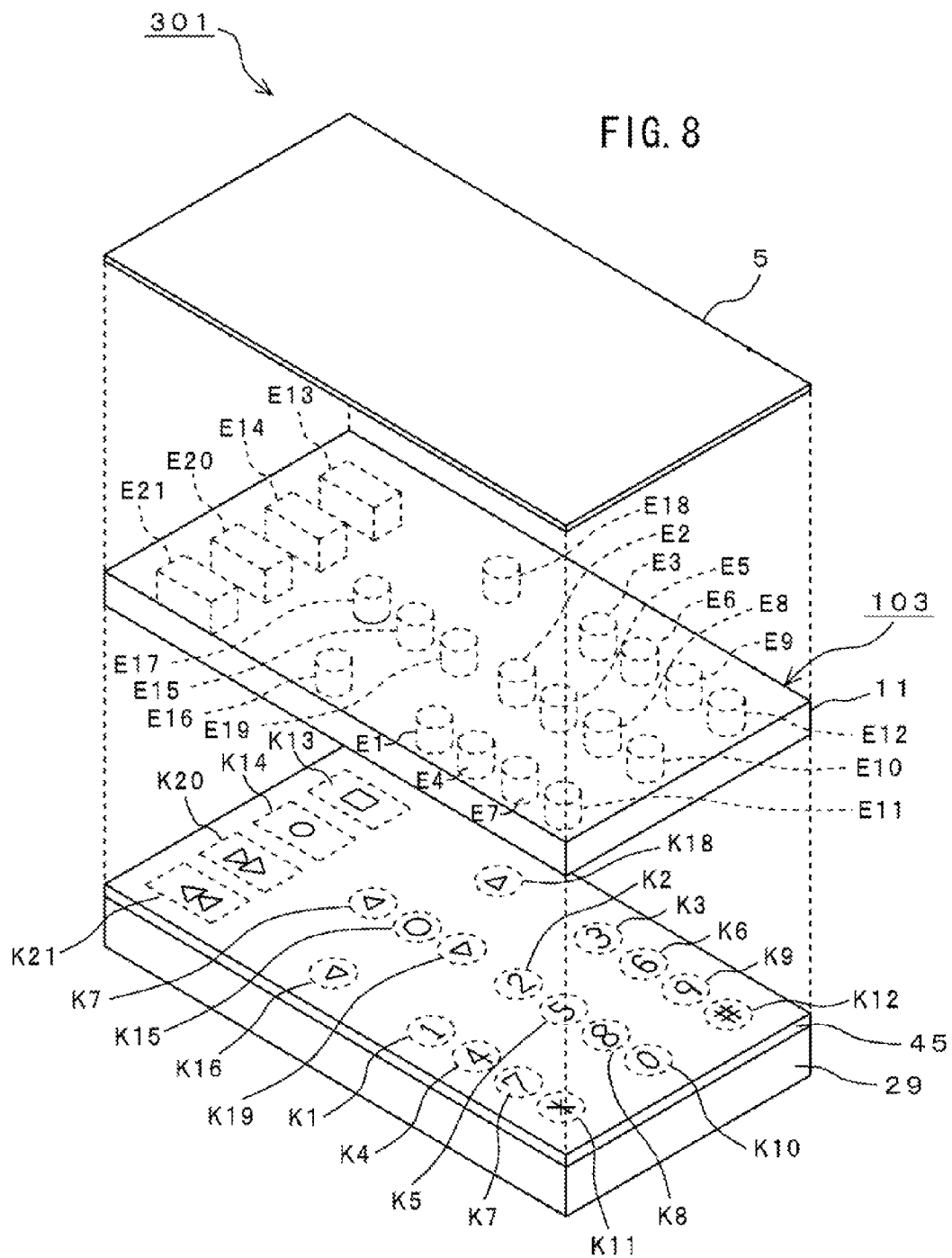

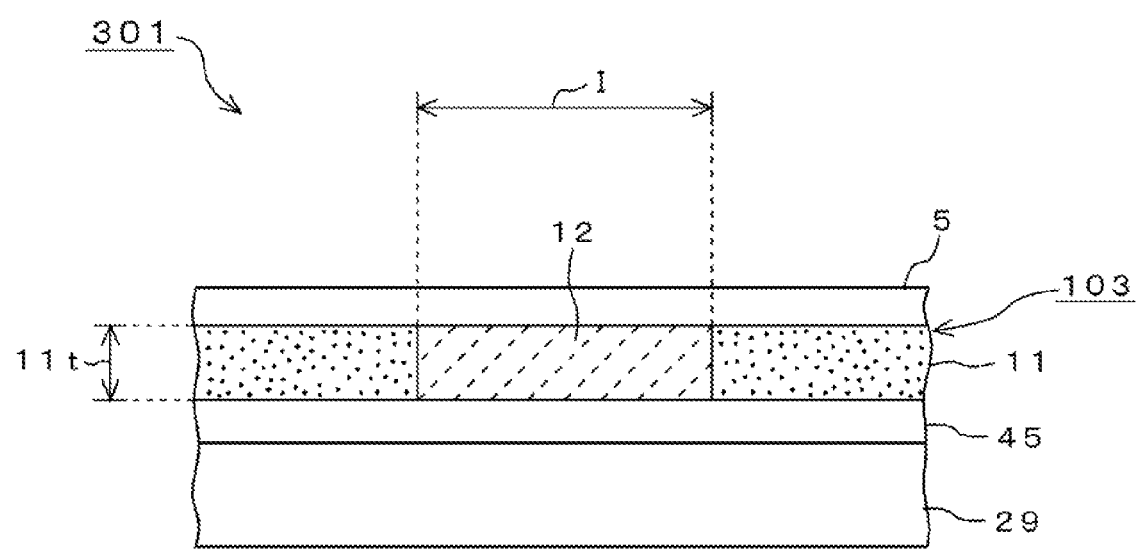

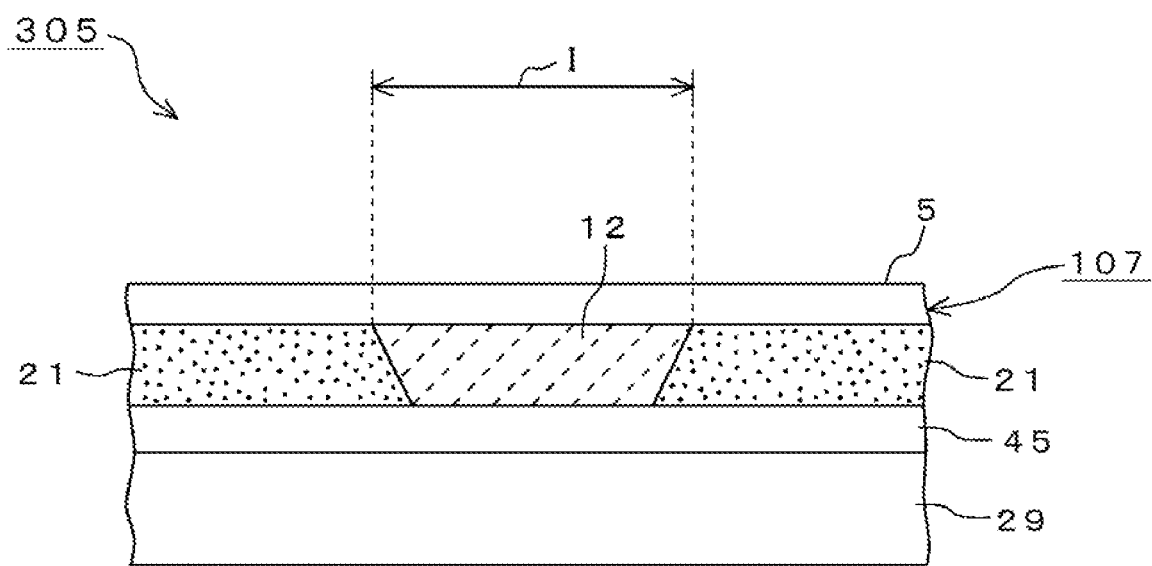

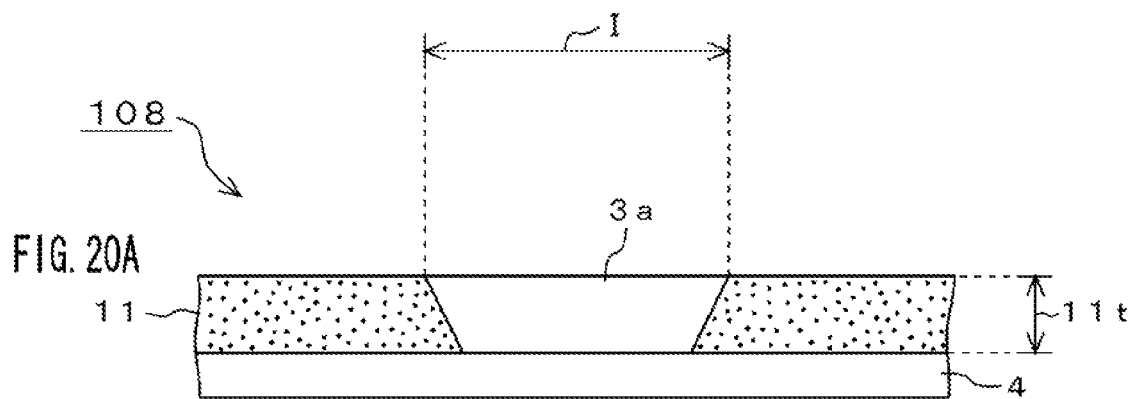
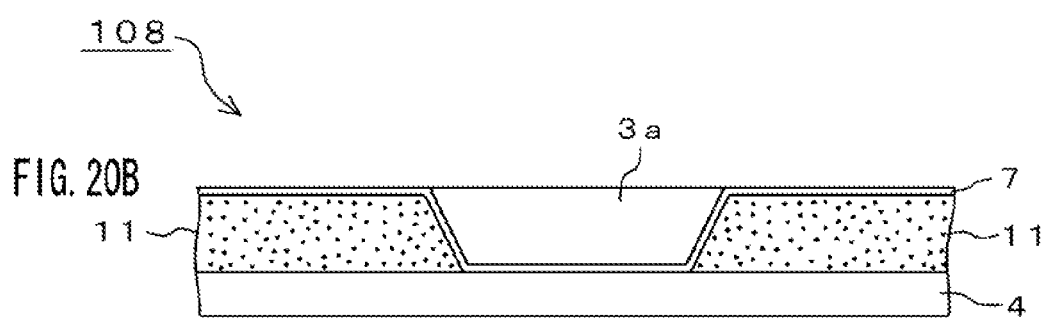
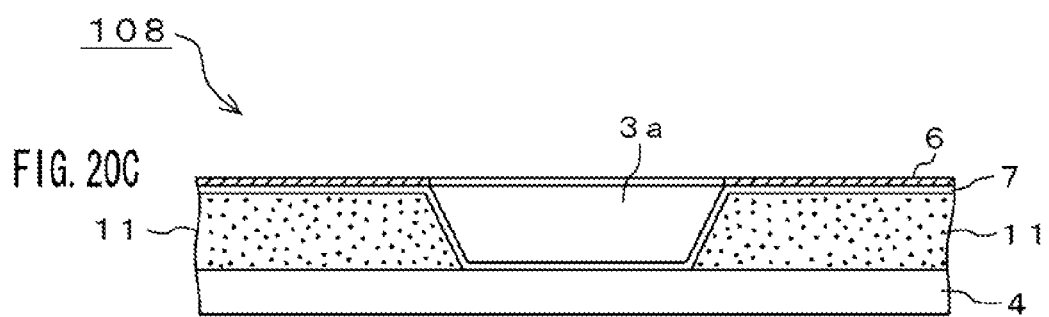
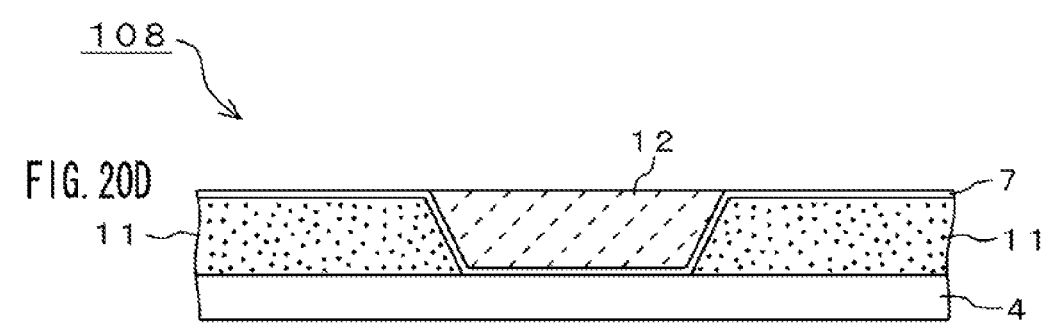

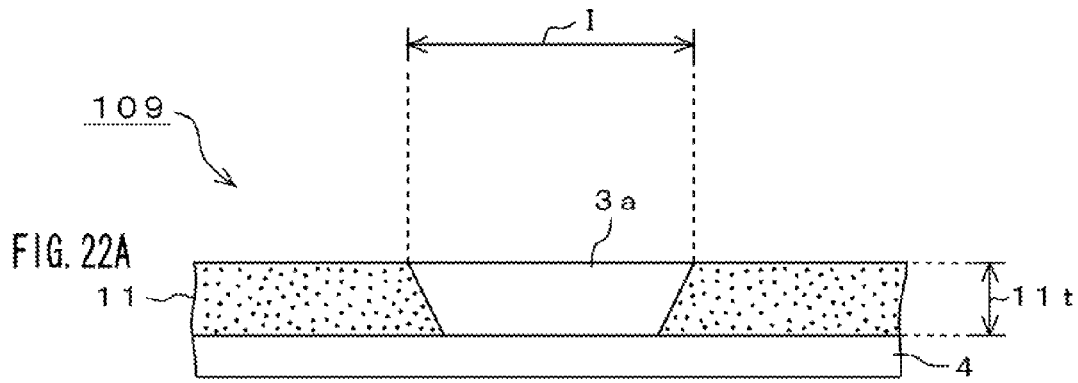
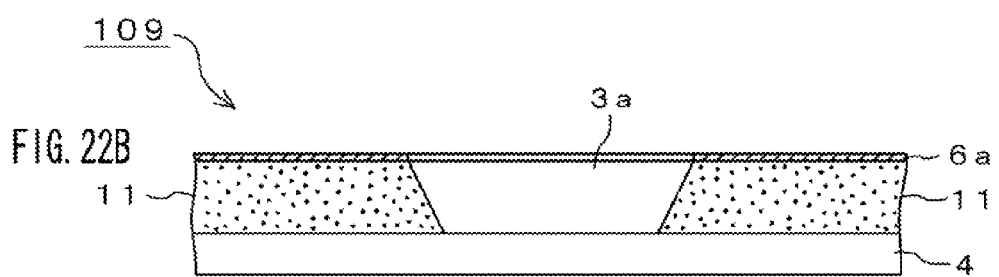
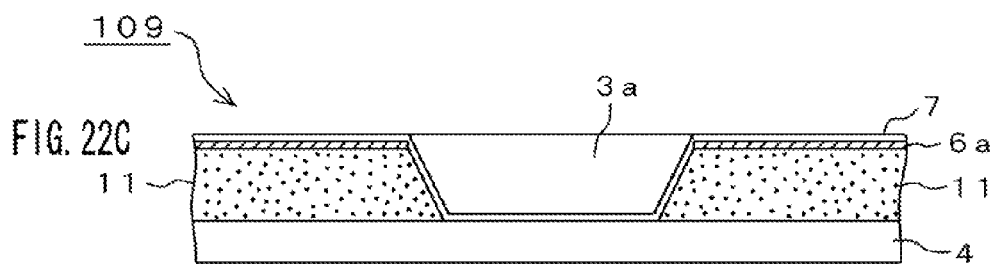
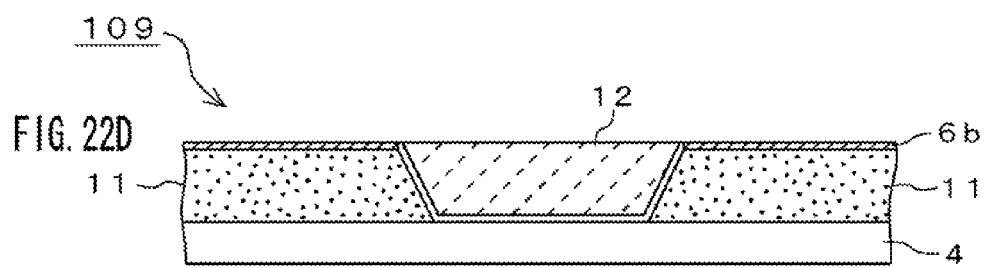

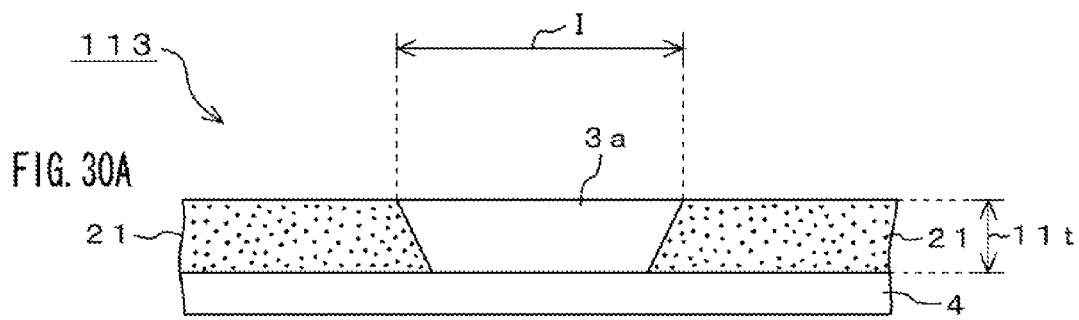
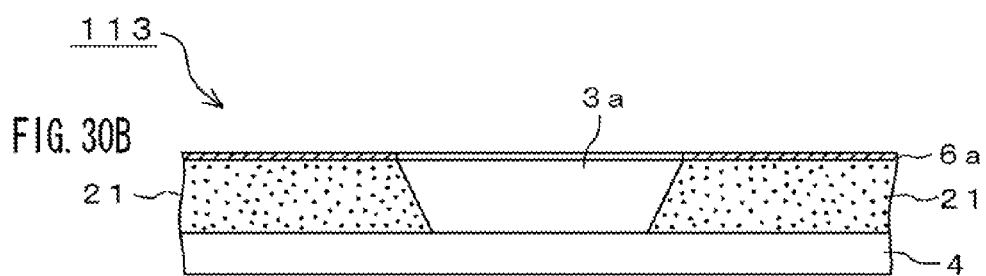
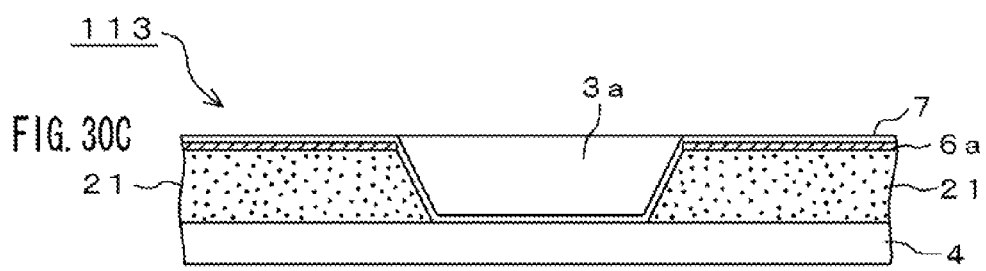
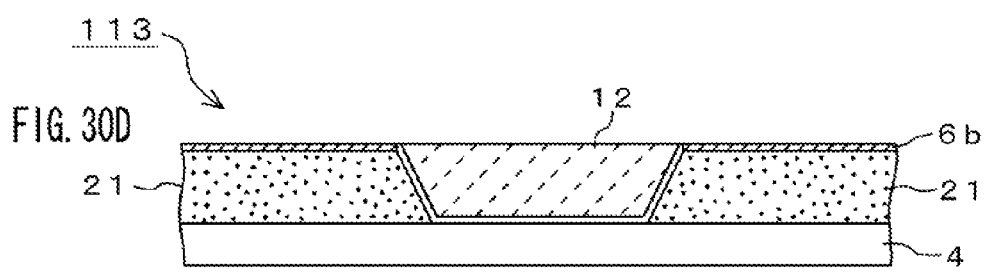

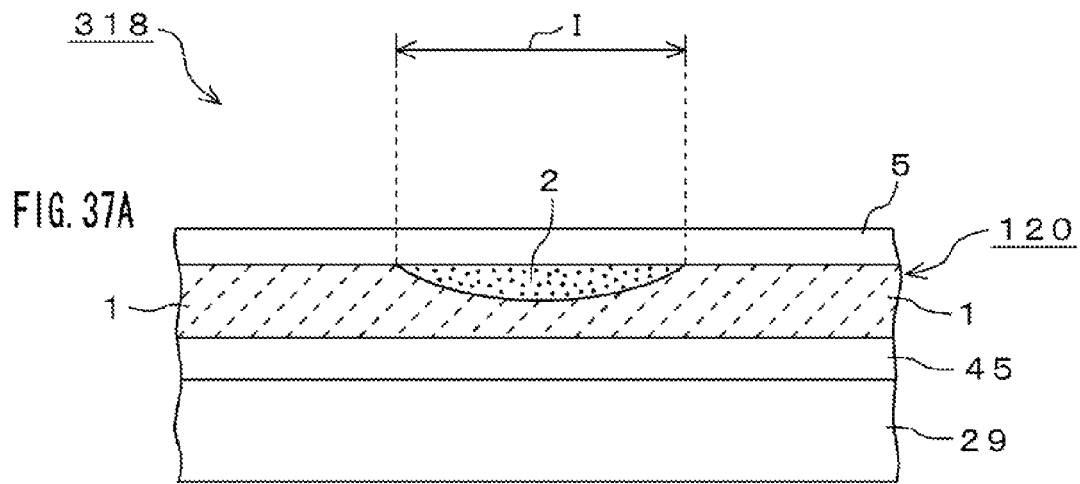
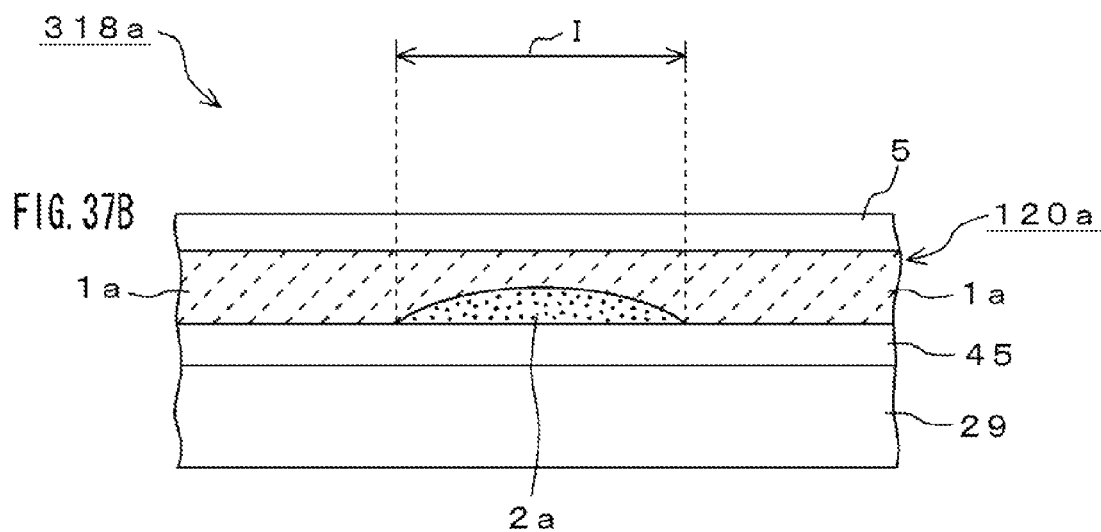

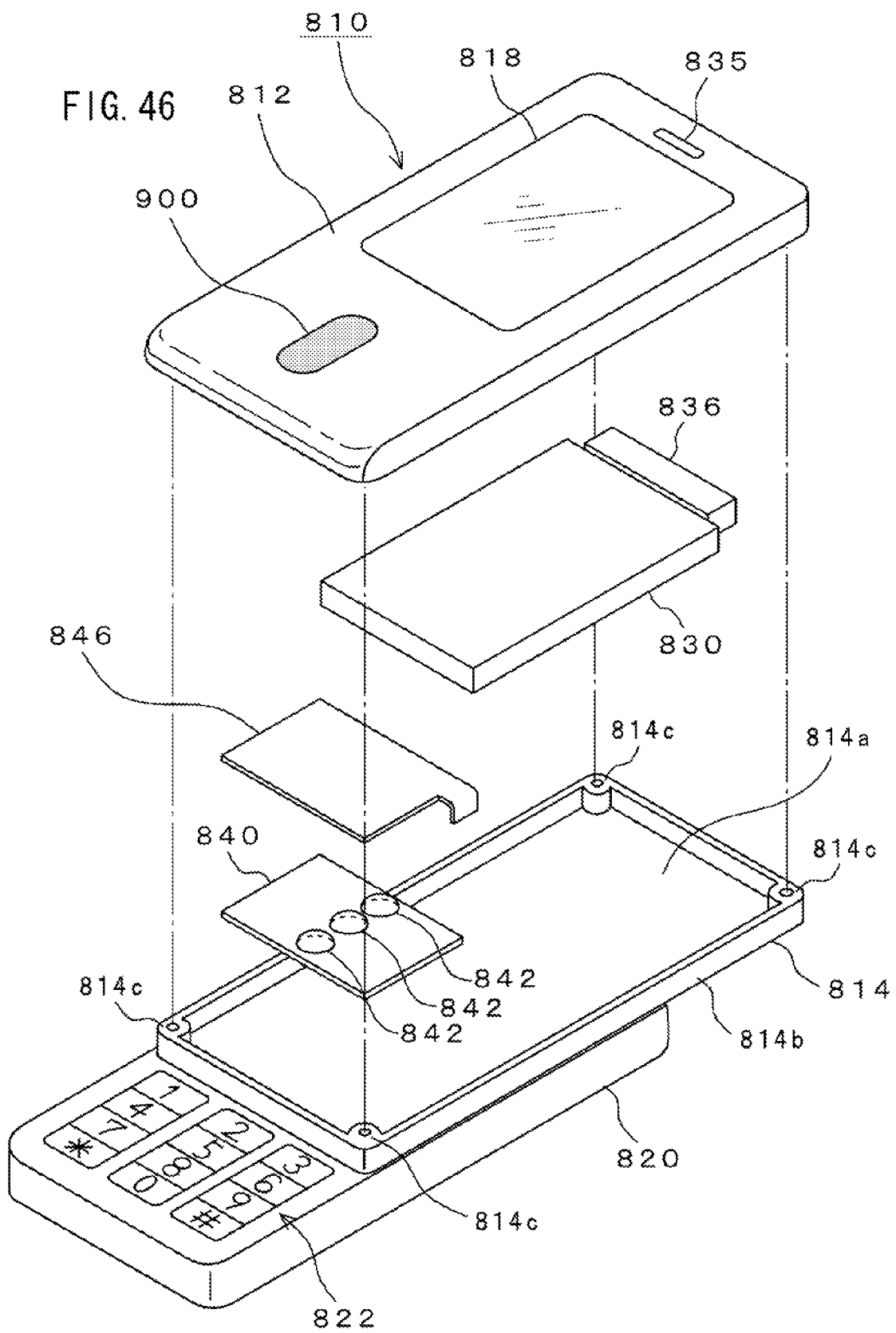

TOUCH-SENSITIVE SHEET MEMBER, INPUT DEVICE AND ELECTRONIC APPARATUS

CROSS REFERENCES TO RELATED APPLICATIONS

The present application claims priority to Japanese Patent Applications JP 2007-308089 and JP 2008-154552 filed in the Japanese Patent Office on Nov. 28, 2007, and Jun. 12, 2008, the entire contents of which are being incorporated herein by reference.

BACKGROUND

The present application relates to a touch-sensitive sheet member, an input device using the same, and an electronic apparatus using the input device. More particularly, it relates to the touch-sensitive sheet member and the input device that are applicable to the electronic apparatus such as a digital camera, a video camera, a mobile phone, a mobile terminal device, a desk-top type personal computer (hereinafter, referred to as "PC"), a note type PC, an automated teller machine, which are provided with a touch-sensitive input function and presents sense of touch when touching an icon screen.

In resent years, a user (operator) has imaged a subject by using a digital camera equipped with various kinds of operation modes and has taken various contents in a mobile terminal device such as a mobile phone, a PDA (Personal Digital Assistants) and the like so as to utilize them. The digital camera, the mobile terminal device and the like are provided with input devices. A key board, an input unit such as a JOG dial, a touch panel combining a display unit and the like are used for the input device.

Japanese Patent Application Publication No. Heisei 02-230310 has disclosed a menu selection device in connection with a function of the above-mentioned input device (see page 2 and FIG. 1 thereof). This menu selection device contains an item selection unit and an item input unit. The item input unit is provided on the item selection unit. The selection and the input of an item are allotted to the same key and the item display and the item selection input key are juxtaposed.

Also, Japanese patent Application Publication No. 2005-063227 has disclosed an input device (see page 8 and FIG. 15 thereof). This input device is provided a window opening at a predetermined position of a casing. A user performs slide-operating on an operation button exposed from this window opening to execute an item selection, and performs press-operating on an operation knob to zoom and display a predetermined region in a specified item selection screen.

Here, Japanese Patent Application Publication No. 2004-070505 has disclosed an input device accompanied by vibrations (see page 5 and FIG. 3 thereof), which is mountable on an electronic apparatus such as an air conditioner or an audio instrument. This input device includes an operation unit possessing functions of a rotary switch, of a push switch, and of a slide switch concurrently, and the selection of the operation item and input determination operation are executed by rotating, sliding or depressing the operation unit. The vibrations are accompanied on an occasion of the input determination operation.

In addition, also an input device combined with an actuator has been developed. An actuator is a device in which two layers or more of piezoelectric elements having different amounts of strain or a piezoelectric element and a non-piezoelectric element are bonded together and when applying a vibration control voltage to the piezoelectric elements of this bonded body, bending deformation of the bonded body, which occurs caused by the difference of the amounts of strain in the piezoelectric elements, is mechanically utilized (vibration-body function).

Japanese Patent Application Publication No. 2004-094389 has disclosed an electronic apparatus including this kind of piezoelectric actuator and an input and output device (see page 9 and FIG. 4 thereof). This electronic apparatus is provided with an input and output device including a piezoelectric actuator of a multi-layer piezoelectric bimorph type and a touch panel. The piezoelectric actuator performs feedback of different senses of touch to a user via a touch panel in response to the kinds of the information. The input and output device has a piezoelectric-body-supporting structure mounted with a piezoelectric actuator on a support frame through a support portion. The support portion is pasted at the center upper portion of the piezoelectric actuator and this support portion is attached to the touch panel. Any vibrations are transmitted to the touch panel when a vibration control voltage is supplied to the piezoelectric actuator.

In the sense of touch feedback controls using the piezoelectric actuator, the touch panel detects inputs (position and pressed force) from the outside. The control system triggers the input information from the touch panel and vibrates the touch panel or the housing.

SUMMARY

The menu selection device disclosed in Japanese Patent Application Publication No. Heisei 02-230310 and the input device disclosed in Japanese Patent Application Publication No. 2004-070505 have touch input functions by combining various kinds of the touch panel and a display unit, but when an icon is selected by the display unit, it is difficult to present sense of touch in synchronization with the selection thereof to the operator.

Also, The menu selection device disclosed in Japanese Patent Application Publication No. Heisei 02-230310 and the input devices disclosed in Japanese Patent Application Publications Nos. 2005-063227 and 2004-070505 present a key operation feeling by the sense of touch which the finger feels when the keyboard is operated as touch-typing, for example, when pressing-into a dome shaped switch. However, the finger often feels the sense of touch by only a uniform vibration or force change occurred mainly in the contact surface between the finger and the input surface. It is difficult to present to the operator various kinds of sufficient touch of senses such as a sliding touch of sense.

The electronic apparatus disclosed in Japanese Patent Application Publication No. 2004-094389 has attempted to strengthen sense of touch expressiveness by introducing a plurality of piezoelectric actuators with respect to improvement of input operability by using this kind of sense of touch device. However, with respect to the sizes of the plurality of piezoelectric actuators (outer shape), the contact area between the finger and the input surface is small. Since it is difficult to express a variety of force changes in the input surface thereof, it is still insufficient for the sense of touch expressiveness after introducing the piezoelectric actuator.

Accordingly, it is desirable to provide a touch-sensitive sheet member that gives the operator a concavity and convexity feeling for hand-feeling by devising a composition in the touch sheet member and improves operability in the touch sheet member or affinity in the antiskid sheet, an input device using the touch-sensitive sheet member, and an electronic apparatus using the input device.

According to an embodiment, there is provided a touch-sensitive sheet member including a touch-sensitive sheet member containing a first raw material member having predetermined hardness, and a second raw material member that presents sense of touch, the second raw material member being disposed in the first raw material member. The second raw material member has hardness different from the hardness of the first raw material member.

In an embodiment of the touch-sensitive sheet member, the second raw material member has hardness different from the hardness of the first raw material member, so that even if the member surface is observed as a flat shape, it is possible to present a concavity and convexity feeling for hand when a finger or the like of an operator touches the member surface actually and it slides from the first raw material member to the second raw material member.

Consequently, the touch-sensitive sheet member can be adequately applicable as a touch-sensitive input sheet for icon touch of an input device and as an antiskid sheet at a grip portion in various kinds of electronic apparatus housings.

According to another embodiment, there are provided an input device containing a display unit, a detection unit that is provided on the display unit and detects a slide position inputted based on an operation by an operation body, the detection unit having an operation surface, and a transparent touch-sensitive sheet member that covers at least a portion of the detection unit and is operated along the operation surface of the detection unit. The touch-sensitive sheet member includes a first raw material member having predetermined hardness, a second raw material member that presents sense of touch, the second raw material member being disposed in the first raw material member, and the second raw material member has hardness different from the hardness of the first raw material member.

With respect to the input device, any of the embodiments of the transparent touch-sensitive sheet member relating to the present application is applied, so that even if the display surface is observed as a flat shape, it is possible to present an input operation accompanied by a concavity and convexity feeling when a finger or the like of an operator touches an icon image or the like displayed on the display unit and it slides from the first raw material member to the second raw material member.

Thus, it is possible to provide an input device with a touch-sensitive input sheet for icon touch.

According to further embodiment, there is provided an input device containing a housing, an operation unit that is provided at the housing, has an operation surface, and inputs position information by operating the operation surface, and a detection unit that detects the position information inputted by the operation unit. The operation unit is constituted by material having lower hardness than that of material constituting the housing.

In an embodiment of the input device, the operation unit is constituted by the material having lower hardness than that of the material constituting the housing, so that it is also possible to present a sense of touch like the concavity and convexity feeling to the operator on an occasion of the operation by an operation body, for example, a finger of the operator.

According to another embodiment, there is provided an electronic apparatus containing a housing, and an input device that is provided at the housing and inputs information depending on an operation by an operation body. The input device includes a display unit, a detection unit that is provided on the display unit and detects a slide position by an operation body, the detection unit having an operation surface, and a transparent touch-sensitive sheet member that covers at least a portion of the detection unit and is operated along the operation surface of the detection unit. The touch-sensitive sheet member includes a first raw material member having predetermined hardness, a second raw material member that presents sense of touch, the second raw material member being disposed in the first raw material member, and the second raw material member has hardness different from the hardness of the first raw material member.

With respect to the electronic apparatus, any of the embodiments of the input device relating to the present application, so that with respect to the slide or/and pushdown operation depending on the operation body operating the electronic apparatus, in case of setting the hardness of the second raw material member to be high with respect to the hardness of the first raw material member, it is possible to present a convex feeling of becoming thicker along the sliding direction from one direction on the display surface and also, of becoming thinner toward the other direction on the display surface. Also, in case of setting the hardness of the second raw material member to be lower with respect to the hardness of the first raw material member, it is possible to present a concave feeling of being dug-down along the sliding direction from one portion of the display surface and also, of being dug-up toward the other portion of the display surface.

With respect to the electronic apparatus, any of the embodiments of the input device relating to the present application are applied, so that it is possible to provide an electronic apparatus which includes a touch-sensitive input sheet for icon touch or the like on a display unit of an operation surface of housing. Furthermore, miniaturization and operability of the input device can be improved, so that it is possible to attempt malfunction reduction, cost reduction and simplification of the manufacturing process for the electronic apparatus.

Additional features and advantages are described herein, and will be apparent from the following Detailed Description and the figures.

BRIEF DESCRIPTION OF THE FIGURES

FIG. 8 is a perspective view of an input device 301 as a third embodiment showing a constitutional example thereof;

FIG. 9 is a cross-sectional view of one element of an icon image of the input device 301 for showing a constitutional example thereof;

FIG. 17 is a cross-sectional view of one element of an icon image of an input device 305 according to a seventh embodiment showing a constitutional example thereof;

FIGS. 20A to 20D are process diagrams showing a formation example of a touch-sensitive input sheet 108;

FIGS. 22A to 22D are process diagrams showing a formation example of a touch-sensitive input sheet 109;

FIGS. 30A to 30D are process diagrams showing a formation example of a touch-sensitive input sheet 113;

FIGS. 37A and 37B are cross-sectional views of one element of an icon image of input devices 318, 318a according to a twentieth embodiment showing constitutional examples thereof;

FIG. 46 is an exploded perspective view of the mobile phone 800 showing a constitutional example thereof;

DETAILED DESCRIPTION

The following will describe embodiments of a touch-sensitive sheet member, an input device, and an electronic apparatus according to the present application with reference to the drawings.

Figure 1A:
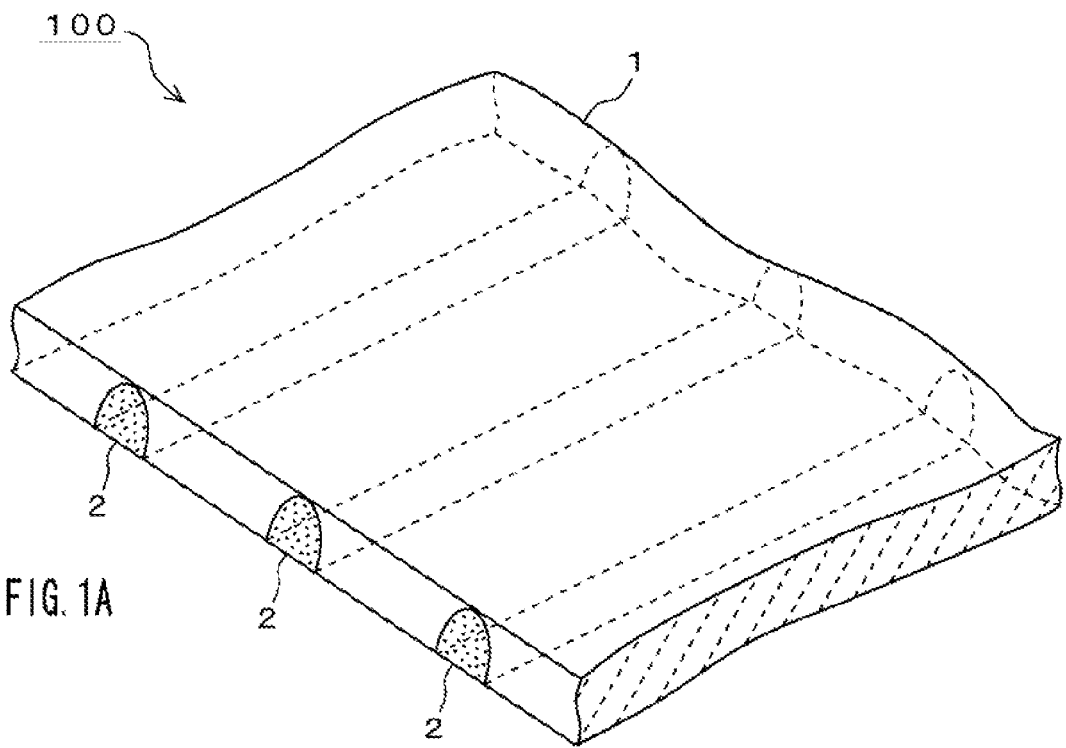
FIGS. 1A and 1B are respectively a perspective view and a cross-sectional view of a touch-sensitive sheet member 100 as a first embodiment showing a constitutional example thereof.
Figure 1B:
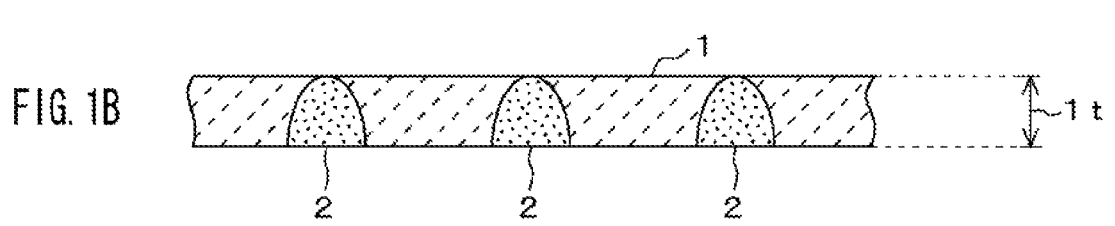

FIGS. 1A and 1B show a constitutional example of a touch-sensitive sheet member 100 as a first embodiment. The touch-sensitive sheet member 100 shown in FIG. 1A contains a base member 1 and element members 2. The base member 1 constitutes a first raw material member, has predetermined hardness and forms a sheet shape. For the base member 1, for example, a transparent and soft silicon rubber member having hardness 20° to 40° is used.

The element members 2 constitute a second raw material member, have predetermined sized block-shapes and are distributed in spots or at predetermined positions of the base member 1. For example, when the touch-sensitive sheet member 100 is applied to an antiskid sheet at a grip portion of an electronic apparatus, elongated blocks having half-cylindrical or half-ellipse cylindrical shapes are distributed linearly (in stripe shapes) along the sheet surface in order to present a concavity and convexity feeling. When the touch-sensitive sheet member 100 is applied to a touch-sensitive input sheet of an input device, protrusion blocks having cylindrical shapes or conical shapes are distributed so as to stand in the vertical direction with respect to the sheet surface in order to present a concavity and convexity feeling.

In this embodiment, the element member 2 has hardness different from the hardness of the base member 1. For the element member 2, a transparent and comparatively hard silicon rubber member of hardness 60° to 80°, polycarbonate-based transparent material, polyethylene terephthalate-based transparent material, polyethersulfone-based transparent material, transparent optical member (Zeonor (trade mark), Arton (trade mark) or the like) or the like is used. In this embodiment, one or more kinds of element members 2 are used with respect to the base member 1.

The reference it shown in FIG. 1B designates thickness of the touch-sensitive sheet member 100. The thickness it is around 0.01 mm to 5 mm. This embodiment includes the configurations in which the element member 2 and the base member 1 have approximately equal refractive index and have different bending elasticity; the element member 2 and the base member 1 have approximately equal transmissivity and have different bending elasticity; and the element member 2 and the base member 1 have approximately equal refractive index and transmissivity and have different bending elasticity.

In this embodiment, when refractive index of the air is assumed to be 1 and the transmissivity thereof is assumed to be 100%, transparent material in which the refractive index thereof is in the vicinity of approximately 1.4 and all light beams transmissivity thereof is around 70 to 95% is used for the base member 1, the element member 2 or the like. With respect to the thickness of the touch-sensitive sheet member 100, it is preferable for the layer thickness constituted by the base member 1 and the element member 2 to be 0.01 mm to 5 mm. Depending on the hardness of the transparent material thereof, a layer thickness of a protection film or the like which is constituted on an upper surface of the touch-sensitive sheet member 100 may be set so as to become 0.01 mm to 5 mm in order to present a concave and convex feeling.

For the base member 1 and the element member 2, there can be used acrylic-based transparent material, polycarbonate-based (PC-based) transparent material, polyethylene terephthalate-based (PET-based) transparent material, polyether sulfone-based (PES-based) transparent material, polyarylate-based (PAR-based) transparent material, polyether ether ketone-based (PEEK-based) transparent material, liquid crystal polymer-based (LCP-based) transparent material, polytetrafluoroethylene-based (PTFE-based) transparent material, polystyrene-based transparent material, styrene-based transparent material, urethane-based transparent material, silicon-based transparent material, polytetrafluorothylene-based (PTFE-based) material, fluorine resin material, cycloolefin polymer-based (COP-based) material, or acrylonitrile-butadiene-styrene-based (ABS-based) material; transparent material that is formed by synthesis or the like of at least any two species of materials selected from the above-mentioned materials; transparent material that is derived from any of the above-mentioned materials; material which is not transparent within all of the above-mentioned materials; and a polymer alloy which is formed by mixing any of the above-mentioned materials with rubber or the like.

Also, the following general synthetic resins can be used for the base member 1 and the element member 2 (there exist materials overlapped with the above-mentioned contents): phenol resin (PF), epoxy resin (EP), melamine resin (MF), urea resin (UF), unsaturated polyester resin (UP), alkyd resin, polyurethane (PUR), thermoset polyimide (PI), polyethylene (PE) (high density polyethylene (HDPE), medium density polyethylene (MDPE), and low density polyethylene (LDPE)), polypropylene (PP), polyvinylchloride (PVC), polyvinylidene chloride, polystyrene (PS), polyvinyl acetate (PVAc), polytetrafluoroethylene (PTFE) such as Teflon (trade mark), acrylonitrile butadiene styrene resin (ABS), AS resin, acrylic resin (PMMA), polyamide (PA), polyacetal (POM), polycarbonate (polycarbonate-based transparent material), modified polyphenylen ether (m-PPE, modified PPE, PPO), polybutylene terephthalate (PBT), polyethylene terephthalate (polyethylene terephthalate-based transparent material), polyethylene terephthalate-glass resin (polyethylene terephthalate-based transparent material-G), glass-fiber reinforced polyethylene terephthalate (GF-polyethylene terephthalate-based transparent material), cyclic polyolefin (COP), polyphenylene sulfide (PPS), polysulfone (PSF), polyether sulfone (polyethersulfone-based transparent material), amorphous polyarylate (PAR), liquid crystal polymer (LCP), polyether ether ketone (PEEK), thermoplastic polyimide (PI), or polyamide-imide (PAI); transparent material that is formed by synthesis or the like of at least any two species of synthetic resins selected from the above-mentioned synthetic resins; transparent material that is derived from any of the above-mentioned synthetic resins; material which is not transparent within all of the above-mentioned synthetic resins (usable for an antiskid sheet), and a polymer alloy which is formed by mixing any of the above-mentioned synthetic resins with rubber or the like.

In this embodiment, when using transparent silicon rubber member having hardness 20° to 40° for the base member 1, there is used, for the element member 2, transparent silicon rubber member having hardness 60° to 80°, polycarbonate-based transparent material, polyethylene terephthalate-based transparent material, polyethersulfone-based transparent material or a transparent optical member (Zeonor (trade mark), Arton (trade mark) or the like). The touch-sensitive sheet member 100 may be diverted to an antiskid sheet (touch sheet) as a case coating member. In that case, it is not necessary to transmit the light, so that the transmissivities thereof may be different. It is enough only if the base member 1 and the element member 2 are different in the hardness.

In this manner, according to the touch-sensitive sheet member 100 as the first embodiment, even if the surface of the touch-sensitive sheet member 100 is observed to be a flat shape, it is possible to present a concavity and convexity feeling for hand of an operator when the operator touches the surface of the base member 1 actually by hand and his or her hand (finger or the like) slides from the base member 1 to the element member 2 for sense of touch. Consequently, the touch-sensitive sheet member 100 may be adequately applicable for an antiskid sheet at a grip portion in various kinds of electronic apparatus housings or for a touch-sensitive input sheet for icon touch of an input device.

Embodiment 1

Figure 2A:
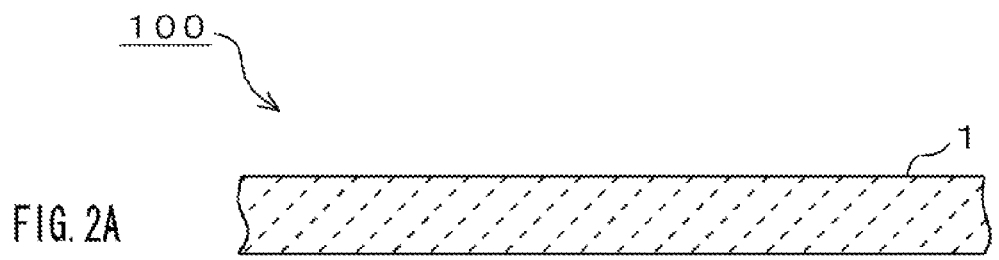
FIGS. 2A to 2C are process diagrams showing a formation example of the touch-sensitive sheet member 100 as the first embodiment.
Figure 2B:
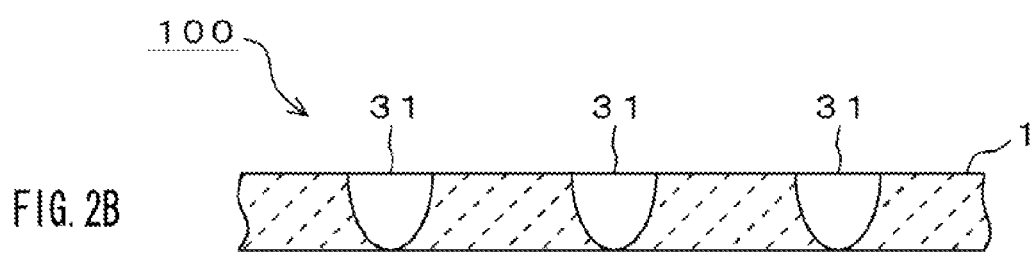
Figure 2C:
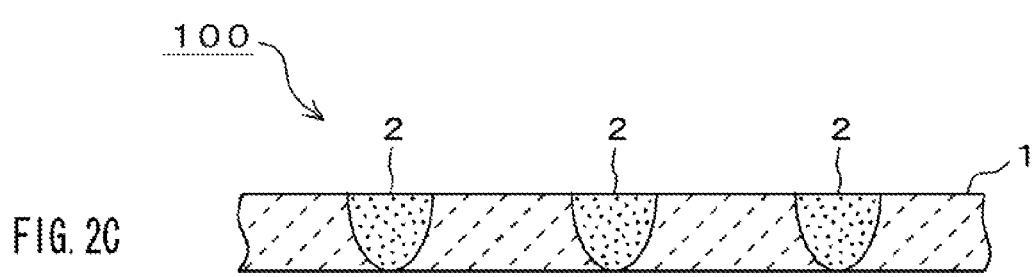

FIGS. 2A to 2C show a formation example of the touch-sensitive sheet member 100 as the first embodiment. In this embodiment, there is cited a case in which the touch-sensitive sheet member 100 as shown in FIG. 1A is formed.

First, the sheet-shaped base member 1 shown in FIG. 2A is prepared. For example, the base member 1 is obtained by forming transparent silicon rubber member of hardness 20° to 40° as a sheet shape. In this embodiment, corresponding to an application such as an antiskid sheet and a touch-sensitive input sheet, the silicon rubber member is molded to have thickness it of around 0.01 mm to 5 mm by thermal roll molding or injection-mold molding.

Next, opening portions or hole portions 31 for defining the regions which are embedded with the element members 2 are formed on the base member 1 shown in FIG. 2B. For example, when forming the antiskid sheet, as the opening portions or hole portions 31, elongated groove portions each having cross-sectional surfaces of semicircle shape or oval shape are formed linearly with predetermined distances apart along the sheet surface. The opening portions are formed by a cutting process or the like. The hole portions are formed by a punching process. Of course, the base member 1 and the hole portion 31 may be formed at once by producing a core and a cavity which are modeled with reversed patterns of the elongated groove portions when executing the injection-mold molding.

Thereafter, the opening portions or hole portions 31 are embedded with element members 2 shown in FIG. 2C. For the element member 2, for example, transparent silicon rubber member of hardness 60° to 80° is used. The element member 2 is not limited to such transparent silicon rubber member of hardness 60° to 80°; the above-mentioned polycarbonate-based transparent material, the above-mentioned polyethylene terephthalate-based transparent material, the above-mentioned polyethersulfone-based transparent material or the above-mentioned transparent optical member (Zeonor (trade mark), Arton (trade mark) or the like) may be also used. With respect to the embedding method of the element members 2 to the opening portions or hole portions 31, there is employed a double mold by injection-mold molding or a coating process. According to the double mold, any different qualities of material (different materials) which form the base member 1 and the element member 2 are combined to each other and the base member 1 and the element member 2 are molded integrally. Thus, the touch-sensitive sheet member 100 as shown in FIG. 1A is completed.

The touch-sensitive sheet member 100 is a sheet such that it is flat looking to the eye and can present a concavity and convexity feeling when grasping it. When this touch-sensitive sheet member 100 is applied to an electronic apparatus such as a mobile terminal device and a mobile phone, a hand of the operator holding the electronic apparatus do not slip so that the operator can hold the electronic apparatus reliably.

Figure 3A:
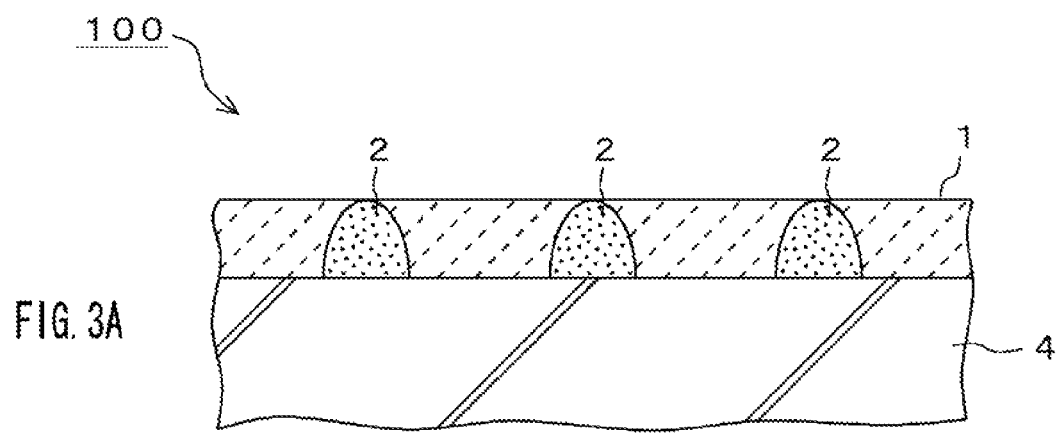
FIGS. 3A and 3B are cross-sectional views of the touch-sensitive sheet member 100 for showing a function example thereof.
Figure 3B:
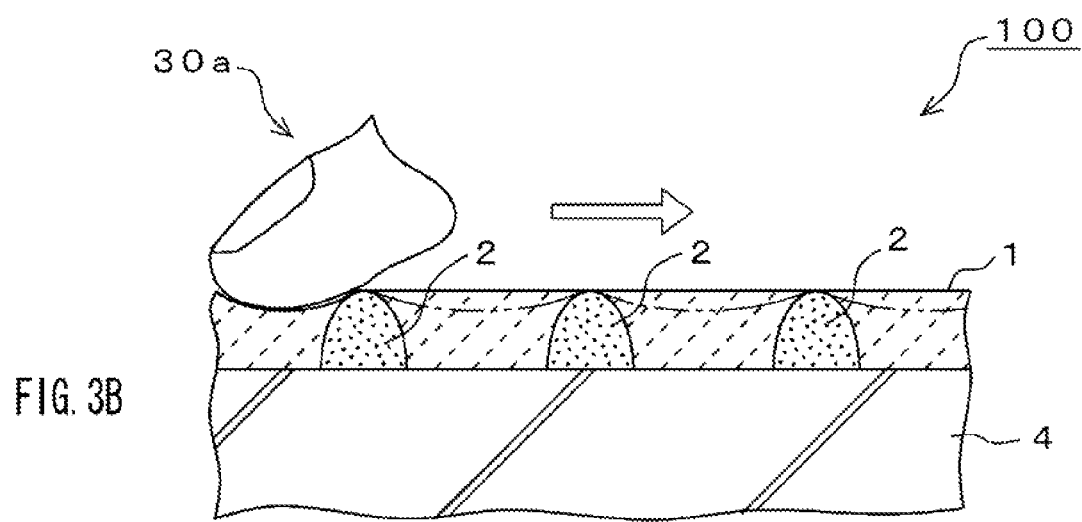

The following will describe a function example of the touch-sensitive sheet member 100. FIGS. 3A and 3B show the function example of the touch-sensitive sheet member 100.

In this embodiment, it is disclosed about a case in which the touch-sensitive sheet member 100 is mounted on a substrate or base board 4 and the concavity and convexity feeling is obtained. The touch-sensitive sheet member 100 is mounted with the convexity shaped region of the element members 2 shown in FIG. 3A being directed, for example, toward the upper portion. Of course, it is not limited to this; the touch-sensitive sheet member 100 is mounted with the convexity shaped region of the element members 2 being directed, for example, toward the lower portion. The substrate or base board 4 is a board, for example, corresponding to a touch panel of an input device, a liquid crystal display screen, an exterior housing of an electronic apparatus or the like.

In this embodiment, the element members 2 having half oval cross-sections are formed linearly on the base member 1 with predetermined distances. It is disclosed about a case in which the element members 2 are three pieces. In the above-mentioned embodiment, the sheet-shaped base member 1 is formed by the transparent silicon rubber member of hardness 20° to 40°. The element member 2 is formed by the transparent silicon rubber member of hardness 60° to 80° which is harder than that of the base member 1.

With respect to the touch-sensitive sheet member 100 constituted in this manner, if the operator touches the surface of the base member 1 by his or her hand (a finger or like) as shown in FIG. 3B, the concavity and convexity feeling is presented for the operator's finger 30a when the finger 30 slides from the base member 1 to the element member 2 for sense of touch. For example, when load=0 (functioning as a display unit), the sheet member looks flat and when load=15 gf to 50 gf (functioning as an operation unit), the sheet member presents a concavity and convexity feeling for the operator' finger 30a.

In this embodiment, the base member 1 whose hardness is low such as 20° to 40° stands between the convexity shaped regions of the element members 2, so that the sheet member 100 presents a pressing-into feeling. The convexity shaped region of the element member 2 has high hardness of 60° to 80° and the element member 2 is harder than the base member 1, so that the sheet member 100 presents a reaction feeling. Consequently, the touch-sensitive sheet member 100 may be adequately applicable for an antiskid sheet at a grip portion in various kinds of electronic apparatus housings or for a touch-sensitive input sheet for icon touch of an input device.

Embodiment 2

Figure 4A:
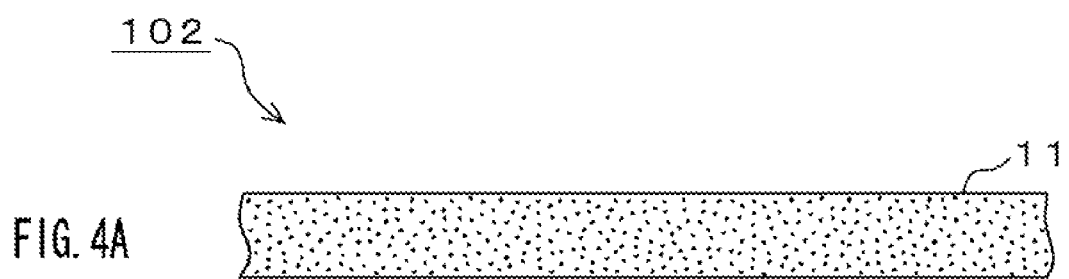
FIGS. 4A to 4C are process diagrams showing a formation example of a touch-sensitive sheet member 102 as a second embodiment.
Figure 4B:
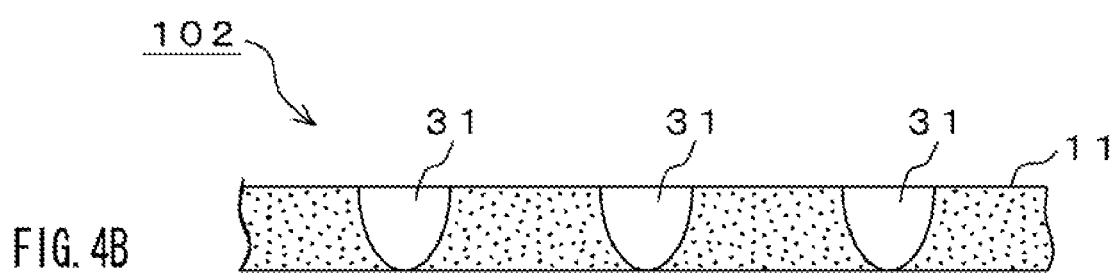
Figure 4C:
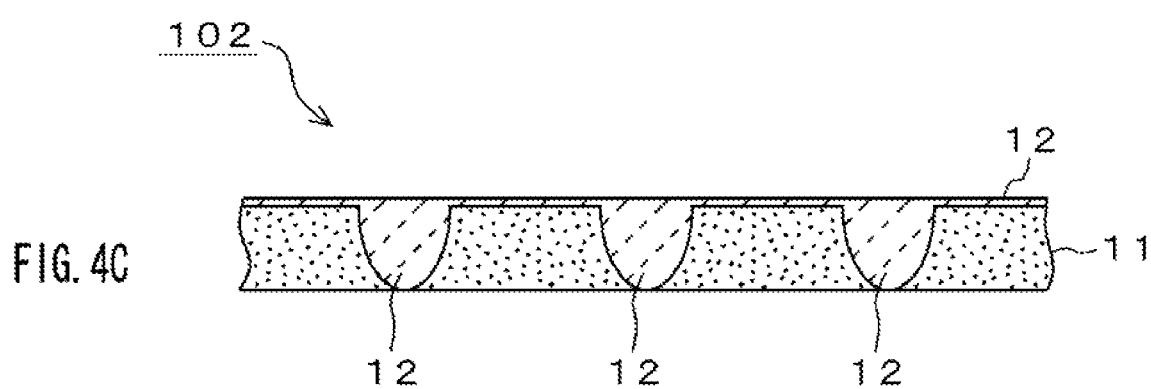

FIGS. 4A to 4C show a formation example of the touch-sensitive sheet member 102 as a second embodiment. In this embodiment, there is cited a case in which materials of the base member 1 and the element member 2 of the touch-sensitive sheet member 100 shown in FIG. 1A are interchanged.

First, a sheet-shaped base member 11 shown in FIG. 4A is prepared. For example, the base member 11 is obtained by forming transparent silicon rubber member of hardness 60° to 80° as a sheet shape. Also, in this embodiment, similarly as the first embodiment, corresponding to an application such as the antiskid sheet and the touch-sensitive input sheet, a silicon rubber member is molded to have thickness It of around 0.01 mm to 5 mm by thermal roll molding or injection-mold molding.

Next, opening portions or hole portions 31 for defining the regions which present a concavity and convexity feeling of touch of sense are formed on the base member 11 shown in FIG. 4B. For example, when forming the antiskid sheet, as the opening portions or hole portions 31, elongated groove portions each having cross-sectional surfaces of semicircle shape or oval shape are formed linearly with predetermined distances apart along the sheet surface. The opening portions or hole portions 31 are formed, similarly as the first embodiment, by a cutting process, a punching process or an injection-mold molding.

Thereafter, the element members 12 shown in FIG. 4C are formed in the opening portions or hole portions 31. At that time, the element member 12 has lower hardness than that of the base member 11, so that the element member 12 may be formed to cover over a surface of the base member 11. For the element member 12, for example, transparent silicon rubber member of hardness 20° to 40° is used. The element member 12 is not limited to the transparent silicon rubber member of hardness 20° to 40°; the above-mentioned polycarbonate-based transparent material, the above-mentioned polyethylene terephthalate-based transparent material, the above-mentioned polyethersulfone-based transparent material or the above-mentioned transparent optical member (Zeonor (trade mark), Arton (trade mark) or the like) is also used. With respect to the embedding method of the element members 12 to the opening portion or hole portion 31, it has been explained in the first embodiment, so that the explanation thereof will be omitted. Thus, the touch-sensitive sheet member 102 is completed in which the softness and the hardness (properties) of the base member 1 and the element member 2 of the touch-sensitive sheet member 100 shown in FIG. 1A are interchanged.

Figure 5A:
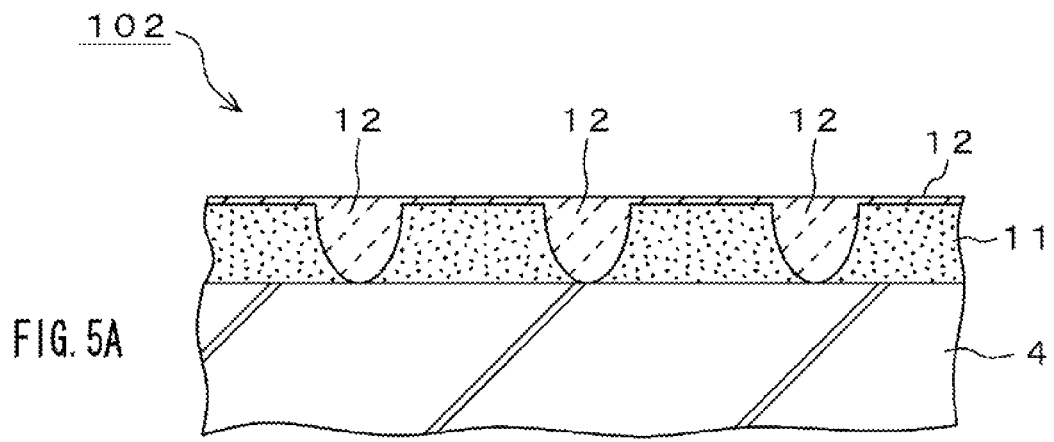
FIGS. 5A and 5B are cross-sectional view of the touch-sensitive sheet member 102 for showing a function example thereof.
Figure 5B:
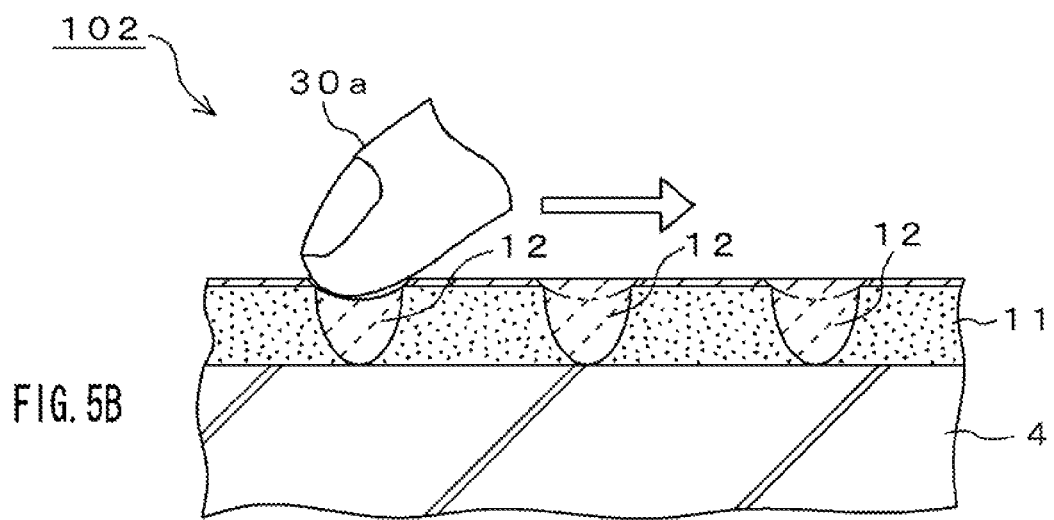

The following will describe a function example of the touch-sensitive sheet member 102. FIGS. 5A and 5B show a function example of the touch-sensitive sheet member 102.

Also in this embodiment, similarly as the first embodiment, it is disclosed about a case in which the touch-sensitive sheet member 102 is mounted on a substrate or base board 4a and the concavity and convexity feeling is obtained. The touch-sensitive sheet member 102 is mounted with the concavity shaped region of the element members 12 shown in FIG. 5A being directed, for example, toward the upper portion. Similarly as the first embodiment, the substrate or base board 4 is a board corresponding to a touch panel of an input device, a liquid crystal display screen, an exterior housing of an electronic apparatus or the like.

In this embodiment, the element members 12 having half oval cross-sections are formed linearly on the base member 11 with predetermined distances. It is disclosed about a case in which the element members 12 are three pieces. In the above-mentioned embodiment, the sheet-shaped base member 11 is formed by transparent silicon rubber member of hardness 60° to 80°. The element member 12 is formed by transparent silicon rubber member of hardness 20° to 40° which is softer than that of the base member 11.

With respect to the touch-sensitive sheet member 102 constituted in this manner, if the operator touches the surface of the base member 11 by his or her hand (a finger or like) as shown in FIG. 5B, the concavity and convexity feeling is presented for the user's finger 30a when the finger 30a slides from the base member 11 to the element member 12 for sense of touch. In this embodiment, the base member 11 whose hardness is high such as 60° to 80° stands between the convexity shaped regions of the element members 12, so that the sheet member 102 presents a reaction force feeling. The convexity shaped region of the element member 12 has such low hardness as 20° to 40° and the element member 12 is softer than the base member 11, so that the sheet member 102 presents a pressing-into feeling. Consequently, the touch-sensitive sheet member 102 may be adequately applicable for an antiskid sheet at a grip portion in various kinds of electronic apparatus housings or for a touch-sensitive input sheet for icon touch of an input device.

Figure 6:
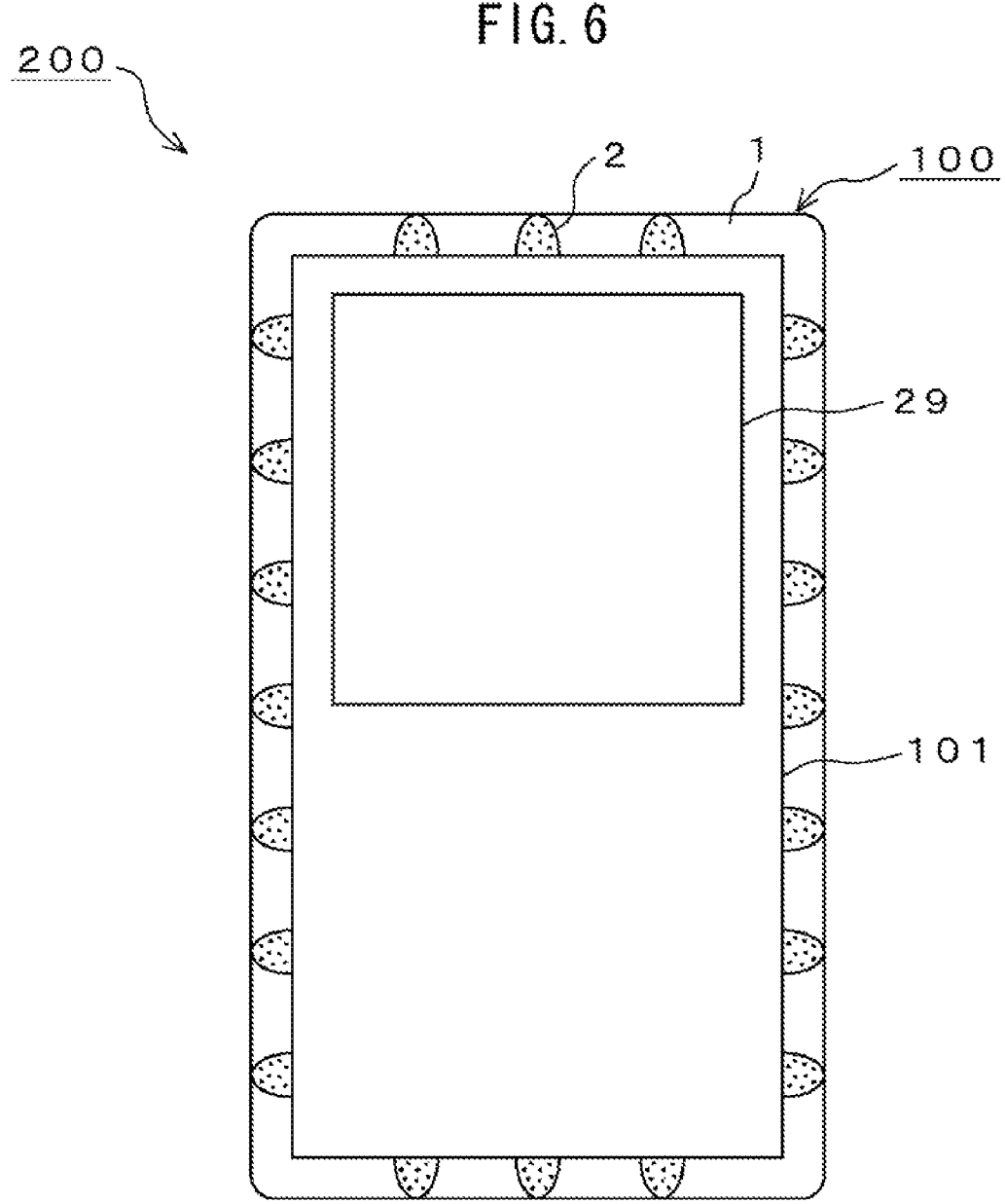
FIG. 6 is a top view of a mobile terminal device 200 $t$ which the touch-sensitive sheet member 100 or the like is applied for showing a constitutional example thereof.

FIG. 6 shows a constitutional example of a mobile terminal device 200 to which the touch-sensitive sheet member 100 or the like is applied. In this embodiment, there is disclosed a case in which the touch-sensitive sheet member 102 is used for an antiskid sheet at a grip portion of the mobile terminal device and the touch-sensitive sheet member 100 is pasted around a side surface of the mobile terminal device 200 to present the concavity and convexity feeling to the operator when being gripped. The surface of the touch-sensitive sheet member 100 is visually confirmed to be a flat shape but the touch-sensitive sheet member 100 has a configuration in which it is difficult to recognize the concavity and convexity feeling if it is not touched.

According to the mobile terminal device 200 shown in FIG. 6, the touch-sensitive sheet member 100 surrounds around the side surface of a main body case 101. For example, the touch-sensitive sheet member 100 is pasted with the convexity shaped regions of the element members 2 shown in FIG. 6 being directed toward the outside. Of course, it is not limited to this; the touch-sensitive sheet member 100 is pasted with the convexity shaped regions of the element members 2 being directed toward the inside. The touch-sensitive sheet member 100 is designed, for example, to have the same width as that of the side surface of the main body case 101, and is processed to be in a strip-shape. The touch-sensitive sheet member 100 having a predetermined width in a strip-shape is pasted by an adhesive agent. It is also allowed to use a double-stick tape for the adhesion of the touch-sensitive sheet member 100 and the main body case 101.

It is because transparency is not required for the touch-sensitive sheet member 100 compared with a case in which the sheet member is used for a touch-sensitive input sheet of an input device that the double-stick tape is usable. Transparency may be required when using the touch-sensitive sheet member 100 as a touch-sensitive input sheet on the display unit 29 of the mobile terminal device 200. In this embodiment, there is a case in which the mobile terminal device 200 is in a vertically-long configuration and is operated by grasping the main body case 101 (hereinafter, referred to as grasping operation) or a case in which it is in a horizontally-long configuration and is grasp-operated. The element members 2 are preferably distributed at portions for the grasping operation of the mobile terminal device 200 in order to bring out the antiskid function thereof.

In this embodiment, the element members 2 each having half oval cross-section are formed linearly on the base member 1 with predetermined distance. The touch-sensitive sheet member 100 is used in which half-ellipse cylindrical elongated blocks of the element members 2 are formed in a direction perpendicular to the length direction of the main body case 101. The element member 2 is formed by transparent silicon rubber member of hardness 60° to 80° which is harder than the base member 1. It is disclosed about a case in which the element members 2 are twenty pieces. In this case, an example is disclosed in which the element members 2 are distributed for every seven pieces in the longitudinal direction of the main body case 101 and are distributed for every three pieces in the short side direction thereof. In the above-mentioned embodiment, the sheet-shaped base member 1 is formed by transparent silicon rubber member of hardness 20° to 40°.

Figure 7A:
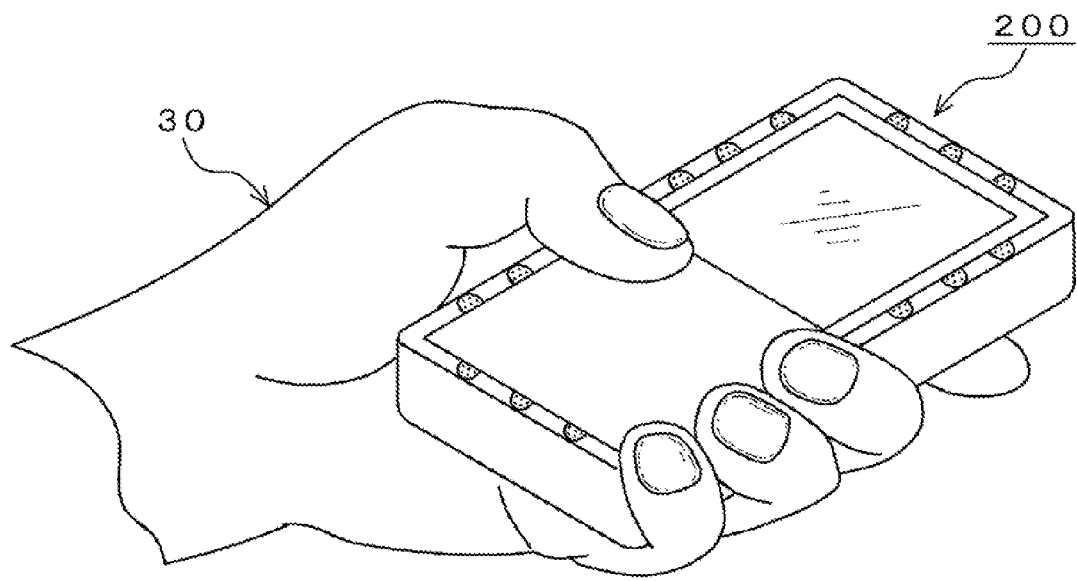
FIGS. 7A and 7B are perspective views of the mobile terminal device 200 to which the touch-sensitive sheet member 100 is applied for showing a function example thereof.
Figure 7B:
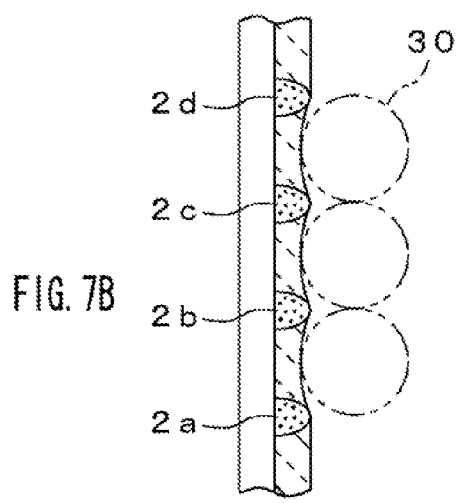

FIGS. 7A and 7B show a function example of the mobile terminal device 200 to which the touch-sensitive sheet member 100 is applied.

According to the mobile terminal device 200 shown in FIG. 7A, the touch-sensitive sheet member 100 surrounds around the side surface of the main body case 101. When the operator 30 grasping the mobile terminal device 200 operates the mobile terminal device 200 constituted in this manner by, for example, his or her left hand, a little finger of the operator 30 is attached to two pieces of element members 2a, 2b on the right lower side of the touch-sensitive sheet member 100 shown in FIG. 7B. An annular finger thereof is attached to a portion between two pieces of element members 2b, 2c on the right lower side shown in FIG. 7B. A mid finger thereof is attached to a portion between two pieces of element members 2c, 2d on the right lower side shown in FIG. 7B. A base of a thumb thereof is attached to the vicinity of a protrusion region of an element member 2e on the left lower side of the touch-sensitive sheet member 100.

Thus, the two pieces of the element members 2a, 2b present a concavity and convexity feeling biting into a portion between the element members 2a, 2b for the little finger of the operator 30. The two pieces of the element members 2b, 2c present a concavity and convexity feeling biting into a portion between the element members 2b, 2c for the annular finger thereof. The two pieces of the element members 2c, 2d present a concavity and convexity feeling biting into a portion between the element members 2c, 2d for the mid finger thereof. The element member 2e presents a concavity and convexity feeling being hooked at the element member 2e for the base of the thumb thereof. Thus, the operator 30 can obtain a concavity and convexity feeling for hand.

Consequently, it is possible to improve grip property when grasp-operating the mobile terminal device 200. The touch-sensitive sheet member 100 may be not only applied to the antiskid sheet of the grip portion in various kinds of electronic apparatus housings but also be adequately applied to a touch-sensitive input sheet for icon touch of an input device if transparent material is used for the raw material thereof.

The above-mentioned touch-sensitive sheet member 100 becomes inexpensive and causes cost reduction as compared with the cost of a component of an input function kind constituting an operation panel, because a layer having different bending elasticity is only added to a past sheet member. Further, it is possible to replace a portion which has been an operation panel in past method with a display unit, so that the display area can be enlarged. Hereinafter, it will be explained with respect to touch-sensitive input sheets and a manufacturing method thereof.

Embodiment 3

FIG. 8 shows a constitutional example of an input device 301 as a third embodiment. The input device 301 shown in FIG. 8 is a device for inputting information by a slide or/and pushdown operation depending on a finger or the like (operation body) of an operator 30. The input device 301 contains a display unit 29, an input detection unit 45, and a touch-sensitive input sheet 103.

The display unit 29 displays an image of a plurality of push button switches on an occasion of an input operation. The image of the push button switches constitutes an icon image for the input operation. The image of the push button switches contains numeral keys K1 to K10 of "0" to "9", symbol keys K11, K12 of "*", "#" or the like, hook button keys K13, K14 of "ON", "OFF2 or the like, menu operation keys K15 to K19, a fast forward key K20, a fast rewind key K21 and the like. A color liquid crystal display device (LCD device) is used for the display unit 29.

The input detection unit 45 which constitutes the detection unit is provided on the display unit 29. The input detection unit 45 includes an operation surface. The input detection unit 45 is provided on the upper portion of the display unit 29 and operates so as to detect a slide position of the operator's finger or the like. For example, a touch panel of an electrostatic capacitance method is used for the input detection unit 45. Anything is available for the input detection unit 45 only if the functions of the cursoring and the selection can be distinguished, and other than an input device of an electrostatic capacitance method, it may be an input device, for example, of a resistance film method, of a surface acoustic wave (SAW) method, of an optical method, of a tact switch of a multi stage method or the like. The input detection unit 45 may be preferably an input device having a constitution which can apply position detection information and force detection information to the controller.

The transparent touch-sensitive input sheet 103 constituting the touch-sensitive sheet member 100 is provided on the input detection unit 45. The touch-sensitive input sheet 103 covers over the input detection unit 45 and is slid or/and pushdown operated along and on the operation surface of the input detection unit 45. Of course, the touch-sensitive input sheet 103 may cover a portion of the input detection unit 45. The touch-sensitive input sheet 103 is provided with a protection film.

For example, the touch-sensitive input sheet 103 includes a plurality of element members E1 to E21 which have predetermined sized block-shapes and are distributed at predetermined positions in spots of the base member 11. In this embodiment, the element members E1 to E12 for the numeral keys of "0" to "9", the symbol keys of "*", "#" or the like and element members E15 to E19 for the menu operation keys, which correspond to the icon image for the input operation, respectively have cylindrical shapes which become one example of the block-shapes. The element members E13, E14 for the hook button keys of "ON", "OFF" or the like, the element member E20 for a fast forward key and the element member E21 for a fast rewind key respectively have rectangular shapes which become another example of the block-shapes. Each of the element members E1 to E21 has hardness 20° to 40° that is different from the hardness 60° to 80° of the base member 1.

The above-mentioned element members E1 to E21 are arranged with them corresponding to the function keys K1 to K21. For example, the element member E1 is located on the numeral key K1 of "1". The element member E2 is located on the numeral key K2 of "2". The element member E3 is located on the numeral key K3 of "3". The element member E4 is located on the numeral key K4 of "4". The element member E5 is located on the numeral key K5 of "5". The element member E6 is located on the numeral key K6 of "6". The element member E7 is located on the numeral key K7 of "7". The element member E8 is located on the numeral key K8 of "8". The element member E9 is located on the numeral key K9 of "9". The element member E10 is located on the numeral key K10 of "0".

Also, the element member E11 is located on the symbol key K11 of "*". The element member E12 is located on the symbol key K12 of "#". The element member E13 is located on the hook button key K13. The element member E14 is located on the hook button key K14. The element member E15 is located on the menu operation key K15. The element member E16 is located on the menu operation key K16. The element member E17 is located on the menu operation key K17. The element member E18 is located on the menu operation key K18. The element member E19 is located on the menu operation key K19. The element member E20 is located on the fast forward key K20. The element member E21 is located on the fast rewind key K21.

In this embodiment, a film-shaped top member 5 constituting the protection film is provided on the base member 11 and the element members E1 to E21. For the top member 5, a transparent material having transmissivity and refractive index approximately equal to the transmissivity and refractive index of the touch-sensitive input sheet 103 is used. For example, Zeonor (trade mark) having a film thickness it of around 25 μm which forms one example of a transparent material is used. The hardness thereof is around 20° to 40°.

FIG. 9 shows a constitutional example of one element of an icon image of the input device 301. In this embodiment, there is cited a case in which the hardness of the element member 12 of the touch-sensitive input sheet 103 is set to be low with respect to the hardness of the base member 11 of the touch-sensitive input sheet 103.

According to the input device 301 shown in FIG. 9, the input detection unit 45, the touch-sensitive input sheet 103 and the top member 5 are laminated in sequence on the display unit 29. The touch-sensitive input sheet 103 provided on the input detection unit 45 is constituted by the base member 11 forming a sheet shape of hardness 60° to 80° and the element members 12 forming a block-shape of hardness of around 20° to 40°. The base member 11 and the element members 12 are molded by using the double mold. According to the double mold, the different qualities of materials (the materials) which form the base member 11 and the element member 12 are combined with each other and the base member 11 and the element member 12 are molded integrally. In the drawing, a symbol, "I" denotes a display region which displays, for example, an icon image (input image) of the numeral key K1 of "1" or the like. With respect to the icon images of other function keys K2 to K21, display regions "I" are defined similarly.

In this embodiment, the operator pushes down the icon image displayed in the display region "I". The element member 12 includes at least the display region "I" of the icon image displayed on the display unit 29 and is surrounded by the base member 11. The element member 12 shown in FIG. 9 corresponds to each of the element members E1 to E21 facing the icon images of the various kinds of function keys K1 to K21 shown in FIG. 8.

For the base member 11, for example, polycarbonate-based transparent material having film thickness 11t of around 100 μm, which forms one example of the transparent material, is used. For the element member 12, transparent silicon rubber member of hardness 20° to 40° is used as soft transparent material which has a refractive index close to that of the polycarbonate, and the film thickness 11t thereof is designed to be around 100 μm. When constituting the touch-sensitive input sheet 103 in this manner, it is possible to present a concave shape feeling of being dug-down stepwise along the sliding direction from one portion of the display surface and also, of being dug-up stepwise toward the other portion of the display surface.

It should be noted that although it is omitted in the drawing, a surface plate may be inserted into a position between the input detection unit 45 and the touch-sensitive input sheet 103. For the surface plate, transparent material having transmissivity and refractive index approximately equal to the transmissivity and refractive index of the touch-sensitive input sheet 103 may be used. The surface plate forms a substrate when forming the touch-sensitive input sheet 103 independently or brings out such a function of compensating the strength of the touch-sensitive input sheet 103 together with the top member 5.

Figure 10A:
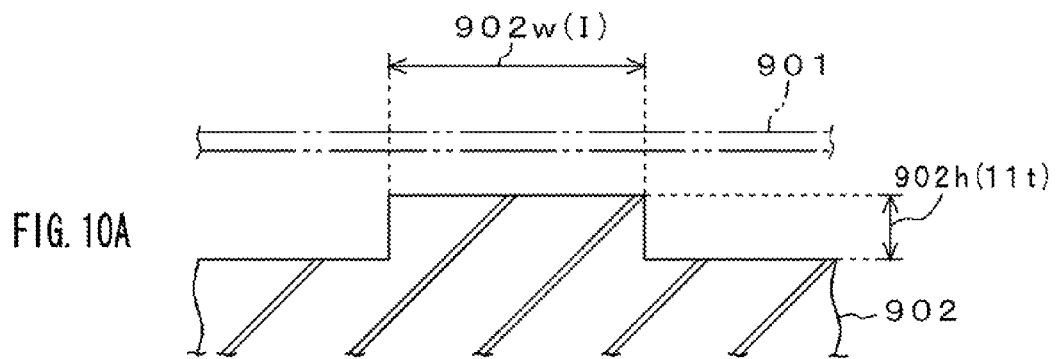
FIGS. 10A to 10C are process diagrams showing a formation example of a touch-sensitive input sheet 103.
Figure 10B:
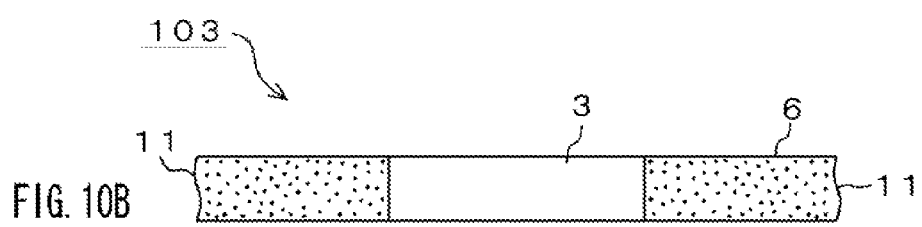
Figure 10C:
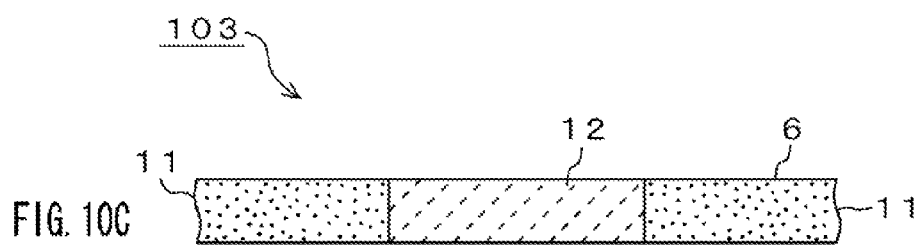

FIGS. 10A to 10C show a formation example of the touch-sensitive input sheet 103. In this embodiment, there is cited a case in which the touch-sensitive input sheet 103 applicable to the input device 301 as shown in FIG. 8 and FIG. 9 is formed by double mold.

First, there is prepared a die including a cavity 901 and a core 902 on the primary side shown in FIG. 10A. The core 902 has a convex shape and at the same time, has a height 902h which defines the thickness 11t of the base member 11. The core 902 further has a predetermined width 902w for molding an opening portion 3. The width 902w sets the display region "I" in the element member 12 together with the length of the core 902, which is not shown.

The core 902 is processed such that the size of the opening portion 3 becomes the size of the display region "I". In the above-mentioned embodiment, the display regions "I" are set such that they correspond to the shapes and the sizes of the element members E1 to E21 having the sizes which include the icon images of the various kinds of function keys K1 to K21. The core 902 is processed with respect to the element members E1 to E12 and the element members E15 to E19 such that cylindrical opening portions 3 can be obtained at predetermined regions of the base member 11 and the convexity-shaped core 902 is processed with respect to the element members E13, E14, E20, E21 such that rectangular opening portions, which are not shown, can be obtained at predetermined regions thereof.

In this embodiment, different from the insert molding, after molding the base member 11 which becomes the primary side, the element members 12 which become the secondary side are molded in the same die integrally with the primary side. For the mold material on the primary side, for example, polycarbonate resin having transmissivity of 1.5 and refractive index of 1.5 concurrently, which forms one example of the transparent material of hardness 60° to 80° is used. Then, the primary side mold-molding is executed by the cavity 901 of the primary side and the core 902. For example, the die including the cavity 901 and the core 902 of the primary side is mold-clamped and the polycarbonate resin is sealed therein. After the cooling and when the die is opened, it is possible to form the opening portion 3 at the base member 11 shown in FIG. 10B.

Further, the die is rotated in a state in which the concave portion of the base member 11 molded on the primary side is made to be a core of the secondary side and is mold-clamped by a cavity which becomes the secondary side and which is not shown and then, a mold material of the secondary side is inpoured, and the base member 11 and the element members 12 are unified. For the mold material on the secondary side, for example, soft transparent resin material of hardness 20° to 40° is used, which has a refractive index close to that of the polycarbonate-based transparent material. In this embodiment, there is sealed a soft transparent resin material having refractive index close to the refractive index of 1.5 of the polycarbonate. After the cooling and the die is opened, it is possible to form the touch-sensitive input sheet 103 in which the base member 11 and the element members 12 as shown in FIG. 10C are unified.

Thereafter, a laminated board provided with the input detection unit 45 on the display unit 29 is prepared. For the display unit 29, a color liquid crystal display device is used. For the input detection unit 45, an input device of a resistance film method, of a surface acoustic wave method, of an optical method, of a tact switch of a multi stage method or the like is used, other than the input device of the electrostatic capacitance method. Thereafter, the touch-sensitive input sheet 103 is formed on the input detection unit 45.

For example, the touch-sensitive input sheet 103 is joined on the input detection unit 45 through an adhesive agent.

Further, the top member 5 is formed on the touch-sensitive input sheet 103. The top member 5 is bonded on the touch-sensitive input sheet 103 through an adhesive agent. Thus, the input device 301 as shown in FIG. 8 and FIG. 9 is completed.

In this manner, according to the input device 301 as a third embodiment, the touch sheet at the upper potion of the icon image of the display screen is different from the member in the past and the embodiment of the transparent touch-sensitive input sheet 103 relating to the present application is applied thereto. In the touch-sensitive input sheet 103, the properties of transmitting light of the base member 11 and the element member 12 are approximately equal thereto but the hardness of the compositions thereof are different.

Consequently, even if the display surface is observed to be a flat shape, when touching icon images or the like of the various kinds of function keys K1 to K21 or the like which are displayed on the display unit 29 by hand (finger or the like) of the operator and the finger slides from the base member 11 to any one of the element members E1 to E21 or the like, it is possible to present an input operation accompanied by a concave shape feeling of being dug-down stepwise along the sliding direction from one portion of the display surface and also, of being dug-up stepwise toward the other portion of the display surface. Thus, it is possible to provide the input device 301 having a touch-sensitive input sheet for icon touch in which visibility as the display unit 29 is excellent and at the same time, concavity and convexity expression can be realized also as the operation unit.

Embodiment 4

Figure 11:
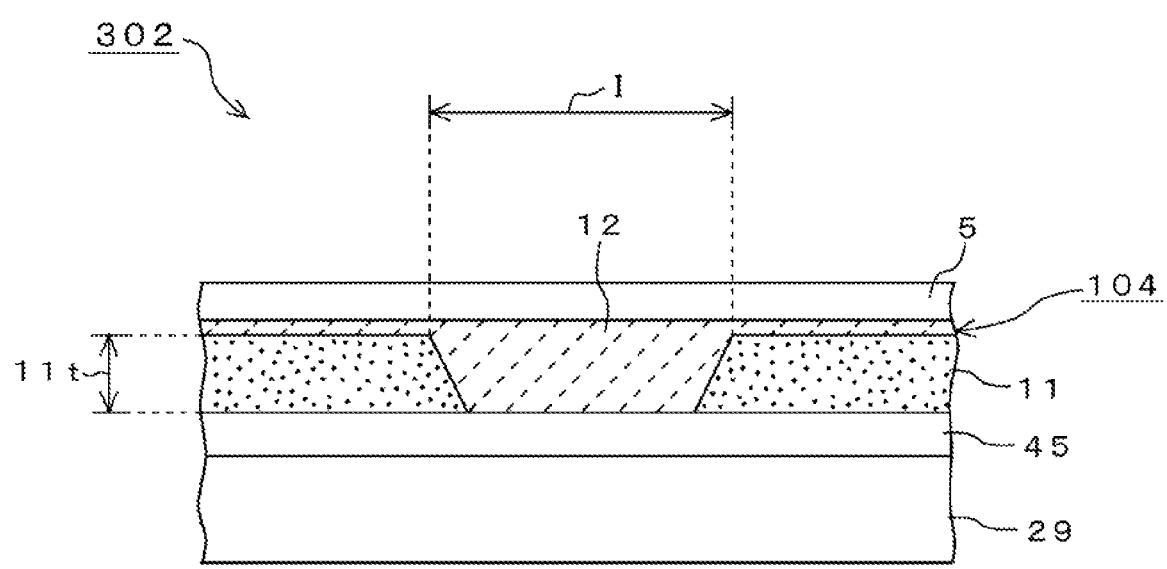
FIG. 11 is a cross-sectional view of one element of an icon image of an input device 302 according to a fourth embodiment showing a constitutional example thereof.

FIG. 11 shows a constitutional example of one element of an icon image of the input device 302 relating to a fourth embodiment.

In this embodiment, there is cited a case in which the hardness of the element member 12 of the touch-sensitive input sheet 104 is set to be low with respect to the hardness of the base member 11 of the touch-sensitive input sheet 104 and in which the shape of the element member 12 is different from that of the third embodiment and further, the element members 12 covers over the whole surface of the base member 11.

According to the input device 302 shown in FIG. 11, the input detection unit 45, the touch-sensitive input sheet 104 and the top member 5 are laminated on the display unit 29 in a similar order as the third embodiment. The touch-sensitive input sheet 104 provided on the input detection unit 45 contains the base member 11 of hardness 20° to 40°, which is formed as a sheet shape, and element members 12 of hardness of around 60° to 80°, which form block-shapes. In the drawing, a symbol, "I" denotes a display region and similarly as the third embodiment, the display region "I" displays, for example, an icon image (input image) of the numeral key K1 of "1" or the like. With respect to the icon images of other function keys K2 to K21, it is just the same as mentioned in the third embodiment that display regions "I" are defined similarly.

In this embodiment, the element member 12 includes the display region "I" of the icon image displayed on the display unit 29 and is provided on the whole surface of the base member 11. The fact that the element member 12 shown in FIG. 11 corresponds to each of the element members E1 to E21 facing the icon images of the various kinds of function keys K1 to K21 shown in FIG. 8 is just the same as mentioned in the third embodiment.

In this embodiment, the convexity shaped region of the element member 12 has a reversed-trapezoid shaped cross-section and further, the element members 12 covers over the whole surface of the base member 11, so that it is possible to simplify the filling process with respect to the base member 11. For the base member 11, for example, polycarbonate-based transparent material having film thickness 11t of around 100 μm, which forms one example of the transparent material, is used. For the element member 12, transparent silicon rubber member of hardness of 20° to 40° as soft transparent material which has a refractive index close to that of the polycarbonate-based transparent material is used, and the film thickness thereof is designed to be around 100 μm.

When constituting the touch-sensitive input sheet 104 in this manner, it is possible to present a concave shape feeling of being dug-down from the slant-shaped region smoothly along the sliding direction from one portion of the display surface and also, of being dug-up from the slant-shaped region smoothly toward the other portion of display surface. Also in this embodiment, it is allowed to insert a surface plate into a position between the input detection unit 45 and the touch-sensitive input sheet 104. With respect to the reason of inserting this display plate, it is just the same as mentioned in the third embodiment.

Figure 12A:
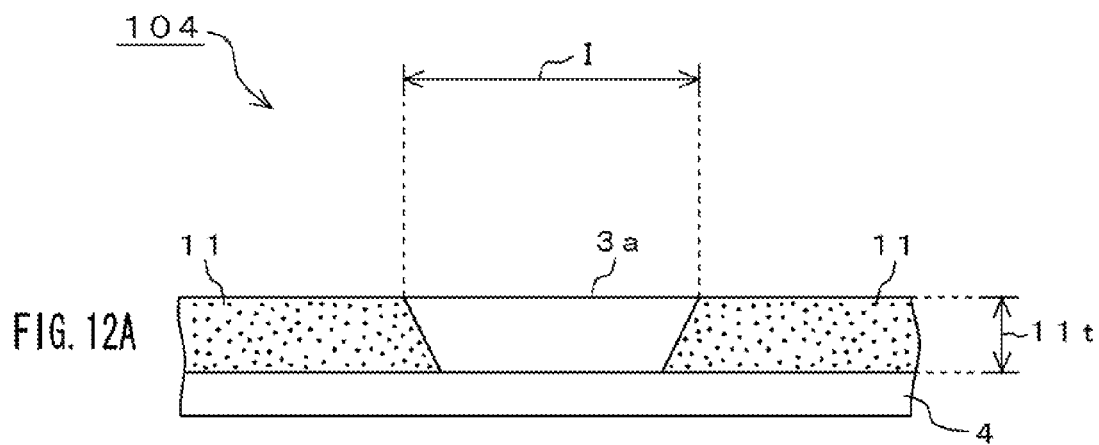
FIGS. 12A and 12B are process diagrams showing a formation example of a touch-sensitive input sheet 104.
Figure 12B:
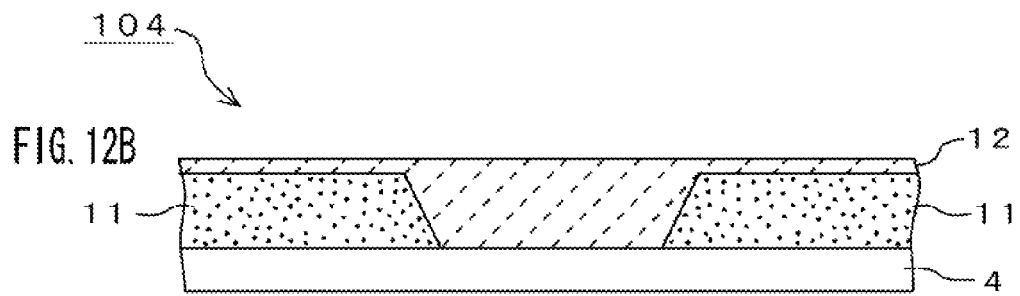

FIGS. 12A and 12B show a formation example of the touch-sensitive input sheet 104. In this embodiment, there is cited a case in which the touch-sensitive input sheet 104 applicable to the input device 302 as shown in FIG. 11 is formed. With respect to the whole constitutional example of the input device 302, the input device 301 shown in FIG. 8 should be referred to.

First, a sheet-shaped base member 11 having film thickness 11t of around 100 μm in which an opening portion 3a shown in FIG. 12A is formed is prepared. The base member 11 is formed by injection-mold molding. For example, a core for a die, not shown, which has a reversed-trapezoid shaped cross-section is fabricated in order to form the opening portion 3a having a reversed-trapezoid shaped (V-shaped) cross-section. In this embodiment, the core is processed such that each of the opening portions 3a corresponds to the size of the display region "I". With respect to the employed material, it is just the same as mentioned in the third embodiment (see FIG. 10A). Next, the die is mold-clamped and a polycarbonate resin is sealed therein. After the cooling and the die is opened, the base member 11 including the opening portion 3a is formed, so that the substrate 4 is joined on one surface of the base member 11 and a lid fastening process at the opening portion 3a is performed. Thus, the base member 11 with the substrate shown in FIG. 12A can be formed.

Thereafter, the element member 12 of hardness 20° to 40° is filled into the inside of the opening portion 3a of the base member 11 having the substrate 4 shown in FIG. 12B. For the element member 12, soft transparent material having refractive index close to that of the polycarbonate-based transparent material is used. For example, the element member 12 is formed by coating the whole surface of the base member 11 including the opening portion 3a with transparent silicon rubber member of hardness 20° to 40° as soft transparent resin material having refractive index close to the refractive index of 1.5 of the polycarbonate. Thereafter, the coating material is dried. Thus, the touch-sensitive input sheet 104 with the substrate in which the element member 12 has a reversed-trapezoid shaped cross-section and the whole surface of the base member 11 is covered by the element member 12 is completed.

Thereafter, similarly as the third embodiment, a laminated board provided with the input detection unit 45 on the display unit 29 is prepared. With respect to the used parts for the display unit 29 and the input detection unit 45, they are just the same as explained in the third embodiment. Thereafter, the touch-sensitive input sheet 104 is joined on the input detection unit 45.

Also in this embodiment, after removing the substrate 4 of the rear surface, the touch-sensitive input sheet 104 is joined on the input detection unit 45 through an adhesive agent. Further, the top member 5 is formed on the touch-sensitive input sheet 104. The top member 5 is bonded on the touch-sensitive input sheet 104 through an adhesive agent. Thus, the input device 302 as shown in FIG. 8 and FIG. 11 is completed.

In this manner, according to the input device 302 as the fourth embodiment, the embodiment of the transparent touch-sensitive input sheet 104 relating to the present application is applied. Therefore, even if the display surface is observed as a flat shape, when touching icon images or the like of the various kinds of function keys K1 to K21 or the like which are displayed on the display unit 29 by hand (finger or the like) of the operator and when the finger or the like of the operator slides from the base member 11 to any one of the element members E1 to E21 or the like, it is possible to present an input operation accompanied by a concave shape feeling of being dug-down from the slant-shaped region smoothly along the sliding direction from one portion of the display surface and also, of being dug-up from the slant-shaped region smoothly toward the other portion of the display surface. Thus, it is possible to provide the input device 302 with the touch-sensitive input sheet for icon touch.

Embodiment 5

Figure 13:
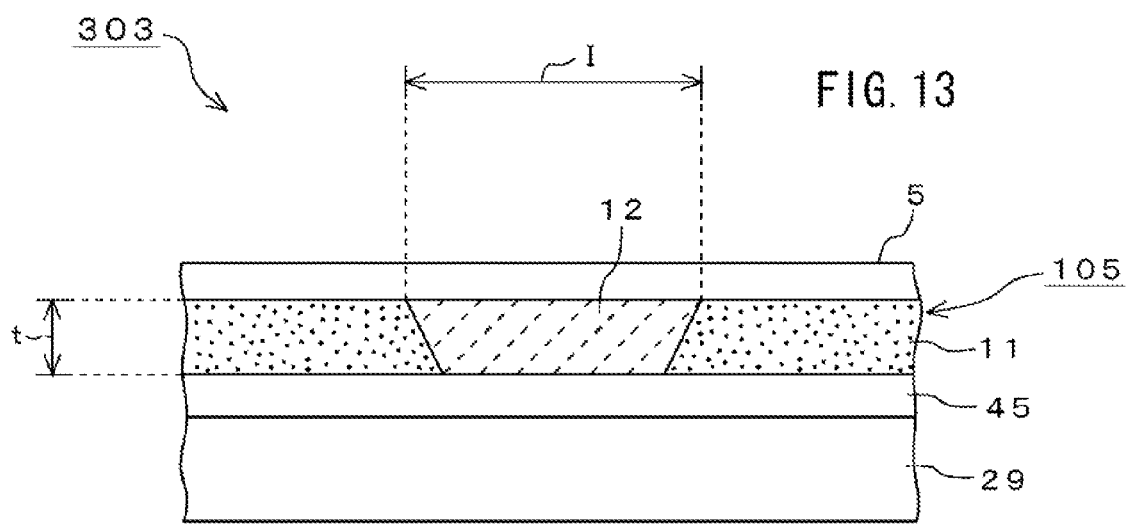
FIG. 13 is a cross-sectional view of one element of an icon image of an input device 303 according to a fifth embodiment showing a constitutional example thereof.

FIG. 13 shows a constitutional example of one element of an icon image of an input device 303 relating to a fifth embodiment.

In this embodiment, there is cited a case in which the hardness of the element member 12 of the touch-sensitive input sheet 105 is set to be low with respect to the hardness of the base member 11 of the touch-sensitive input sheet 105 and in which the element member 12 forms a reversed-trapezoid shaped cross-section and further, the element member 12 does not cover over the whole surface of the base member 11.

According to the input device 303 shown in FIG. 13, the input detection unit 45, the touch-sensitive input sheet 105, and the top member 5 are laminated on the display unit 29 in a similar order as the third embodiment. The touch-sensitive input sheet 105 provided on the input detection unit 45 contains the base member 11 of hardness 60° to 80°, which is formed as a sheet shape, and element members 12 of hardness of around 20° to 40°, each of which forms a block-shape. In the drawing, a symbol, "I" denotes a display region and similarly as the third and forth embodiments, the display region "I" displays, for example, an icon image (input image) of the numeral key K1 of "1" or the like. With respect to the icon images of other function keys K2 to K21, it is just the same as mentioned in the third embodiment that the display region "I" is defined similarly.

In this embodiment, each of the element members 12 includes at least the display region "I" of the icon image displayed on the display unit 29 and is set at a portion surrounded by the base member 11. The fact that the element member 12 shown in FIG. 13 corresponds to each of the element members E1 to E21 facing the icon images of the various kinds of function keys K1 to K21 shown in FIG. 8 is just the same as mentioned in the third embodiment.

In this embodiment, each of the element members 12 has a reversed-trapezoid shaped cross-section and further, the element member 12 does not cover over the whole surface of the base member 11 but covers the display region "I". For the base member 11, for example, polycarbonate-based transparent material having film thickness 11t of around 100 μm, which forms one example of the transparent material, is used. For each of the element members 12, transparent silicon rubber member of hardness 20° to 40° as soft transparent material, which has a refractive index close to that of the polycarbonate-based transparent material, is used and it is planarized such that the film thickness thereof becomes around 100 μm.

When constituting the touch-sensitive input sheet 105 in this manner, similarly as the fourth embodiment, it is possible to present a concave shape feeling of being dug-down from the slant-shaped region smoothly along the sliding direction from one portion of the display surface and also, of being dug-up from the slant-shaped region smoothly toward the other portion of the display surface. Also in this embodiment, it is allowed to insert a surface plate into a position between the input detection unit 45 and the touch-sensitive input sheet 105. With respect to the reason of inserting this display plate, it is just the same as mentioned in the third embodiment.

Figure 14A:
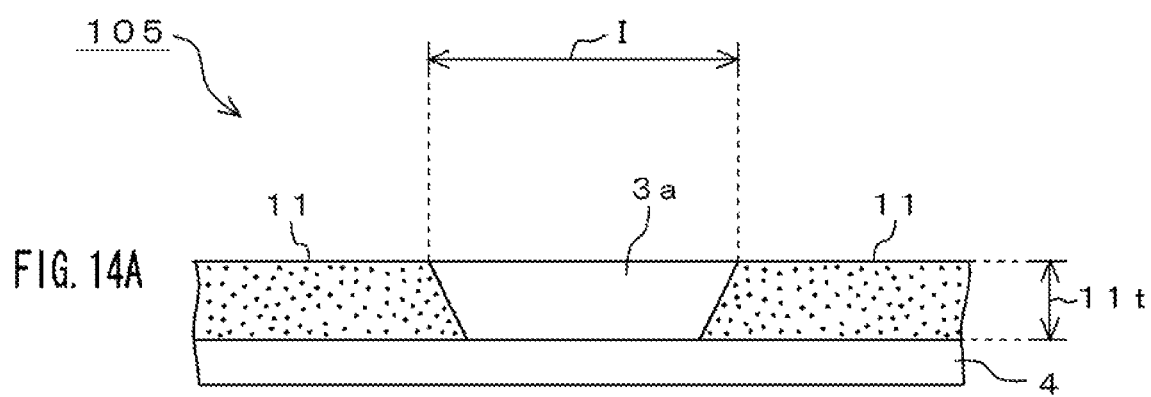
FIGS. 14A to 14C are process diagrams showing a formation example of a touch-sensitive input sheet 105.
Figure 14B:
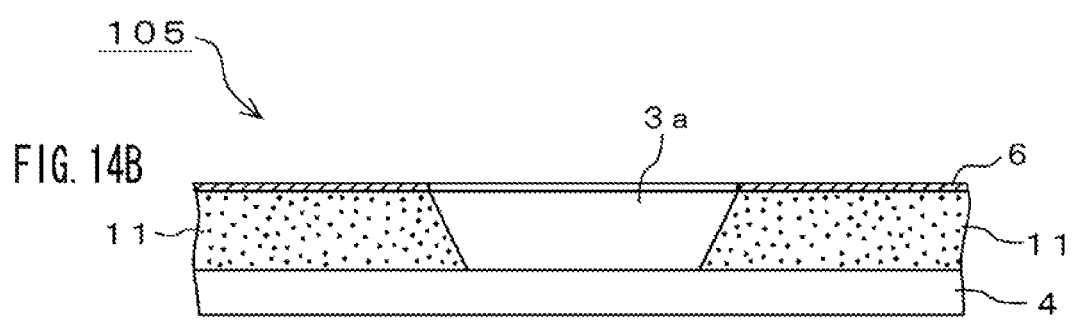
Figure 14C:
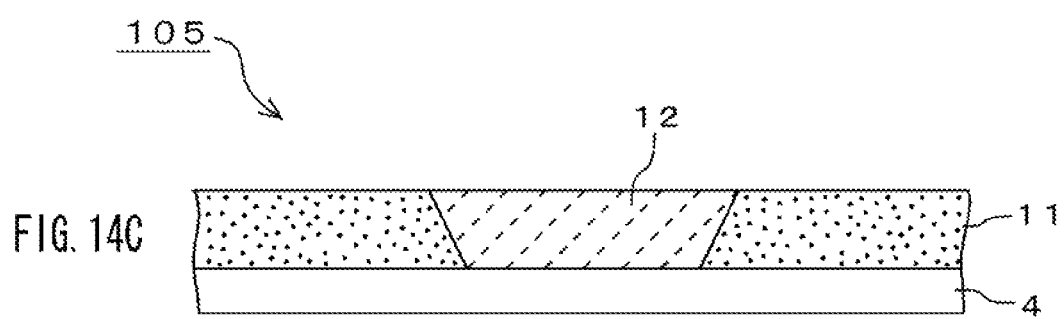

FIGS. 14A to 14C show a formation example of the touch-sensitive input sheet 105. In this embodiment, there is cited a case in which the touch-sensitive input sheet 105 applicable to the input device 303 as shown in FIG. 13 is formed. With respect to the whole constitutional example of the input device 303, the input device 301 shown in FIG. 8 should be referred to.

First, the sheet-shaped base member 11 as shown in FIG. 14A having film thickness 11t of around 100 μm is prepared. Also in this embodiment, the opening portion 3a is set such that it corresponds to the shape and the size of each of the element members E1 to E21 corresponding to the size which includes the icon image of each of the various kinds of function keys K1 to K21. With respect to the employed material of the base member 11, the processing method of the opening portion 3a and the substrate 4, they have been explained in the fourth embodiment, so that the explanation thereof will be omitted (see FIG. 12A).

Thereafter, the element member 12 of hardness 20° to 40° is filled into the inside of the opening portion 3a of the base member 11 having the substrate 4 shown in FIG. 14B. In this embodiment, a mask member 6 is formed at the periphery of the opening portion 3a. For the mask member 6, for example, a masking tape is used. This masking process is performed in order not to coat the element member 12 at the portions other than the opening portion 3a. For the element member 12, soft transparent material having refractive index close to that of the polycarbonate-based transparent material is used. For example, the element member 12 is formed by coating the opening portion 3a cared by the mask member 6 with transparent silicon rubber member of hardness 20° to 40° as the soft transparent resin material having refractive index close to the refractive index of 1.5 of the polycarbonate. Thereafter, the mask member 6 is peeled away and removed from the periphery of the element member 12.

With respect to these processes, they are not limited to the forming method by the sheet-shaped base member 11; the touch-sensitive input sheet 105 may be formed by processing the base member 11 and the element members 12 according to the double mold, the injection-mold molding or the like. Thus, as shown in FIG. 14C, the touch-sensitive input sheet 105 with the substrate in which each of the element members 12 has a reversed-trapezoid shaped cross-section and is filled in the opening portion 3a of the base member 11 on the substrate 4 is completed.

Thereafter, similarly as the third and fourth embodiments, a laminated board provided with the input detection unit 45 on the display unit 29 is prepared. With respect to the used parts of the display unit 29 and the input detection unit 45, they are just the same as explained in the third embodiment. Thereafter, the touch-sensitive input sheet 105 is formed on the input detection unit 45.

Also in this embodiment, after removing the substrate 4 on the rear surface, the touch-sensitive input sheet 105 is joined on the input detection unit 45 through an adhesive agent. Further, the top member 5 is formed on the touch-sensitive input sheet 105. The top member 5 is bonded on the touch-sensitive input sheet 105 through an adhesive agent. Thus, the input device 303 as shown in FIG. 8 and FIG. 13 is completed.

In this manner, according to the input device 303 as the fifth embodiment, the embodiment of the transparent touch-sensitive input sheet 105 relating to the present application is applied, so that even if the display surface is observed as a flat shape, when touching icon images or the like of the various kinds of function keys K1 to K21 or the like which are displayed on the display unit 29 by hand (finger or the like) of the operator and the finger of the operator slides from the base member 11 to any one of the element members E1 to E21 or the like, it is possible to present an input operation accompanied by a concave shape feeling of being dug-down from the slant-shaped region smoothly along the sliding direction from one portion of the display surface and also, of being dug-up from the slant-shaped region smoothly toward the other portion of the display surface. Thus, it is possible to provide the input device 303 with the touch-sensitive input sheet for icon touch.

Embodiment 6

Figure 15:
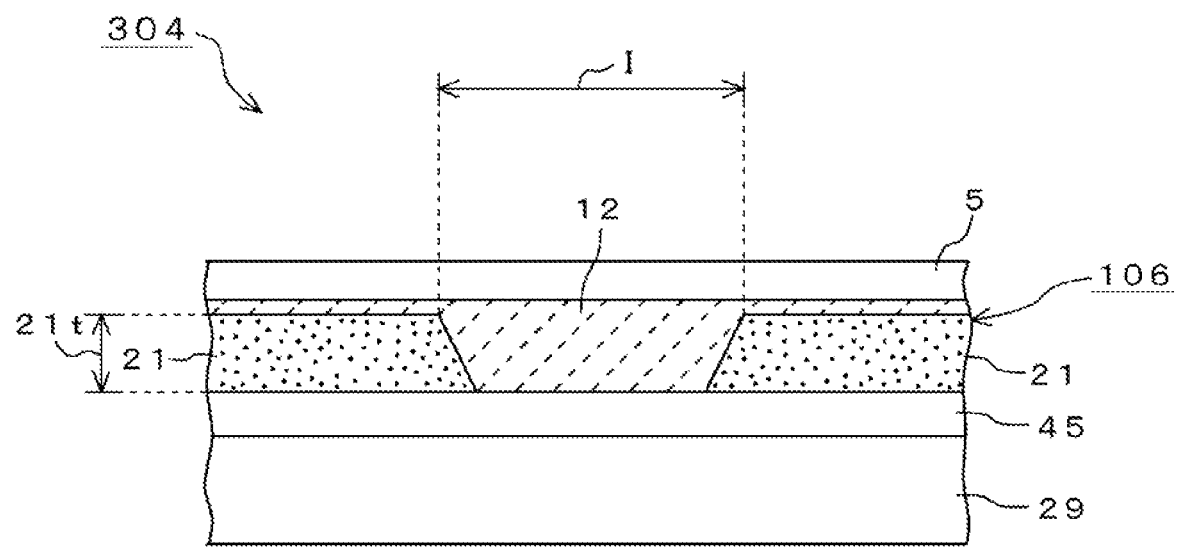
FIG. 15 is a cross-sectional view of one element of an icon image of an input device 304 according to a sixth embodiment showing a constitutional example thereof.

FIG. 15 shows a constitutional example of one element of an icon image of an input device 304 relating to a sixth embodiment. In this embodiment, there is cited a case in which the hardness of the element member 12 is set to be low with respect to the hardness of a base member 21 of the touch-sensitive input sheet 106 and in which a windable roll sheet-shaped material is used for the base member 21 and further, the element member 12 covers over the whole surface of the base member 21.

According to the input device 304 shown in FIG. 15, the input detection unit 45, the touch-sensitive input sheet 106 and the top member 5 are laminated on the display unit 29 in a similar order as the third embodiment. The touch-sensitive input sheet 106 provided on the input detection unit 45 contains the base member 21 of hardness 60° to 80°, which is formed as a sheet shape, and the element members 12 of hardness of around 20° to 40°, which forms a block-shape. In the drawing, a symbol, "I" denotes a display region and the display region "I" displays, for example, an icon image (input image) of the numeral key K1 of "1" or the like. With respect to the icon images of other function keys K2 to K21, the display regions "I" are defined similarly.

Also in this embodiment, similarly as the third to fifth embodiments, an operator pushes down the icon image displayed in the display region "I". The element member 12 is set so as to cover over the whole surface of the base member 21 including the display regions "I" of the icon images displayed on the display unit 29. The element member 12 shown in FIG. 15, similarly as the third to fifth embodiments, corresponds to each of the element members E1 to E21 facing the icon images of the various kinds of function keys K1 to K21 shown in FIG. 8.

For the base member 21, for example, sheet-shaped polycarbonate-based transparent material having film thickness 21*t* of around 100 μm, which forms one example of the transparent material, is used. For the element member 12, transparent silicon rubber member of hardness 20° to 40° as a soft transparent material, which has a refractive index close to that of the polycarbonate-based transparent material is used and the film thickness thereof is designed to be around 100 μm. When constituting the touch-sensitive input sheet 106 in this manner, similarly as the fourth and fifth embodiments, it is possible to present a concave shape feeling of being dug-down from the slant-shaped region smoothly along the sliding direction from one portion of the display surface and also, of being dug-up from the slant-shaped region smoothly toward the other portion of the display surface. Also in this embodiment, it is allowed to insert a surface plate into a position between the input detection unit 45 and the touch-sensitive input sheet 106.

FIGS. 16A to 16D show a formation example of the touch-sensitive input sheet 106. In this embodiment, there is cited a case in which the touch-sensitive input sheet 106 applicable to the input device 304 as shown in FIG. 15 is formed by the sheet-shaped base member 21. With respect to the whole constitutional example of the input device 304, the input device 301 shown in FIG. 8 should be referred to.

Figure 16A:
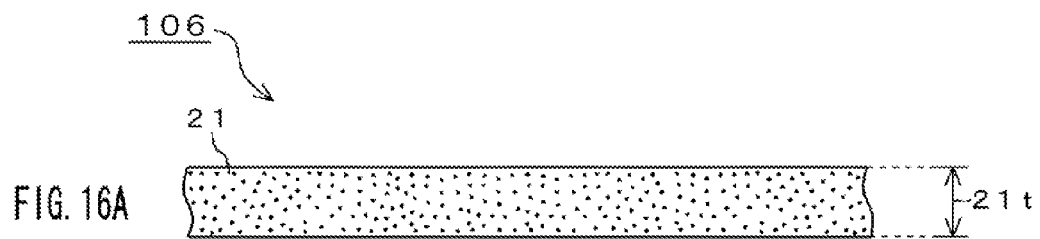
FIGS. 16A to 16D are process diagrams showing a formation example of a touch-sensitive input sheet 106.

First, the sheet-shaped base member 21 having film thickness 21*t* of around 100 μm shown in FIG. 16A is prepared. For the base member 21, for example, material of hardness 60° to 80° which is obtained by processing polycarbonate-based transparent material having transmissivity of 1.5 and refractive index of 1.5 concurrently into a sheet shape by well-known technology, which forms one example of the transparent material, is used. The sheet-shaped base member 21 is a windable member.

Figure 16B:
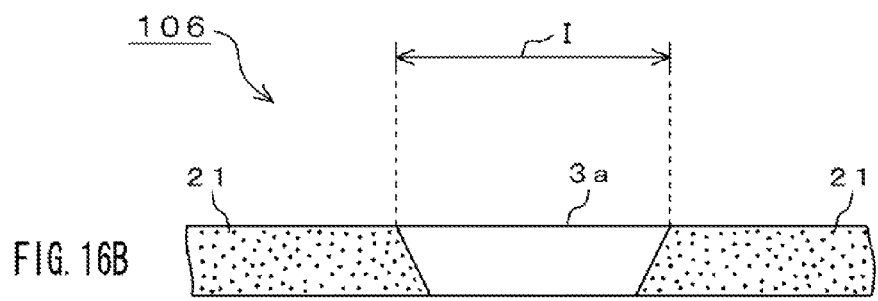

Next, an opening portion 3*a* is formed in the base member 21 shown in FIG. 16B. The opening is formed such that the opening portion 3*a* corresponds to the size of the display region "I". In the above-mentioned embodiment, it is set such that the opening portion 3*a* corresponds to each of the shapes and the sizes of the element members E1 to E21 corresponding to the sizes which include the icon images of the various kinds of function keys K1 to K21. The opening is formed with respect to each of the element members E1 to E12 and each of the element members E15 to E19 such that cylindrical opening portion 3*a* can be obtained at predetermined region of the base member 21 and the opening is formed with respect to each of the element members E13, E14, E20, E21 such that rectangular opening portion, which is not shown, can be obtained at predetermined region thereof. For example, the opening portion 3*a* of a reversed-truncated-cone shaped cross-section, a reversed-trapezoid shaped cross-section or the like is formed in the base member 21 by using a sickle-shaped cutting rotary blade or a punch processing machine having a quadrate-rectangle shaped cutting blade.

Figure 16C:
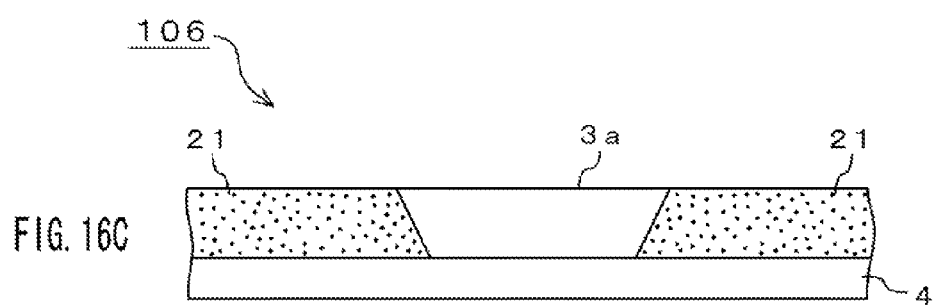
Figure 16D:
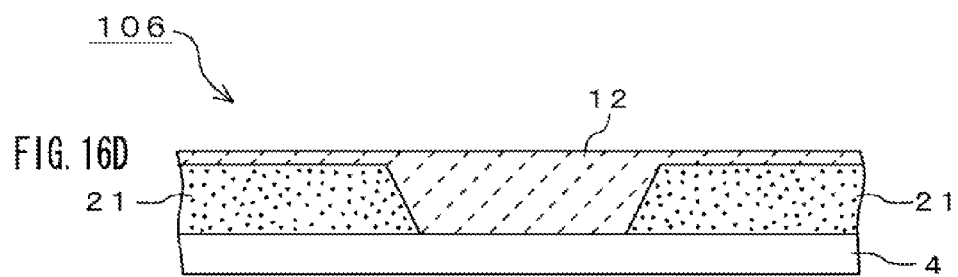

Further, after providing a surface plate or a temporary substrate 4 on one surface of the base member 21 in which a plurality of opening portions 3*a* are formed, the element member 12 of hardness 20° to 40° is filled into the inside of each of the opening portions 3*a* shown in FIG. 16C. In this embodiment, for the element member 12, soft transparent material having refractive index close to that of the polycarbonate-based transparent material is used. For example, the element member 12 is formed by coating the whole surface of the base member 21 including the opening portions 3*a* with the transparent silicon rubber member of hardness 20° to 40° as the soft transparent resin material having refractive index close to the refractive index of 1.5 of the polycarbonate. Thereafter, the coating material is dried. Thus, the touch-sensitive input sheet 106 with the substrate is completed in which the element member 12 has a reversed-trapezoid shaped cross-section and the whole surface of the base member 21 is covered by the element member 12.

Thereafter, similarly as the third to fifth embodiments, a laminated board provided with the input detection unit 45 on the display unit 29 is prepared. With respect to the used parts of the display unit 29 and the input detection unit 45, they are just the same as explained in the third embodiment. Thereafter, the touch-sensitive input sheet 106 is formed on the input detection unit 45.

Also in this embodiment, after removing the substrate 4 on the rear surface, the touch-sensitive input sheet 106 is joined on the input detection unit 45 through an adhesive agent. Further, the top member 5 is formed on the touch-sensitive input sheet 106. The top member 5 is bonded on the touch-sensitive input sheet 106 through an adhesive agent. Thus, the input device 304 as shown in FIG. 15 is completed.

In this manner, according to the input device 304 as the sixth embodiment, the embodiment of the transparent touch-sensitive input sheet 106 relating to the present application is applied, so that even if the display surface is observed as a flat shape, when touching icon images or the like of the various kinds of function keys K1 to K21 or the like which are displayed on the display unit 29 by hand (finger or the like) of the operator and the finger or the like of the operator slides from the base member 21 to any one of the element members E1 to E21 or the like, it is possible to present an input operation accompanied by a concave shape feeling of being dug-down from the slant-shaped region smoothly along the sliding direction from one portion of the display surface and also, of being dug-up from the slant-shaped region smoothly toward the other portion of the display surface. Thus, it is possible to provide the input device 304 with the touch-sensitive input sheet for icon touch.

Embodiment 7

FIG. 17 shows a constitutional example of one element of an icon image of an input device 305 relating to a seventh embodiment.

In this embodiment, there is cited a case in which the hardness of the element member 12 is set to be low with respect to the hardness of the base member 21 of the touch-sensitive input sheet 107 and in which the element member 12 forms a reversed-trapezoid shaped cross-section and the element member 12 does not cover over the whole surface of the base member 21.

According to the input device 305 shown in FIG. 17, the input detection unit 45, the touch-sensitive input sheet 107, and the top member 5 are laminated on the display unit 29 in a similar order as the third embodiment. The touch-sensitive input sheet 107 provided on the input detection unit 45 contains the base member 21 of hardness 60° to 80°, which is formed as a sheet shape, and element members 12 of hardness of around 20° to 40°, each of which forms a block-shape. In the drawing, a symbol, "I" denotes a display region and similarly as the third embodiment, the display region "I" displays an icon image (input image) of the numeral key K1 of "1" or the like. With respect to the icon images of other function keys K2 to K21, it is just the same as mentioned in the third embodiment that the display regions "I" are defined similarly.

In this embodiment, each of the element members 12 includes at least the display region "I" of the icon image displayed on the display unit 29 and is set at a portion surrounded by the base member 21. The fact that the element member 12 shown in FIG. 17 corresponds to each of the element members E1 to E21 facing the icon images of the various kinds of function keys K1 to K21 shown in FIG. 8 is just the same as mentioned in the third embodiment.

In this embodiment, each of the element members 12 has a reversed-trapezoid shaped cross-section and further, the element member does not cover over the whole surface of the base member 21 but each of the element members 12 is provided only on the display region "I". For the base member 21, for example, sheet-shaped polycarbonate-based transparent material having film thickness 21*t* of around 100 μm, which forms one example of the transparent material, is used. For the element member 12, transparent silicon rubber member of hardness 20° to 40° as the soft transparent material, which has a refractive index close to that of the polycarbonate-based transparent material is used, and it is planarized such that the film thickness 21*t* thereof becomes around 100 [μm].

When constituting the touch-sensitive input sheet 107 in this manner, similarly as the fourth embodiment to sixth embodiments, it is possible to present a concave shape feeling of being dug-down from the slant-shaped region smoothly along the sliding direction from one portion of the display surface and also, of being dug-up from the slant-shaped region smoothly toward the other portion of the display surface. Also in this embodiment, it is allowed to insert a surface plate into a position between the input detection unit 45 and the touch-sensitive input sheet 107. With respect to the reason of inserting this display plate, it is just the same as mentioned in the third embodiment.

FIGS. 18A to 18D show a formation example of the touch-sensitive input sheet 107. In this embodiment, there is cited a case in which the touch-sensitive input sheet 107 applicable to the input device 305 as shown in FIG. 17 is formed. With respect to the whole constitutional example of the input device 305, the input device 301 shown in FIG. 8 should be referred to.

Figure 18A:
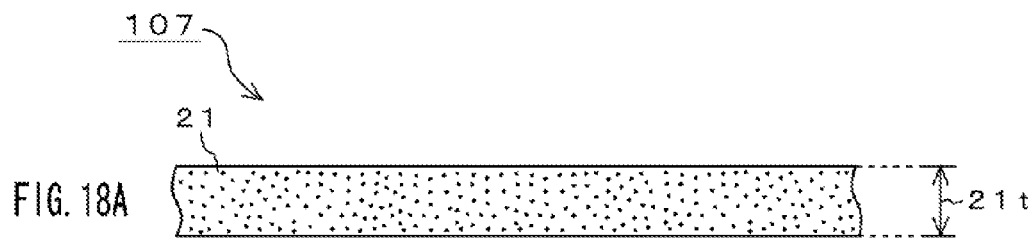
FIGS. 18A to 18D are process diagrams showing a formation example of a touch-sensitive input sheet 107.

First, the sheet-shaped base member 21 having film thickness 21*t* of round 100 μm as shown in FIG. 18A is prepared. Also in this embodiment, opening portion 3*a* is set such that the opening portion 3*a* corresponds to each of the shapes and each of the sizes of the element members E1 to E21 corresponding to the sizes which include the icon images of the various kinds of function keys K1 to K21. With respect to the employed material of the base member 21, the processing method of the opening portion 3*a* and the substrate 4, they were explained in the fourth embodiment, so that the explanation thereof will be omitted (see FIG. 12A).

Figure 18B:
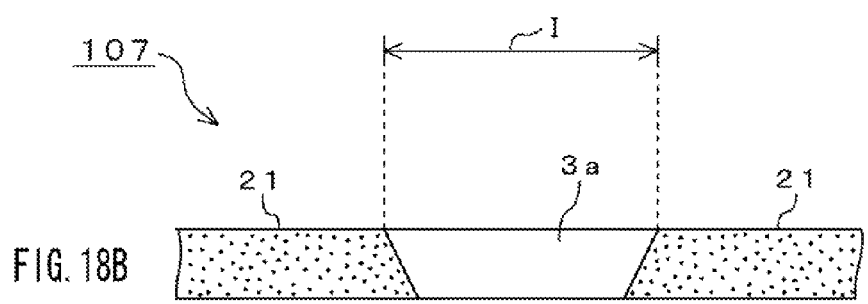
Figure 18C:
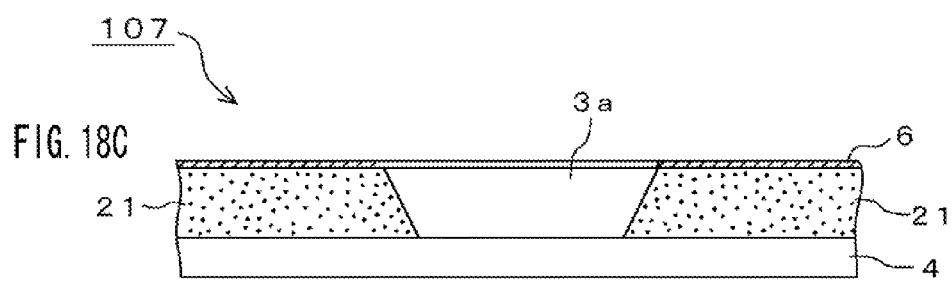
Figure 18D:
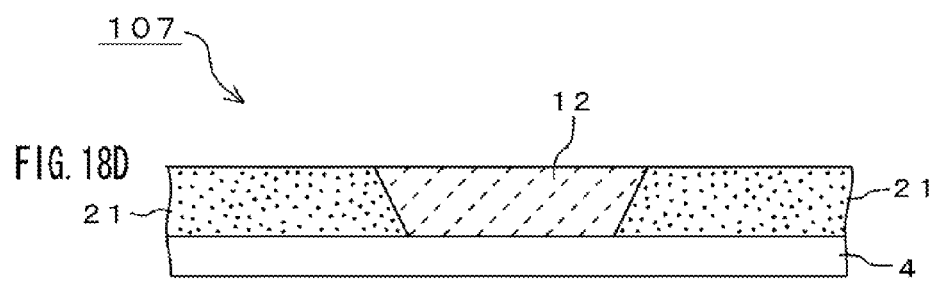

Thereafter, the element member 12 of hardness 20° to 40° is filled into the inside of each of the opening portions 3*a* of the base member 21 having the substrate 4 shown in FIG. 18B. Also in this embodiment, the mask member 6 of a masking tape or the like shown in FIG. 18C is formed at the periphery of each of the opening portions 3*a*. The masking process is performed in order not to coat the element member 12 at the portions other than the opening portion 3*a*. For the element member 12, soft transparent material having refractive index close to that of the polycarbonate-based transparent material is used. For example, the element member 12 is formed by coating the opening portion 3*a* cared by the mask member 6 with transparent silicon rubber member of hardness 20° to 40° as the soft transparent resin material having refractive index close to the refractive index of 1.5 of the polycarbonate. Thereafter, the mask member 6 is peeled away and removed from the periphery of the element member 12. Thus, the touch-sensitive input sheet 104 with the substrate is completed in which the element member 12 has the reversed-trapezoid shaped cross-section and the element member 12 does not cover the surface on the base member 21 as shown in FIG. 18D.

Thereafter, similarly as the third to sixth embodiments, a laminated board provided with the input detection unit 45 on the display unit 29 is prepared. With respect to the used parts for the display unit 29 and the input detection unit 45, they are just the same as explained in the third embodiment. Then, the touch-sensitive input sheet 107 is formed on the input detection unit 45.

Also in this embodiment, after removing the substrate 4 on the rear surface, the touch-sensitive input sheet 107 is joined on the input detection unit 45 through an adhesive agent. Further, the top member 5 is formed on the touch-sensitive input sheet 107. The top member 5 is bonded on the touch-sensitive input sheet 107 through an adhesive agent. Thus, the input device 305 as shown in FIG. 17 is completed.

In this manner, according to the input device 305 as the seventh embodiment, the embodiment of the transparent touch-sensitive input sheet 107 relating to the present application is applied, so that even if the display surface is observed as a flat shape, when touching icon images or the like of the various kinds of function keys K1 to K21 or the like which are displayed on the display unit 29 by hand (finger or the like) of the operator and the finger or the like of the operator slides from the base member 21 to any one of the element members E1 to E21 or the like, it is possible to present an input operation accompanied by a concave shape feeling of being dug-down from the slant-shaped region smoothly along the sliding direction from one portion of the display surface and also, of being dug-up from the slant-shaped region smoothly toward the other portion of the display surface. Thus, it is possible to provide the input device 305 with the touch-sensitive input sheet for icon touch.

Embodiment 8

Figure 19:
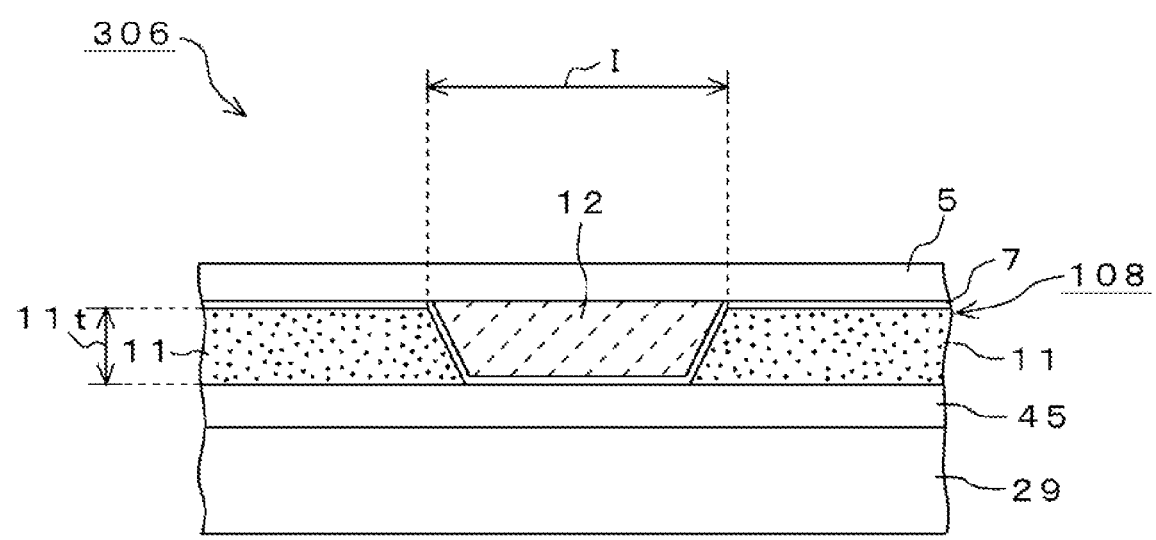
FIG. 19 is a cross-sectional view of one element of an icon image of an input device 306 according to an eighth embodiment showing a constitutional example thereof.

FIG. 19 shows a constitutional example of one element of an icon image of an input device 306 relating to an eighth embodiment.

In this embodiment, there is cited a case in which the hardness of the element member 12 of a touch-sensitive input sheet 108 is set to be low with respect to the hardness of the base member 11 of the touch-sensitive input sheet 108 and in which the element member 12 has a reversed-trapezoid shaped cross-section and an anti-reflective boundary surface thin film (Anti-Reflective: AR, so referred to as AR thin film 7 hereinafter) provided between the element member 12 and the base member 11 is provided on the whole surface of the base member 11.

According to the input device 306 shown in FIG. 19, the input detection unit 45, the touch-sensitive input sheet 108, and the top member 5 are laminated on the display unit 29 in a similar order as the third embodiment. The touch-sensitive input sheet 108 provided on the input detection unit 45 contains the base member 11 of hardness 20° to 40°, which is formed as a sheet shape, the AR thin film 7 having film thickness of around a few angstrom, and element members 12 of hardness of around 60° to 80°, each of which forms a block-shape. In the drawing, a symbol, "I" denotes a display region and similarly as the third embodiment, the display region "I" displays, for example, an icon image (input image) of the numeral key K1 of "1" or the like. With respect to the icon images of other function keys K2 to K21, it is just the same as mentioned in the third embodiment that the display regions "I" are defined similarly.

In this embodiment, the AR thin film 7 is used for preventing diffused reflection, includes the display region "I" of the icon image displayed on the display unit 29, and is provided on the whole surface of the base member 11. The AR thin film 7 shown in FIG. 19 is provides so as to correspond to each of the element members E1 to E21 facing the icon images of the various kinds of function keys K1 to K21 shown in FIG. 8. The AR thin film 7 is formed on the inside of the opening portion 3a of the base member 11 and on the whole surface of the base member 11 by a sputter processing method, a DIP processing method, a coating method or the like when fabricating the touch-sensitive input sheet 108.

The sputter processing method is one of representative dry methods of thin-film production which is classified in a vacuum evaporation method and is a method in which a metal desired to be deposited as a thin film is located as a target material in a vacuum chamber, a high voltage is applied between the sample and the electrode, a rare gas element (generally, argon is used) is ionized and when making plasmanized electrons collide with the target material, atoms on the target surface are flicked off and reach the substrate so as to accomplish the film-making.

In this embodiment, there can be also utilized a reactive sputter method in which gas is introduced into the vacuum chamber and by reacting this with the flicked off metal, a chemical compound is film-made on the sample. This method draws an expert's attention as a production technology of a new alloy or an artificial lattice. As the reactive sputter method, there exist systems of two poles, three poles, four poles, RF, magnetron, facing target, Mirror Tron, ECR, ion beam, dual ion beam and the like. For the target material, magnesium (Mg) or silicon (Si) is used and for the introduction gas, fluorine (F) or oxygen (O) is used.

The DIP processing method is one of wet methods for forming the AR film and is a method in which a coating film is formed by directly dipping a base member in a solution system of a fluorine resin dissolved with a film material (dip in running water) and thereafter, the coating film is pulled up from the inside of the solution and is hardened by heated air or the like. The coating method is used in which a coating film is formed by coating a fluorine resin solution dissolved with a film material on a base member and thereafter, the above-mentioned tail-end process is employed.

Also in this embodiment, each of the element members 12 is provided only in the display region "I" of the icon images displayed on the display unit 29. The fact that each of the element members 12 shown in FIG. 19 corresponds to each of the element members E1 to E21 facing the icon images of the various kinds of function keys K1 to K21 shown in FIG. 8 is just the same as mentioned in the third embodiment. For the base member 11, for example, polycarbonate-based transparent material having film thickness 1 it of around 100 μm, which forms one example of the transparent material, is used. For the element member 12, transparent silicon rubber member of hardness 20° to 40° as the soft transparent material, which has a refractive index close to that of the polycarbonate-based transparent material is used, and the film thickness thereof is designed to be around 100 μm.

When the touch-sensitive input sheet 108 is formed by introducing the AR thin film 7 in this manner, it is possible to couple the joining boundary surface between each of the element members 12 and the base member 11 strongly. Furthermore, similarly as the fourth embodiment, it is possible to present a concave shape feeling of being dug-down from the slant-shaped region smoothly along the sliding direction from one portion of the display surface and also, of being dug-up from the slant-shaped region smoothly toward the other portion of the display surface. Also in this embodiment, it is allowed to insert a surface plate into a position between the input detection unit 45 and the touch-sensitive input sheet 108. With respect to the reason of inserting this display plate, it is just the same as mentioned in the third embodiment.

FIGS. 20A to 20D show a formation example of the touch-sensitive input sheet 108. In this embodiment, there is cited a case in which the touch-sensitive input sheet 108 applicable to the input device 306 as shown in FIG. 19 is formed. With respect to the whole constitutional example of the input device 306, the input device 301 shown in FIG. 8 should be referred to.

First, the sheet-shaped base member 11 having film thickness 11t of around 100 μm, which has opening portions 3a shown in FIG. 20A, is prepared. The base member 11 with the opening portions 3a and the substrate 4 shown in FIG. 20A is obtained by employing the injection-mold molding using a die explained in the fourth embodiment. Thereafter, the AR thin film 7 is formed on the inside of each of the opening portions 3a of the base member 11 shown in FIG. 20B. The AR thin film 7 is applied on the inside of each of the opening portions 3a of the base member 11 by, for example, a sputter processing method. In this embodiment, the AR thin film 7 having film thickness of around a few angstrom is deposited on the inclined surface portions and the bottom surface portion of each of the opening portion 3a and the whole surface of the base member 11. The AR thin film 7 may be deposited by a vacuum evaporation method.

For example, the base member 11 with the opening portions 3a and the substrate 4 is set in a vacuum chamber of a sputter device. Thereafter, electrons by glow discharge or the like collide with gas molecules introduced in the vacuum chamber and they are plasmanized. At that time, potential difference is applied between the base member 11 and a thin film material (AR member) of Mg, Si or the like which becomes the target material, so that it happens that the electrons are accelerated toward the thin film material. Then, the electrons colliding with the thin film material enables the target particles flying in all directions to be attached to the base member 11. Thus, it is possible to deposit the AR thin film 7 having film thickness of around a few angstrom on the inclined surface portions and the bottom surface portion of each of the opening portions 3a and the whole surface of the base member 11.

Besides this, it is also allowed for the AR thin film 7 to be deposited by an ECR sputter processing method. According to the ECR sputter, plasma is generated by applying energy to gas molecules in a vacuum chamber by using a microwave without using glow discharge. This plasma rotates in the magnetic field and does not leak out of the vacuum chamber, so that it is possible to confine plasma in a very dense state. Parallel electrode plates are arranged in the direction of a target material and by applying electric potential to them, electrons are accelerated toward the thin film material and it happens that target particles flown in all directions by electrons which collide with the thin film material are attached to the base member 11. Thus, it is possible for the AR thin film 7 of the film thickness of around a few angstrom to be deposited on the inclined surface portions, the bottom surface portion of each of the opening portions 3a and the whole surface of the base member 11.

Thereafter, the base member 11 in which the AR thin film 7 is deposited on each of the opening portion 3s and on the whole surface is taken out from the sputter device and the element member 12 of hardness 20° to 40° is filled into only the inside of each of the opening portions 3a. In this embodiment, a mask member 6 is formed at the periphery of each of the opening portions 3a. For the mask member 6, for example, a masking tape is used. This masking process is applied so as to not coat a portion other than the opening portions 3a with the element member 12.

For the element member 12, soft transparent material which has a refractive index close to that of polycarbonate-based transparent material is used. For example, the element member 12 is formed by coating the opening portions 3a cared by the mask member 6 with transparent silicon rubber member of hardness 20° to 40° for the soft transparent material which has a refractive index close to the refractive index of 1.5 of the polycarbonate. Thereafter, the mask member 6 is peeled off from the periphery of the element member 12 and removed. Thus, the touch-sensitive input sheet 108 with substrate as shown in FIG. 20D is completed in which the element member 12 has a reversed-trapezoid shaped cross-section and the AR thin film 7 provided between the element member 12 and the base member 11 is provided on the whole surface of the base member 11.

Thereafter, similarly as the third to seventh embodiments, a laminated board provided with the input detection unit 45 on the display unit 29 is prepared. With respect to using parts of the display unit 29 and the input detection unit 45, it is just the same as explained in the third embodiment. Then, the touch-sensitive input sheet 108 is formed on the input detection unit 45.

Also in this embodiment, after removing the substrate 4 of the rear surface, the touch-sensitive input sheet 108 is joined on the input detection unit 45 through an adhesive agent. Further, a top member 5 is formed on the touch-sensitive input sheet 108. The top member 5 is bonded on the touch-sensitive input sheet 108 through an adhesive agent. Thus, the input device 306 as shown in FIG. 19 is completed.

In this manner, according to the input device 306 for the eighth embodiment, the embodiment of the transparent touch-sensitive input sheet 108 relating to the present application is applied, so that even if the display surface is observed as a flat shape, when the icon image or the like of the various kinds of function keys K1 to K21 or the like which is displayed on the display unit 29 is touched by hand (finger or the like) of the operator and the finger or the like of the operator slides from the base member 11 to any one of the element members E1 to E21 or the like, it is possible to present an input operation accompanied by the concave shape feeling of being dug-down smoothly from the slant-shaped region along the sliding direction from one portion of the display surface and also, of being dug-up smoothly from the slant-shaped region toward the other portion of the display surface. Furthermore, it is possible to couple the joining boundary surfaces of the element member 12 and the base member 11 strongly and it is also possible to prevent the diffused reflection. This enables the input device 306 with touch-sensitive input sheet for icon touch of high degree of reliability to be presented.

Embodiment 9

Figure 21:
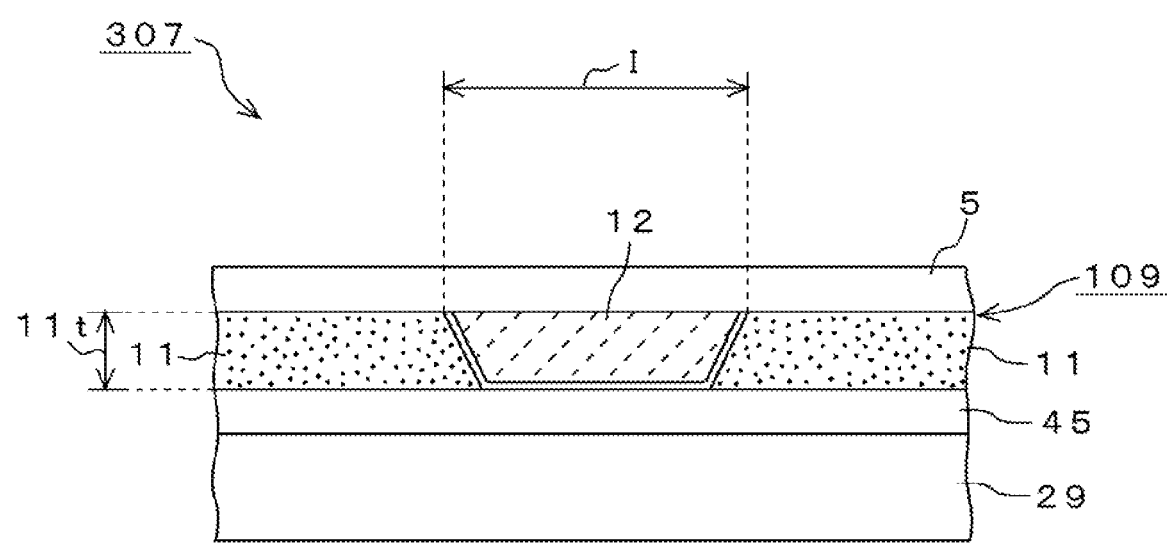
FIG. 21 is a cross-sectional view of one element of an icon image of an input device 307 according to a ninth embodiment showing a constitutional example thereof.

FIG. 21 shows a constitutional example of one element of an icon image of an input device 307 relating to a ninth embodiment.

In this embodiment, there is cited a case in which the hardness of an element member 12 of a touch-sensitive input sheet 109 is set to be low with respect to the hardness of a base member 11 of the touch-sensitive input sheet 109 and in which the element member 12 has a reversed-trapezoid shaped cross-section and an AR thin film 7 provided between the element member 12 and the base member 11 is provided at only the display region.

According to the input device 307 shown in FIG. 21, the input detection unit 45, the touch-sensitive input sheet 109, and the top member 5 are laminated on the display unit 29 in a similar order as the third embodiment. The touch-sensitive input sheet 109 provided on the input detection unit 45 contains the base member 11 of hardness 20° to 40° which is formed as a sheet-shape, the AR thin film 7 having the film thickness of around a few angstrom, and the element members 12 of hardness of around 60° to 80°, each of which forms a block-shape. A symbol, "I" in the drawing is a display region, similarly as the third embodiment, the display region "I" displays, for example, an icon image (input image) of the numeral key K1 of "1" or the like. With respect to the icon images of other function keys K2 to K21, it is just the same as mentioned in the third embodiment that they are defined similarly.

In this embodiment, the AR thin film 7 is used in order to prevent diffused reflection and is provided at only the display region "I" of the icon image displayed on the display unit 29. The AR thin film 7 shown in FIG. 21 is provided so as to correspond to each of the element members E1 to E21 facing the icon image of the various kinds of function keys K1 to K21 shown in FIG. 8. The AR thin film 7 is formed on the inside of each of the opening portions 3a of the base member 11 by the sputter processing method, the DIP processing method, the coating method or the like, similarly as the eighth embodiment, when creating the touch-sensitive input sheet 109.

Also in this embodiment, each of the element members 12 is provided at only the display region "I" of the icon image which is displayed on the display unit 29. The fact that each of the element members 12 shown in FIG. 21 corresponds to each of the element members E1 to E21 facing the icon image of the various kinds of function keys K1 to K21 shown in FIG. 8 is just the same as mentioned in the third embodiment. For the base member 11, for example, polycarbonate-based transparent material having the film thickness 1 it of around 100 μm, which forms one example of the transparent material, is used. For each of the element members 12, transparent silicon rubber member of hardness 20° to 40° for the soft transparent material, which has a refractive index close to that of the polycarbonate-based transparent material, is used, and the film thickness thereof becomes around 100 μm.

When the touch-sensitive input sheet 109 is formed by introducing the AR thin film 7 in this manner, it is possible to couple the joining boundary surface of the element member 12 and the base member 11 in the opening portion 3a strongly. Furthermore, similarly as the fourth embodiment, it is possible to present the concave shape feeling of being dug-down smoothly from the slant-shaped region along the sliding direction from one portion of the display surface and also, of being dug-up smoothly from the slant-shaped region toward the other portion of the display surface. Also in this embodiment, it is also allowed to insert a surface plate into a position between the input detection unit 45 and the touch-sensitive input sheet 109. With respect to the insertion reason of this display plate, it is just the same as mentioned in the third embodiment.

FIGS. 22A to 22D show a formation example of the touch-sensitive input sheet 109. In this embodiment, there is cited a case in which the touch-sensitive input sheet 109 which is applicable to the input device 307 as shown in FIG. 21 is formed. With respect to the whole constitutional example of the input device 307, the input device 301 shown in FIG. 8 should be referred to.

First, the sheet-shaped base member 11 having the film thickness 1 it of around 100 μm, which has the opening portions 3a shown in FIG. 22A, is prepared. The base member 11 with substrate and the opening portions 3a shown in FIG. 22A is obtained by injection-mold molding by using a die which is explained in the fourth embodiment.

Thereafter, a first mask member 6a is formed at the periphery of each of the opening portions 3a of the base member 11 shown in FIG. 22B. For example, a thermostable masking tape is used for the first mask member 6a. This masking process is applied so as not to deposit a thin film material on a portion other than the opening portions 3a.

Next, the base member 11 cared by the first mask member 6a is set to a sputter device, which is not shown, and an AR thin film 7 as shown in FIG. 22C is formed on the whole surface. With respect to a thin film material, a target material of Mg, Si or the like which is used in the eighth embodiment is used. The AR thin film 7 is formed by depositing this target material on the opening portions 3a cared by the first mask member 6a in the sputter device. Thereafter, the base member 11 in which the thin film shaped AR thin film 7 is deposited on the opening portions 3a and the whole surface is taken out from the sputter device, and the first mask member 6a is peeled off from the periphery of each of the opening portions 3a and removed. Thus, it also is possible to remove the AR thin film 7 which is deposited on the first mask member 6a. The AR thin film 7 may be formed by a vacuum evaporation method.

Thereafter, the element member 12 of hardness 20° to 40° is filled into only the inside of each of the opening portions 3a of the base member 11. In this embodiment, as shown in FIG. 22D, a second mask member 6b is formed at the periphery of each of the opening portions 3a. For example, a masking tape is used for the second mask member 6b. This masking process is applied so as not to coat a portion other than the opening portions 3a with the element member 12. For the element member 12, soft transparent material which has a refractive index close to that of a polycarbonate-based transparent material is used. For example, each of the element members 12 is formed by coating each of the opening portions 3a cared by the second mask member 6b with transparent silicon rubber member of hardness 20° to 40° for the soft transparent material which has a refractive index close to the refractive index of 1.5 of the polycarbonate. Thereafter, the second mask member 6b is peeled off from the periphery of each of the element members 12 and removed. Thus, the touch-sensitive input sheet 109 with substrate in which each of the element members 12 has a reversed-trapezoid shaped cross-section and the AR thin film 7 is provided between the element member 12 and the base member 11 in each of the opening portions 3a is completed.

Thereafter, similarly as the third to eighth embodiments, a laminated board provided with the input detection unit 45 on the display unit 29 is prepared. With respect to using parts of the display unit 29 and the input detection unit 45, it is just the same as explained in the third embodiment. Then, the touch-sensitive input sheet 109 is formed on the input detection unit 45.

Also in this embodiment, after removing the substrate 4 of the rear surface, the touch-sensitive input sheet 109 is joined on the input detection unit 45 through an adhesive agent. Further, a top member 5 is formed on the touch-sensitive input sheet 109. The top member 5 is bonded on the touch-sensitive input sheet 109 through an adhesive agent. Thus, the input device 307 as shown in FIG. 21 is completed.

In this manner, according to the input device 307 for the ninth embodiment, the embodiment of the transparent touch-sensitive input sheet 109 relating to the present application is applied, so that even if the display surface is observed as a flat shape, when the icon image or the like of the various kinds of function keys K1 to K21 or the like which is displayed on the display unit 29 is touched by hand (finger or the like) of the operator and when the finger or the like of the operator slides from the base member 11 to any one of the element members E1 to E21 or the like, it is possible to present an input operation accompanied by the concave shape feeling of being dug-down smoothly from the slant-shaped region along the sliding direction from one portion of the display surface and also, of being dug-up smoothly from the slant-shaped region toward the other portion of the display surface. Furthermore, it is possible to couple the joining boundary surface of the element member 12 and the base member 11 in each of the opening portions 3a strongly and it is also possible to prevent the diffused reflection. Thus, it is possible to provide the input device 307 with touch-sensitive input sheet for icon touch of high degree of reliability.

Embodiment 10

Figure 23:
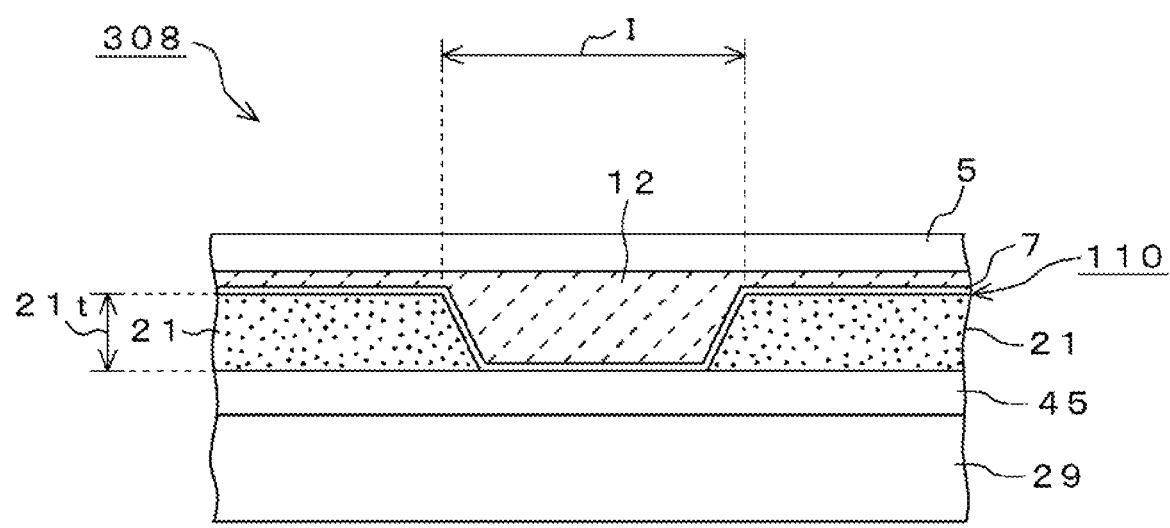
FIG. 23 is a cross-sectional view of one element of an icon image of an input device 308 according to a tenth embodiment showing a constitutional example thereof.

FIG. 23 shows a constitutional example of one element of an icon image of an input device 308 relating to a tenth embodiment. In this embodiment, there is cited a case in which the hardness of an element member 12 of a touch-sensitive input sheet 110 is set to be low with respect to the hardness of a base member 21 of the touch-sensitive input sheet 110 and in which a windable roll sheet-shaped material is used for the base member 21 and further an AR thin film 7 and the element member 12 are provided on the whole surface of the base member 21.

According to the input device 308 shown in FIG. 23, the input detection unit 45, the touch-sensitive input sheet 110, and the top member 5 are laminated on the display unit 29 in a similar order as the third embodiment. The touch-sensitive input sheet 110 provided on the input detection unit 45 contains the base member 21 of hardness 60° to 80°, which is formed as a sheet-shape, the AR thin film 7 having the film thickness of around a few angstrom, and the element member 12 of hardness of around 20° to 40°, which forms a block-shape. A symbol, "I" in the drawing denotes a display region, and the display region, "I" displays, for example, an icon image (input image) of the numeral key K1 of "1" or the like. Similarly, the display region "I" is defined with respect to the icon image of each of the other function keys K2 to K21.

Also in this embodiment, similarly as the third to ninth embodiments, the operator pushes down the icon image displayed on the display region "I". The element member 12 is set at a portion including the display region "I" of the icon image displayed on the display unit 29 and the whole surface of the base member 21. The element member 12 shown in FIG. 23, similarly as the third to ninth embodiments, corresponds to each of the element members E1 to E21 facing the icon image of the various kinds of function keys K1 to K21 shown in FIG. 8.

For the base member 21, for example, sheet-shaped and polycarbonate-based transparent material of the film thickness 21t of around 100 µm, which forms one example of the transparent material, is used. For the element member 12, transparent silicon rubber member of hardness 20° to 40° for a soft transparent material, which has a refractive index close to that of the polycarbonate-based transparent material, is used, and the film thickness thereof becomes around 100 µm.

In this manner, when constituting the touch-sensitive input sheet 110, similarly as the fourth to ninth embodiments, it is possible to present the concave shape feeling of being dug-down smoothly from the slant-shaped region along the sliding direction from one portion of the display surface and also, of being dug-up smoothly from the slant-shaped region toward the other portion of the display surface. Also in this embodiment, it is also allowed to insert a surface plate into a position between the input detection unit 45 and the touch-sensitive input sheet 110.

FIGS. 24A to 24D show a forming example of the touch-sensitive input sheet 110. In this embodiment, there is cited a case in which the touch-sensitive input sheet 110 which is applicable to the input device 308 as shown in FIG. 23 is formed by the sheet-shaped base member 21. With respect to the whole constitutional example of the input device 308, the input device 301 shown in FIG. 8 should be referred to.

Figure 24A:
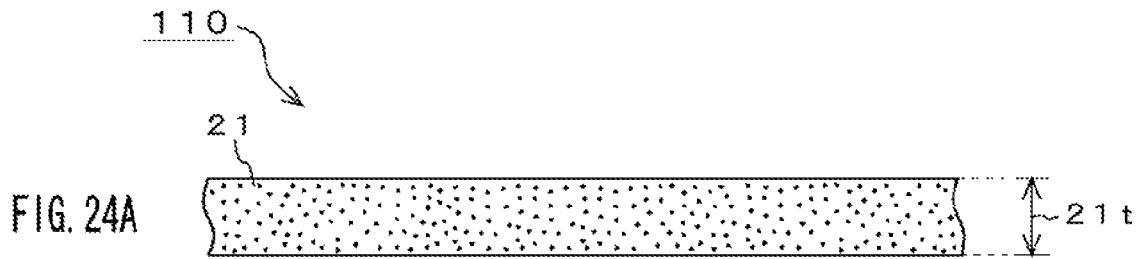
FIGS. 24A to 24D are process diagrams showing a formation example of a touch-sensitive input sheet 110.

First, the sheet-shaped base member 21 of the film thickness 21t of around 100 µm, which is shown in FIG. 24A, is prepared. For the base member 21, for example, polycarbonate-based transparent material of hardness 60° to 80° whose transmissivity and refractive index are 1.5 concurrently, which forms one example of the transparent material, is processed in a sheet-shape by the well-known technology and is used. The sheet-shaped base member 21 is windable.

Figure 24B:
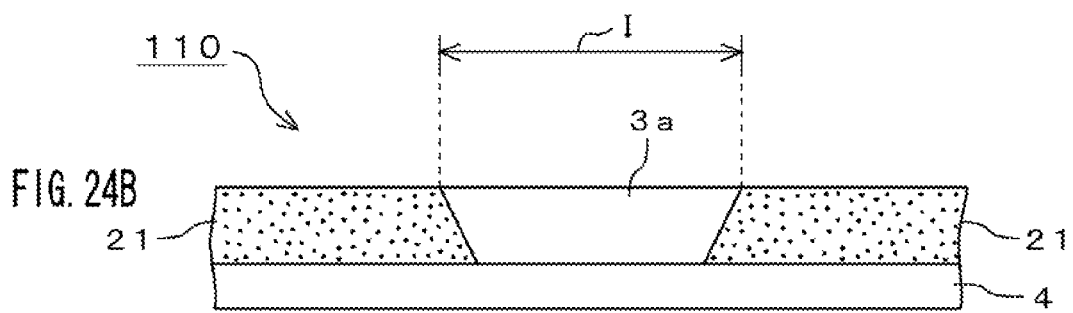

Next, opening portions 3a are formed in the base member 21 shown in FIG. 24B. Each of the opening portions 3a is formed such that it corresponds to the size of the display region "I". In the above-mentioned embodiment, each of the opening portions 3a is formed so as to correspond to the shape and the size of each of the element members E1 to E21 corresponding to the size including the icon image of the various kinds of function keys K1 to K21. With respect to the element members E1 to E12 and the element members E15 to E19, the cylindrical opening portions 3a are formed at pre-determined regions of the base member 21. With respect to the element members E13, E14, E20, E21, the rectangular opening portions 3a, which are not shown, are formed at predetermined regions thereof. For example, the opening portions 3a of a reversed-truncated-cone shaped cross-section, a reversed-trapezoid shaped cross-section or the like are formed in the base member 21 by using a sickle-shaped cutting rotary blade or a punch processing machine having a quadrate-rectangle shaped cutting blade. Further, a surface plate or a temporary substrate 4 is provided on one surface of the base member 21 in which a plurality of opening portions 3a are formed.

Figure 24C:
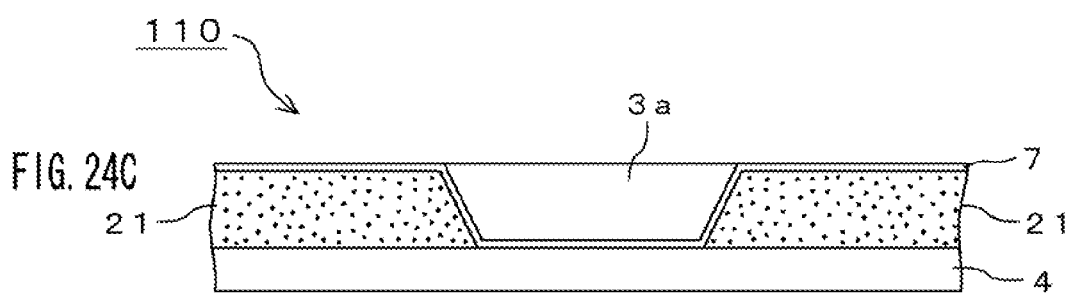
Figure 24D:
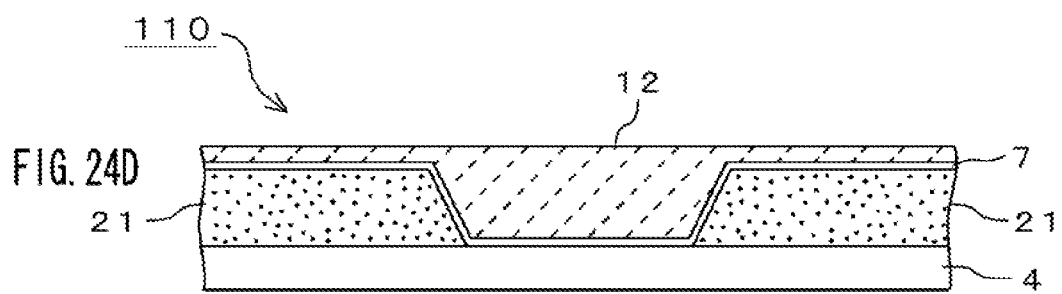

Thereafter, the AR thin film 7 is formed on the inside of each of the opening portions 3a of the base member 21 shown in FIG. 24C. For example, the AR thin film 7 is applied to the inside of each of the opening portions 3a of the base member 21 by a sputter processing method. In this embodiment, the base member 21 with the opening portions 3a and a substrate 4 is set in the sputter device and the AR thin film 7 of the film thickness of around a few angstrom is deposited on inclined surface portions, a bottom surface portion of each of the opening portions 3a and the whole surface of the base member 21. The AR thin film 7 may be deposited by a vacuum evaporation method.

Thereafter, the base member 21 in which the AR thin film 7 is deposited on the opening portion 3' and on the whole surface is taken out from the sputter device and the element member 12 of hardness 20° to 40° is coated over the whole surface of the AR thin film 7 which is formed on the inside of each of the opening portions 3a and on the base member 21.

In this embodiment, soft transparent material having a refractive index close to that of the polycarbonate-based transparent material is used for the element member 12. For example, the element member 12 is formed by coating the whole surface of the base member 21 including the opening portions 3a with transparent silicon rubber member of hardness 20° to 40° for the soft transparent material which has a refractive index close to the refractive index of 1.5 of the polycarbonate. Thereafter, the coating material is dried. Thus, the touch-sensitive input sheet 110 with substrate in which the element member 12 has a reversed-trapezoid shaped cross-section and the element member 12 covers over the base member 21 is completed.

Thereafter, similarly as the third to ninth embodiments, a laminated board provided with the input detection unit 45 on the display unit 29 is prepared. With respect to using parts of the display unit 29 and the input detection unit 45, it is just the same as explained in the third embodiment. Thereafter, the touch-sensitive input sheet 110 is formed on the input detection unit 45.

Also in this embodiment, after removing the substrate 4 of the rear surface, the touch-sensitive input sheet 110 is joined on the input detection unit 45 through an adhesive agent. Further, a top member 5 is formed on the touch-sensitive input sheet 110. The top member 5 is bonded on the touch-sensitive input sheet 110 through an adhesive agent. Thus, the input device 308 as shown in FIG. 25 is completed.

In this manner, according to the input device 308 for the tenth embodiment, the embodiment of the transparent touch-sensitive input sheet 110 relating to the present application is applied, so that even if the display surface is observed as a flat shape, when the icon image or the like of the various kinds of function keys K1 to K21 or the like which is displayed on the display unit 29 is touched by hand (finger or the like) of the operator and the finger or the like of the operator slides from the base member 21 to any one of the element members E1 to E21 or the like, it is possible to present an input operation accompanied by the concave shape feeling of being dug-down smoothly from the slant-shaped region along the sliding direction from one portion of the display surface and also, of being dug-up smoothly from the slant-shaped region toward the other portion of the display surface. Thus, it is possible to provide the input device 308 with touch-sensitive input sheet for icon touch.

Embodiment 11

Figure 25:
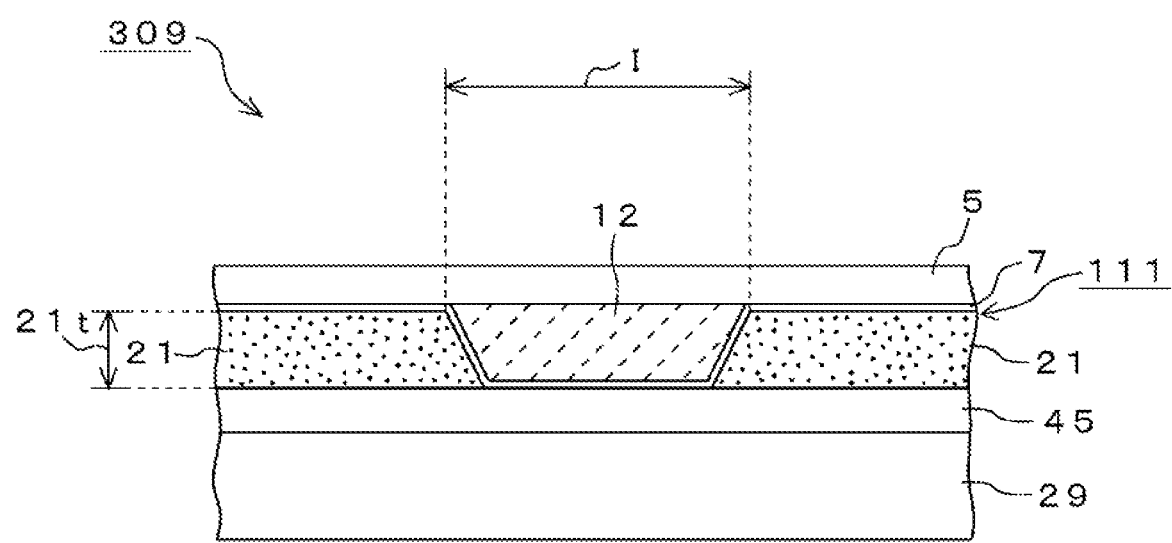
FIG. 25 is a cross-sectional view of one element of an icon image of an input device 309 according to an eleventh embodiment showing a constitutional example thereof.

FIG. 25 shows a constitutional example of one element of an icon image of an input device 309 relating to an eleventh embodiment. In this embodiment, there is cited a case in which the hardness of an element member 12 is set to be low with respect to the hardness of a base member 21 of a touch-sensitive input sheet 111 and in which a windable roll sheet-shaped material is used for the base member 21 and further, an AR thin film 7 and the element member 12 are provided on the whole surface of the base member 21.

According to the input device 309 shown in FIG. 25, the input detection unit 45, the touch-sensitive input sheet 111, and the top member 5 are laminated on the display unit 29 in a similar order as the third embodiment. The touch-sensitive input sheet 111 provided on the input detection unit 45 contains the base member 21 of hardness 60° to 80°, which is formed as a sheet-shape, the AR thin film 7 having the film thickness of around a few angstrom, and the element member 12 of hardness of around 20° to 40°, which forms a block-shape. A symbol, "I" in the drawing denotes a display region and the display region "I" displays, for example, an icon image (input image) of the numeral key K1 of "1" or the like.

Similarly, the display region "I" is defined with respect to the icon image of each of the other function keys K2 to K21.

Also in this embodiment, similarly as the third to tenth embodiments, the operator pushes down the icon image displayed on the display region "I". The AR thin film 7 covers a portion including the display region "I" of the icon image displayed on the display unit 29 and the whole surface of the base member 21. The element member 12 is set only at the display region "I" of the icon image displayed on the display unit 29. The element member 12 shown in FIG. 25, similarly as the third to tenth embodiments, corresponds to each of the element members E1 to E21 facing the icon image of the various kinds of function keys K1 to K21 shown in FIG. 8.

For the base member 21, for example, sheet-shaped and polycarbonate-based transparent material of the film thickness 21t of around 100 μm, which forms one example of the transparent material, is used. For the element member 12, transparent silicon rubber member of hardness 20° to 40° for a soft transparent material which has a refractive index close to that of the polycarbonate-based transparent material, is used, and the film thickness thereof becomes around 100 μm. In this manner, when constituting the touch-sensitive input sheet 111, similarly as the fourth to tenth embodiments, it is possible to present the concave shape feeling of being dug-down smoothly from the slant-shaped region along the sliding direction from one portion of the display surface and also, of being dug-up smoothly from the slant-shaped region toward the other portion of the display surface. Also in this embodiment, it is also allowed to insert a surface plate into a position between the input detection unit 45 and the touch-sensitive input sheet 111.

FIGS. 26A to 26D show a forming example of the touch-sensitive input sheet 111. In this embodiment, there is cited a case in which the touch-sensitive input sheet 111 applicable to the input device 309 as shown in FIG. 25 is formed by the sheet-shaped base member 21. With respect to the whole constitutional example of the input device 309, the input device 301 shown in FIG. 8 should be referred to.

Figure 26A:
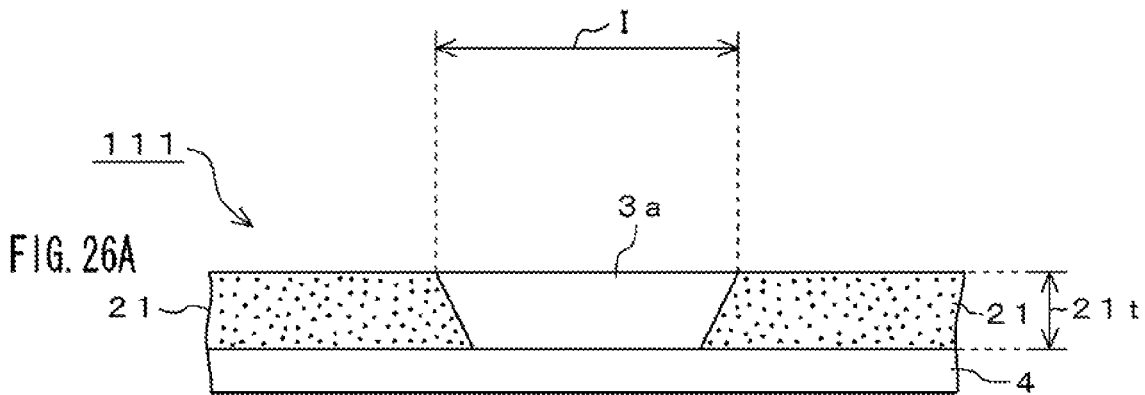
FIGS. 26A to 26D are process diagrams showing a formation example of a touch-sensitive input sheet 111.

First, the sheet-shaped base member 21 of the film thickness 21t of around 100 μm as shown in FIG. 26A is prepared. Ones formed as explained in the tenth embodiment are used for the base member 21. In the above-mentioned embodiment, each of the opening portions 3a is formed so as to correspond to the shape and the size of each of the element members E1 to E21 corresponding to the size including the icon image of the various kinds of function keys K1 to K21. With respect to the element members E1 to E12 and the element members E18 to E19, the cylindrical opening portions 3a are formed at predetermined regions of the base member 21. With respect to the element members E13, E14, E20, E21, the rectangular opening portions 3a, which are not shown, are formed at predetermined regions thereof. Further, a surface plate or a temporary substrate 4 is provided on one surface of the base member 21 in which a plurality of opening portions 3a are formed.

Figure 26B:
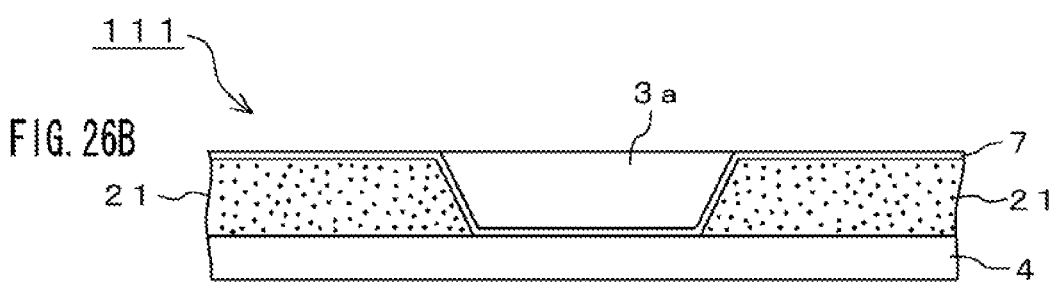

Thereafter, the AR thin film 7 is formed on the whole surface of the base member 21 shown in FIG. 26B including the opening portions 3a. For example, the AR thin film 7 is applied to the inside of each of the opening portions 3a of the base member 21 and the whole surface of the base member 21 by a sputter processing method. In this embodiment, the base member 21 with the opening portions 3a and the substrate 4 is set in the sputter device and the AR thin film 7 having the film thickness of around a few angstrom is deposited on inclined surface portions, and a bottom surface portion of each of the opening portions 3a and the whole surface of the base member 21. The AR thin film 7 may be deposited by a vacuum evaporation method.

Figure 26C:
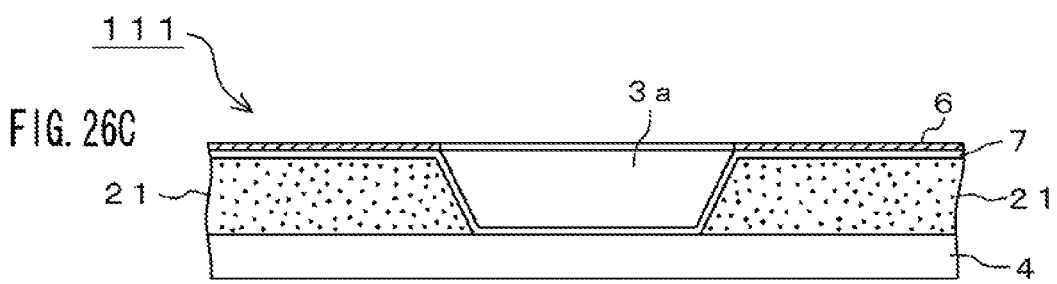
Figure 26D:
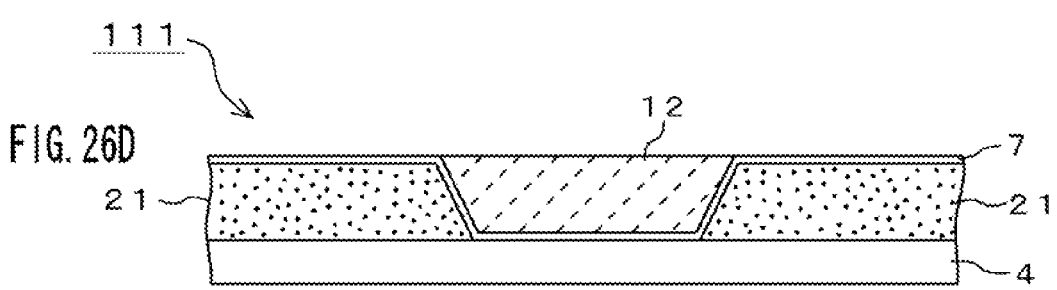

Thereafter, the base member 21 in which the AR thin film 7 is deposited on the opening portions 3a and on the whole surface of the base member 21 is taken out from the sputter device and the element member 12 of hardness 20° to 40° is filled into only the inside of each of this opening portions 3a. Also in this embodiment, a mask member 6 of a masking tape or the like shown in FIG. 26C is formed at the periphery of each of the opening portions 3a. The masking process is applied so as to not coat a portion other than the opening portions 3a with the element member 12. For the element member 12, transparent silicon rubber member of hardness 20° to 40° for the soft transparent material, which has a refractive index close to that of the polycarbonate-based transparent material, is used.

For example, the element member 12 is formed by coating the opening portions 3a cared by the mask member 6 shown in FIG. 26C with the transparent silicon rubber member of hardness 20° to 40° for the soft transparent material which has a refractive index close to the refractive index of 1.5 of the polycarbonate. Thereafter, the mask member 6 is peeled off from the periphery of the element member 12 and removed. Then, the coating material is dried. Thus, the touch-sensitive input sheet 111 with substrate is completed in which the element member 12 has a reversed-trapezoid shaped cross-section, the AR thin film 7 covers the base member 21, and the element member 12 does not cover the base member 21.

Thereafter, similarly as the third to tenth embodiments, a laminated board provided with the input detection unit 45 on the display unit 29 is prepared. With respect to using parts of the display unit 29 and the input detection unit 45, it is just the same as explained in the third embodiment. Thereafter, the touch-sensitive input sheet 111 is formed on the input detection unit 45.

Also in this embodiment, after removing the substrate 4 of the rear surface, the touch-sensitive input sheet 111 is joined on the input detection unit 45 through an adhesive agent. Further, a top member 5 is formed on the touch-sensitive input sheet 111. The top member 5 is bonded on the touch-sensitive input sheet 111 through an adhesive agent. Thus, the input device 309 as shown in FIG. 25 is completed.

In this manner, according to the input device 309 for the eleventh embodiment, the embodiment of the transparent touch-sensitive input sheet 111 relating to the present application is applied, so that even if the display surface is observed to be a flat shape, when the icon image or the like of the various kinds of function keys K1 to K21 or the like which is displayed on the display unit 29 is touched by hand (finger or the like) of the operator and the finger or the like of the operator slides from the base member 21 to any one of the element members E1 to E21 or the like, it is possible to present an input operation accompanied by the concave shape feeling of being dug-down smoothly from the slant-shaped region along the sliding direction from one portion of the display surface and also, of being dug-up smoothly from the slant-shaped region toward the other portion of the display surface. Thus, it is possible to provide the input device 309 with touch-sensitive input sheet for icon touch.

Embodiment 12

Figure 27:
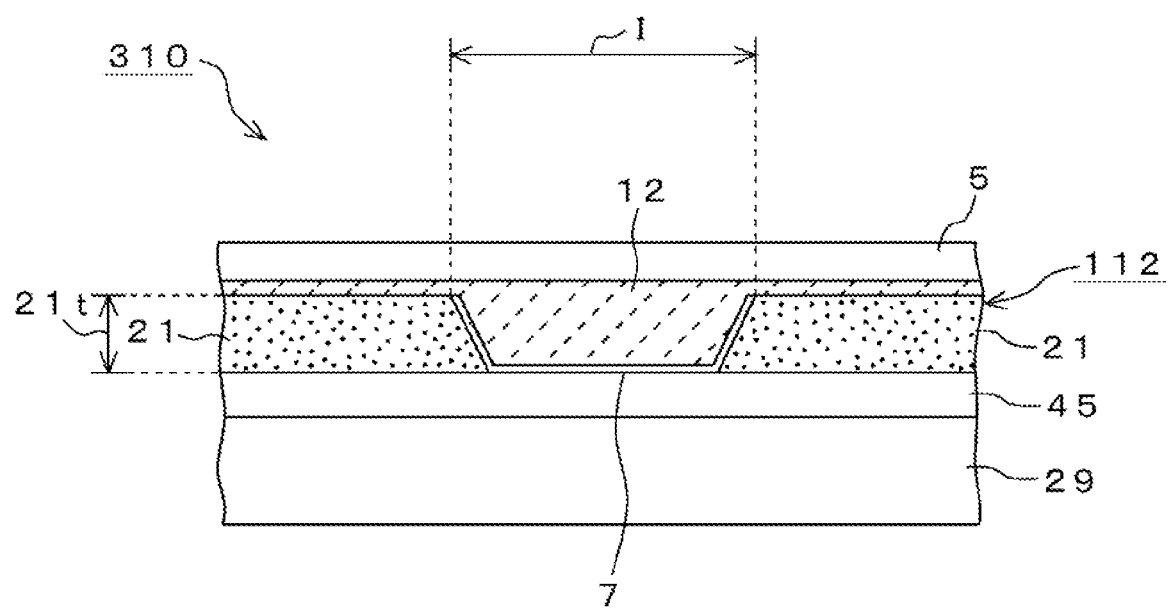
FIG. 27 is a cross-sectional view of one element of an icon image of an input device 310 according to a twelfth embodiment showing a constitutional example thereof.

FIG. 27 shows a constitutional example of one element of an icon image of an input device 310 relating to a twelfth embodiment. In this embodiment, there is cited a case in which the hardness of an element member 12 of a touch-sensitive input sheet 112 is set to be low with respect to the hardness of a base member 21 of the touch-sensitive input sheet 112 and in which the element member 12 forms a reversed-trapezoid shaped cross-section, the AR thin film 7 is provided between the element member 12 and the base member 21 in only the display region, and the element member 12 is provided on the whole surface of the base member 21.

According to the input device 310 shown in FIG. 27, the input detection unit 45, the touch-sensitive input sheet 112, and the top member 5 are laminated on the display unit 29 in a similar order as the third embodiment. The touch-sensitive input sheet 112 provided on the input detection unit 45 contains the base member 21 of hardness 60° to 80° which is formed as a sheet-shape, and the element member 12 of hardness of around 20° to 40°, which forms a block-shape. A symbol, "I" in the drawing denotes a display region, and similarly as the third embodiment, the display region "I" displays an icon image (input image) of the numeral key K1 of "1" or the like. With respect to icon images of other function keys K2 to K21, it is just the same as mentioned in the third embodiment that the display regions "I" are defined similarly.

In this embodiment, the AR thin film 7 is set on at least a portion which includes the display region "I" of the icon image displayed on the display unit 29 and is surrounded by the base member 21. The element member 12 is provided at the portion including the display region "I" of the icon image displayed on the display unit 29 and the whole surface of the base member 21. The element member 12 shown in FIG. 27, similarly as the third to eleventh embodiments, corresponds to each of the element members E1 to E21 facing to the icon image of the various kinds of function keys K1 to K21 shown in FIG. 8.

In this embodiment, the element member 12 has a reversed-trapezoid shaped cross-section. For the base member 21, for example, sheet-shaped and polycarbonate-based transparent material of the film thickness 21t of around 100 μm, which forms one example of the transparent material, is used. Transparent silicon rubber member of hardness 20° to 40° for the soft transparent material, which has a refractive index close to that of the polycarbonate-based transparent material, is used for the element member 12. The film thickness thereof is planarized so as to become such a degree as the thickness of 100 μm plus the thickness of a portion of the element member 12 on the base member 21.

When constituting the touch-sensitive input sheet 112 in this manner, similarly as the fourth embodiment to eleventh embodiments, it is possible to present an input operation accompanied by the concave shape feeling of being dug-down smoothly from the slant-shaped region along the sliding direction from one portion of the display surface and also, of being dug-up smoothly from the slant-shaped region toward the other portion of the display surface. Also in this embodiment, it is also allowed to insert a surface plate into a portion between the input detection unit 45 and the touch-sensitive input sheet 112. With respect to the insertion reason of this display plate, it is just the same as mentioned in the third embodiment.

FIGS. 28A to 28D show a forming example of the touch-sensitive input sheet 112. In this embodiment, there is cited a case in which the touch-sensitive input sheet 112 applicable to the input device 310 as shown in FIG. 27 is formed. With respect to the whole constitutional example of the input device 310, the input device 301 shown in FIG. 8 should be referred to.

Figure 28A:
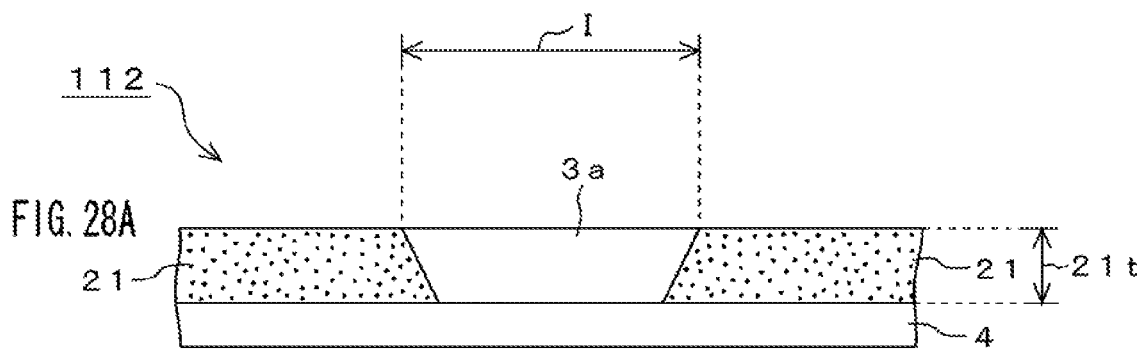
FIGS. 28A to 28D are process diagrams showing a formation example of a touch-sensitive input sheet 112.

First, the sheet-shaped base member 21 of the film thickness 21t of around 100 μm as shown in FIG. 28A is prepared.

Also in this embodiment, each of the opening portions 3a is formed so as to correspond to the shape and the size of each of the element members E1 to E21 corresponding to the size including the icon image of the various kinds of function keys K1 to K21. With respect to an employed material of the base member 21, a processing method of the opening portions 3a and a substrate 4, they have been explained in the fourth embodiment, so that the explanation thereof will be omitted (see FIG. 12A).

Figure 28B:
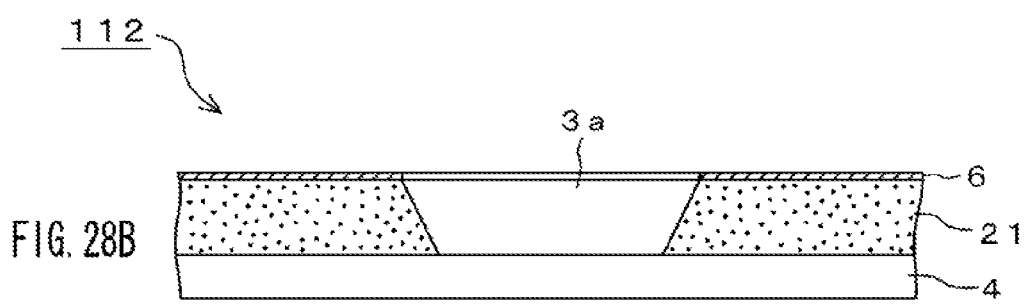

Then, in order to form the AR thin film 7 of the film thickness of around a few angstrom on the inside of each of the opening portions 3a of the base member 21 having the substrate 4, also in this embodiment, a mask member 6 of a thermostable masking tape or the like shown in FIG. 28B is formed at the periphery of each of the opening portions 3a. The masking process is applied so as not to deposit the AR thin film 7 on a portion other than the opening portions 3a.

Figure 28C:
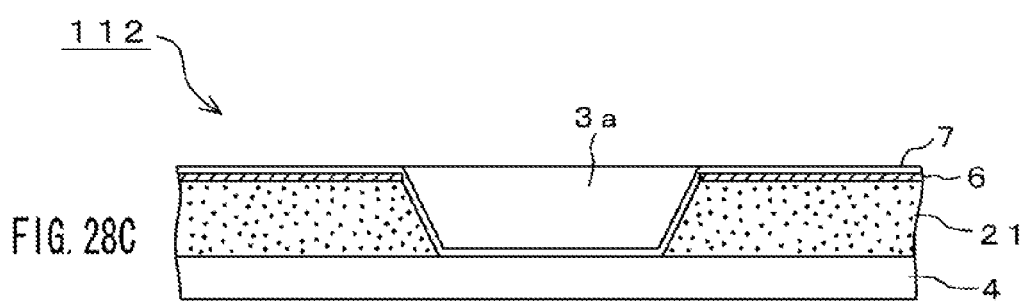

The base member 21 having the opening portions 3a, which is cared by the mask member 6, is set in the sputter device which is not shown. Then, the sputter process in which the thin film material is a target is applied. Thus, the AR thin film 7 is formed on the whole surface of the base member 21 including the opening portions 3a as shown in FIG. 28C. Thereafter, the mask member 6 is peeled off from the periphery of each of the opening portions 3a and removed. Then, the element member 12 of hardness 20° to 40° is formed on the whole surface of the base member 21, from which the mask member 6 is removed, including the opening portions 3a.

Figure 28D:
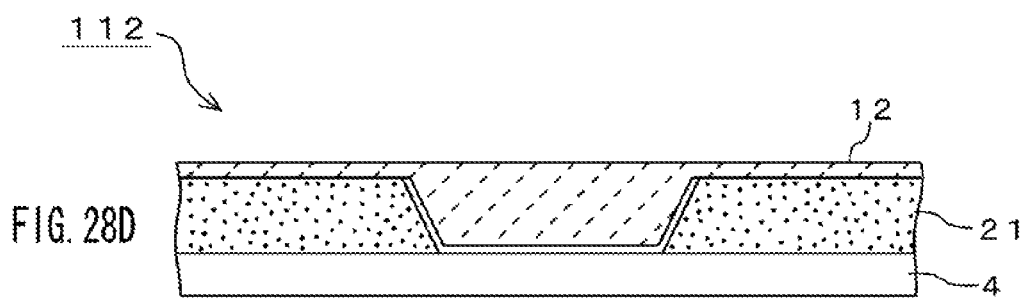

For the element member 12, transparent silicon rubber member of hardness 20° to 40° for the soft transparent material, which has a refractive index close to that of the polycarbonate-based transparent material, is used. For example, the transparent silicon rubber member of hardness 20° to 40° for the soft transparent material, which has a refractive index close to the refractive index of 1.5 of the polycarbonate is coated on the whole surface and the element member 12 is then dried. Thus, the touch-sensitive input sheet 112 with substrate is completed in which the element member 12 as shown in FIG. 28D has a reversed-trapezoid shaped cross-section and also the element member 12 covers the base member 21.

Thereafter, similarly as the third to eleventh embodiments, a laminated board provided with the input detection unit 45 on the display unit 29 is prepared. With respect to using parts of the display unit 29 and the input detection unit 45, it is just the same as explained in the third embodiment. Then, the touch-sensitive input sheet 112 is formed on the input detection unit 45.

Also in this embodiment, after removing the substrate 4 of the rear surface, the touch-sensitive input sheet 112 is joined on the input detection unit 45 through an adhesive agent. Further, the top member 5 is formed on the touch-sensitive input sheet 112. The top member 5 is bonded on the touch-sensitive input sheet 112 through an adhesive agent. Thus, the input device 310 as shown in FIG. 27 is completed.

In this manner, according to the input device 310 as the twelfth embodiment, the embodiment of the transparent touch-sensitive input sheet 112 relating to the present application is applied, so that even if the display surface is observed as a flat shape, when the icon image or the like of the various kinds of function keys K1 to K21 or the like which is displayed on the display unit 29 is touched by hand (finger or the like) of the operator and the finger or the like of the operator slides from the base member 21 to any one of the element members E1 to E21 or the like, it is possible to present an input operation accompanied by the concave shape feeling of being dug-down smoothly from the slant-shaped region along the sliding direction from one portion of the display surface and also, of being dug-up smoothly from the slant-shaped region toward the other portion of the display surface. Thus, it is possible to provide the input device 310 with touch-sensitive input sheet for icon touch.

Embodiment 13

Figure 29:
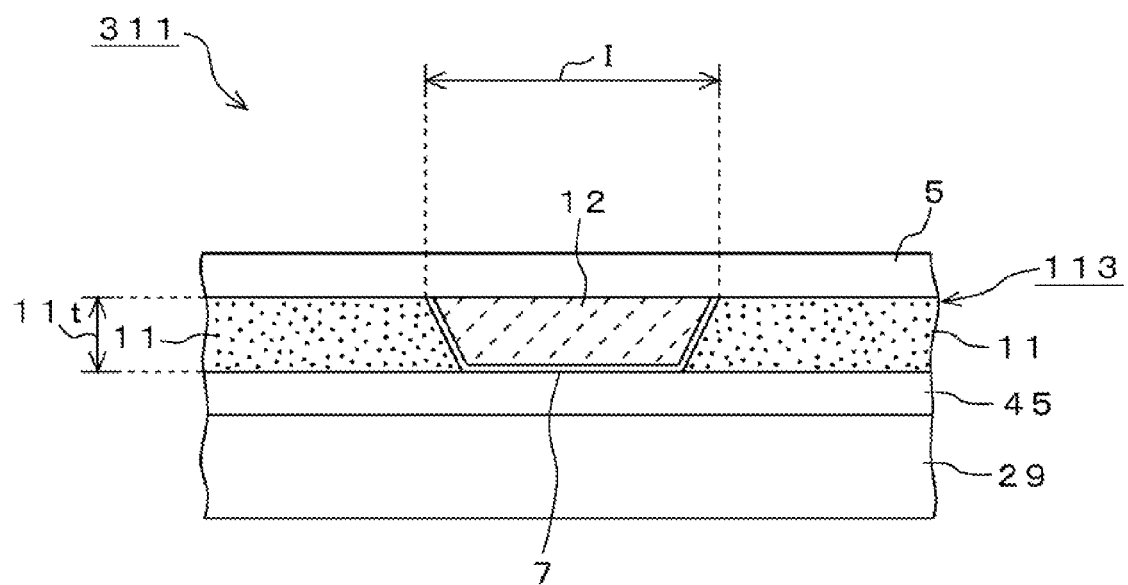
FIG. 29 is a cross-sectional view of one element of an icon image of an input device 311 according to a thirteenth embodiment showing a constitutional example thereof.

FIG. 29 shows a constitutional example of one element of an icon image of an input device 311 relating to a thirteenth embodiment.

In this embodiment, there is cited a case in which the hardness of an element member 12 of a touch-sensitive input sheet 113 is set to be low with respect to the hardness of a base member 21 of the touch-sensitive input sheet 113 and in which the element member 12 forms a reversed-trapezoid shaped cross-section and the AR thin films 7 and the element members 12 are provided at only the display region.

According to the input device 311 shown in FIG. 29, the input detection unit 45, the touch-sensitive input sheet 113, and the top member 5 are laminated on the display unit 29 in a similar order as the third embodiment. The touch-sensitive input sheet 113 provided on the input detection unit 45 contains the base member 21 of hardness 60° to 80°, which is formed as a sheet-shape, and the element members 12 of hardness of around 20° to 40°, each of which forms a block-shape. A symbol, "I" in the drawing denotes the display region, and similarly as the third embodiment, the display region "I" displays an icon image (input image) of the numeral key K1 of "1" or the like. With respect to the icon images of other function keys K2 to K21, it is just the same as mentioned in the third embodiment that the display regions "I" are defined similarly.

In this embodiment, each of the AR thin films 7 is set on at least a portion which includes the display region "I" of the icon image displayed on the display unit 29 and is surrounded by the base member 21. Each of the element members 12 is also set on a portion which includes the display region "I" of the icon image displayed on the display unit 29 and is surrounded by the base member 21. The element member 12 shown in FIG. 29, similarly as the third to twelfth embodiments, corresponds to each of the element members E1 to E21 facing to the icon image of the various kinds of function keys K1 to K21 shown in FIG. 8.

In this embodiment, each of the element members 12 has a reversed-trapezoid shaped cross-section. For the base member 11, for example, polycarbonate-based transparent material of the film thickness 11t of around 100 μm, which forms one example of the transparent material, is used. For the element member 12, transparent silicon rubber member of hardness 20° to 40° for the soft transparent material, which has a refractive index close to that of the polycarbonate-based transparent material, is used. The film thickness thereof is planarized so as to become around 100 μm.

When constituting the touch-sensitive input sheet 113 in this manner, similarly as the fourth to twelfth embodiments, it is possible to present an input operation accompanied by the concave shape feeling of being dug-down smoothly from the slant-shaped region along the sliding direction from one portion of the display surface and also, of being dug-up smoothly from the slant-shaped region toward the other portion of the display surface. In this embodiment, it is also allowed to insert a surface plate into a position between the input detection unit 45 and the touch-sensitive input sheet 113. With respect to the insertion reason of this display plate, it is just the same as mentioned in the third embodiment.

FIGS. 30A to 30D show a formation example of the touch-sensitive input sheet 113. In this embodiment, there is cited a case in which the touch-sensitive input sheet 113 that is applicable to the input device 311 shown in FIG. 29 is formed. With respect to the whole constitutional example of the input device 311, the input device 301 shown in FIG. 8 should be referred to.

First, the sheet-shaped base member 21 of the film thickness 11t of around 100 μm which is shown in FIG. 30A is prepared. Also in the embodiment, each of the opening portions 3a is formed so as to correspond to the shape and the size of each of the element members E1 to E21 corresponding to the size including the icon image of the various kinds of function keys K1 to K21. With respect to an employed material of the base member 21, a processing method of the opening portions 3a and a substrate 4, they have been explained in the fourth embodiment, so that the explanation thereof will be omitted (see FIG. 12A).

Then, in order to form the AR thin film 7 of the film thickness of around a few angstrom on the inside of each of the opening portions 3a of the base member 21 having the substrate 4, also in this embodiment, a first mask member 6a of a thermostable masking tape or the like shown in FIG. 30B is formed at the periphery of each of the opening portions 3a. The masking process is applied so as to not deposit the AR thin film 7 on a portion other than the opening portions 3a.

The base member 21 having the opening portions 3a, which is cared by the first mask member 6a, is set in the sputter device which is not shown. Then, a sputter process in which the thin film material is a target is applied. Thus, as shown in FIG. 30C, the AR thin film 7 is formed on the first mask member 6a of the base member 21 including the opening portions 3a. Thereafter, the first mask member 6a is peeled off from the periphery of each of the opening portions 3a and removed. The element member 12 of hardness 20° to 40° is then formed on only the inside of the opening portion 3a from which the first mask member 6a is peeled off.

For example, a second mask member 6b of a masking tape or the like shown in FIG. 30D is formed at the periphery of each of the opening portions 3a. This masking process is applied so as not to coat the element member 12 on the base member 21 or the like other than the opening portions 3a. The element member 12 is coated on the base member 21, which is cared by the second mask member 6b, including the opening portions 3a.

For the element members 12, soft transparent material which has a refractive index close to that of the polycarbonate-based transparent material is used. For example, the transparent silicon rubber member of hardness 20° to 40° for the soft transparent material, which has a refractive index close to the refractive index of 1.5 of the polycarbonate-based transparent material, is coated on the inside of each of the opening portions 3a so as to be filled, and the element members 12 are dried. Thereafter, the second mask member 6b is peeled off from the periphery of each of the opening portions 3a and removed. Thus, the touch-sensitive input sheet 113 with substrate is completed in which each of the element members 12 has a reversed-trapezoid shaped cross-section and the AR thin film 7 and the element member 12 are provided at only the display region.

Thereafter, similarly as the third to twelfth embodiments, a laminated board provided with the input detection unit 45 on the display unit 29 is prepared. With respect to using parts of the display unit 29 and the input detection unit 45, they have been just as explained in the third embodiment. Then, the touch-sensitive input sheet 113 is formed on the input detection unit 45.

Also in this embodiment, after removing the substrate 4 of the rear surface, the touch-sensitive input sheet 113 is joined on the input detection unit 45 through an adhesive agent. Further, the top member 5 is formed on the touch-sensitive input sheet 113. The top member 5 is bonded on the touch-sensitive input sheet 113 through an adhesive agent. Thus, the input device 311 as shown in FIG. 29 is completed.

In this manner, according to the input device 311 for the thirteenth embodiment, the embodiment of the transparent touch-sensitive input sheet 113 relating to the present application is applied, so that even if the display surface is observed as a flat shape, when the icon image or the like of the various kinds of function keys K1 to K21 or the like which is displayed on the display unit 29 is touched by hand (finger or the like) of the operator and the finger or the like of the operator slides from the base member 21 to any one of the element members E1 to E21 or the like, it is possible to present an input operation accompanied by the concave shape feeling of being dug-down smoothly from the slant-shaped region along the sliding direction from one portion of the display surface and also, of being dug-up smoothly from the slant-shaped region toward the other portion of the display surface. Thus, it is possible to provide the input device 311 with touch-sensitive input sheet for icon touch of high degree of reliability.

Embodiment 14

Figure 31:
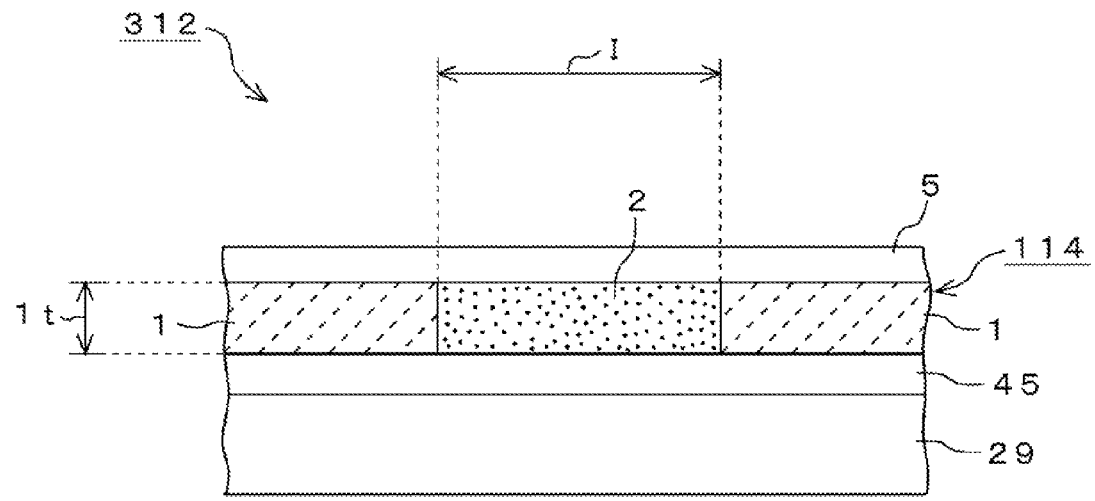
FIG. 31 is a cross-sectional view of one element of an icon image of an input device 312 according to a fourteenth embodiment showing a constitutional example thereof.

FIG. 31 shows a constitutional example of one element of an icon image of an input device 312 relating to a fourteenth embodiment. In this embodiment, there is cited a case in which the hardness of each element member 2 of a touch-sensitive input sheet 114 is set to be high with respect to the hardness of a base member 1 of the touch-sensitive input sheet 114. Namely, in this embodiment, the high-low property is reversed with respect to the composition hardness of the base member 11 and the element member 12 which is explained in the third embodiment.

According to the input device 312 shown in FIG. 31, the input detection unit 45, the touch-sensitive input sheet 114, and the top member 5 are laminated on the display unit 29 in sequence. The touch-sensitive input sheet 114 provided on the input detection unit 45 contains the base member 11 of hardness 20° to 40°, which is formed as a sheet-shape, and the element members 12 of hardness of around 60° to 80°, each of which forms a block-shape. The base member 1 and the element members 2 are molded using, for example, double mold. With respect to the double mold, it has been explained in the third embodiment, so that the explanation thereof will be omitted. A symbol "I" in the drawing denotes a display region and the display region "I" displays, for example, an icon image (input image) of the numeral key K1 of "1" or the like. With respect to the icon images of other function keys K2 to K21, the display regions "I" are defined similarly.

In this embodiment, the operator pushes down the icon image displayed on the display region "I". Each of the element members 2 includes the display region "I" of the icon image displayed on the display unit 29 and is surrounded by the base member 1. The element member 12 shown in FIG. 31 corresponds to each of the element members E1 to E21 facing the icon image of the various kinds of function keys K1 to K21 shown in FIG. 8.

For the element member 2, for example, polycarbonate-based transparent material of the film thickness it of around 100 μm, which forms one example of the transparent material, is used. For the base member 1, transparent silicon rubber member of hardness 20° to 40° for soft transparent material, which has a refractive index close to that of the polycarbonate-based transparent material, is used, and the film thickness thereof becomes around 100 μm. When constituting the touch-sensitive input sheet 114 in this manner, it is possible to present the convex shape feeling which becomes thicker along the sliding direction from one portion of the display surface and also which become thinner toward the other portion of the display surface.

Also in this embodiment, it is also allowed to insert a surface plate into a position between the input detection unit 45 and the touch-sensitive input sheet 114. With respect to the insertion reason of this display plate, it is just the same as mentioned in the third embodiment. It should be noted that with respect to a formation example of the touch-sensitive input sheet 114, if the high-low property is reversed with respect to the composition hardness of the base member 11 and the element member 12 which are shown in FIG. 10 and the base member 11 is read as the base member 1 and the element member 12 is read as the element member 2, the reader can be understood so that the explanation thereof will be omitted.

In this manner, according to the input device 312 as the fourteenth embodiment, the embodiment of the transparent touch-sensitive input sheet 114 relating to the present application is applied, so that even if the display surface is observed as a flat shape, when the icon image or the like of the various kinds of function keys K1 to K21 or the like which is displayed on the display unit 29 is touched by hand (finger or the like) of the operator and the finger or the like of the operator slides from the base member 1 to any one of the element members E1 to E21 or the like, it is possible to present the convex shape feeling which becomes thicker stepwise along the sliding direction from one portion of the display surface and also which become thinner stepwise toward the other portion of the display surface. Thus, it is possible to provide the input device 312 with touch-sensitive input sheet for icon touch.

Embodiment 15

Figure 32:
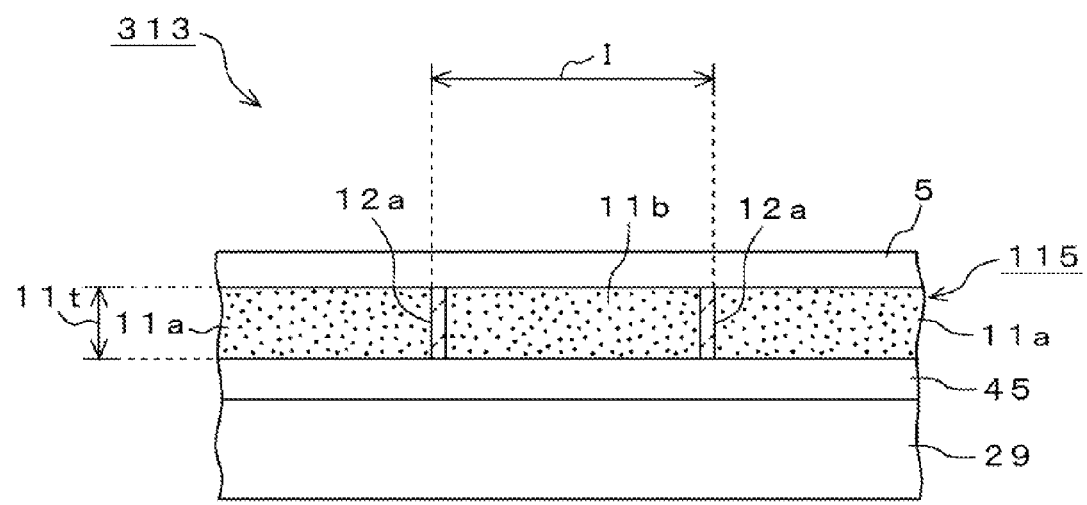
FIG. 32 is a cross-sectional view of one element of an icon image of an input device 313 according to a fifteenth embodiment showing a constitutional example thereof.

FIG. 32 shows a constitutional example of one element of an icon image of an input device 313 relating to a fifteenth embodiment. In this embodiment, an element member 12*a* is a portion which defines the display region "I" of the icon image displayed on the display unit 29 in order to provide a groove region emphasized feeling, and partitions the base member to base member portions 11*a*, 11*b*. With respect to the composition hardness, the hardness of the base member portions 11*a*, 11*b* is high and the hardness of the element member 12*a* is low.

According to the input device 313 shown in FIG. 32, an input detection unit 45, a touch-sensitive input sheet 115 and a top member 5 are laminated on the display unit 29 in sequence. The touch-sensitive input sheet 115 provided on the input detection unit 45 contains the base member portions 11*a*, 11*b* of hardness 60° to 80° which are formed as a sheet-shape, and the element member 12*a* of hardness of around 20° to 40°, which forms a frame shape. The base member portions 11*a*, 11*b* and the element member 12*a*, for example, are molded using double mold. With respect to the double mold, it was explained in the third embodiment, so that the explanation thereof will be omitted. A symbol "I" in the drawing denotes a display region, and the display region "I" displays, for example, an icon image (input image) of the numeral key K1 of "1" or the like. With respect to the icon images of other function keys K2 to K21, the display regions "I" are defined similarly.

In this embodiment, the operator pushes down the icon image displayed in the display region "I". The element member 12*a* is set as to surround at least the display region "I" of the icon image displayed on the display unit 29, to surround the base member portion 11*b* and to be surrounded by the base member portion 11*a*. The element member 12*a* shown in FIG. 32 corresponds to each of the element members E1 to E21 facing the icon image of the various kinds of function keys K1 to K21 shown in FIG. 8.

For the base member portions 11*a*, 11*b*, for example, polycarbonate-based transparent material of the film thickness 11*t* of around 100 μm, which forms one example of transparent material, is used. For the element member 12*a*, transparent silicon rubber member of hardness 20° to 40° for soft transparent material, which has a refractive index close to that of the polycarbonate-based transparent material, is used and the film thickness thereof becomes around 100 μm. When constituting the touch-sensitive input sheet 115 in this manner, it is possible to present the groove region emphasized feeling which is fallen in at a first groove region for an instant along the sliding direction from one portion of the display surface and thereafter, which continues in a flat shape and which is fallen in at a next groove region for an instant toward the other portion of the display surface. Also in this embodiment, it is also allowed to insert a surface plate into a position between the input detection unit 45 and the touch-sensitive input sheet 114. With respect to the insertion reason of this display plate, it is just the same as mentioned in the third embodiment. It should be noted that with respect to a formation example of the touch-sensitive input sheet 115, the explanation thereof will be omitted.

In this manner, according to the input device 313 as the fifteenth embodiment, the embodiment of the transparent touch-sensitive input sheet 115 relating to the present application is applied, so that even if the display surface is observed as a flat shape, when the icon image or the like of the various kinds of function keys K1 to K21 or the like which is displayed on the display unit 29 is touched by hand (finger or the like) of the operator and the finger or the like of the operator slides from the base member portion 11*a* to any one of the element members E1 to E21 or the like, it is possible to present the groove region emphasized feeling which is fallen in at the first groove region for an instant along the sliding direction from one portion of the display surface and thereafter, which continues in the flat shape of the base member portion 11*b* and which is fallen in at the next groove region for an instant toward the other portion of the display surface. Thus, it is possible to provide the input device 313 with touch-sensitive input sheet for icon touch.

Embodiment 16

Figure 33:
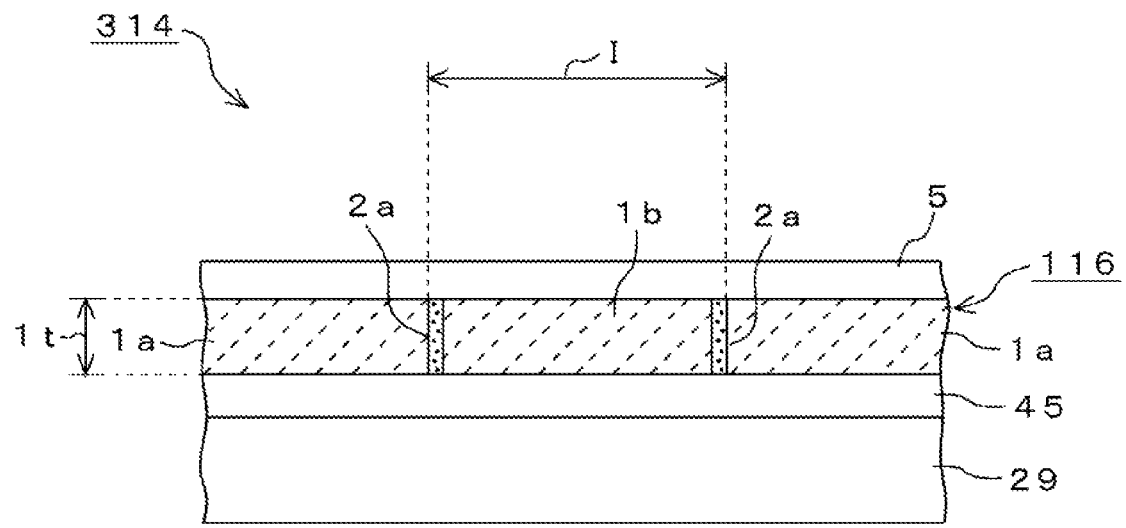
FIG. 33 is a cross-sectional view of one element of an icon image of an input device 314 according to a sixteenth embodiment showing a constitutional example thereof.

FIG. 33 shows a constitutional example of one element of an icon image of an input device 314 relating to a sixteenth embodiment. In this embodiment, an element member 2*a* is a portion which defines the display region "I" of the icon image displayed on the display unit 29 in order to provide an edge emphasized feeling (convexity-shaped feeling), and partitions the base member into base member portions 1*a*, 1*b*. With respect to the composition hardness, the hardness of the base member portions 1*a*, 1*b* are low and the hardness of the element member 2*a* is high.

According to the input device 314 shown in FIG. 33, an input detection unit 45, a touch-sensitive input sheet 116 and a top member 5 are laminated on the display unit 29 in sequence. The touch-sensitive input sheet 116 provided on the input detection unit 45 contains the base member portions 1a, 1b of hardness 20° to 40°, which are formed as a sheet-shape and the element member 2a of hardness of around 60° to 80°, which forms a frame shape. The base member portions 1a, 1b and the element member 2a are molded using, for example, double mold. With respect to the double mold, it has been explained in the third embodiment, so that the explanation thereof will be omitted. A symbol "I" in the drawing denotes a display region, and the display region "I" displays, for example, an icon image (input image) of the numeral key K1 of "1" or the like. With respect to the icon images of other function keys K2 to K21, the display regions "I" are defined similarly.

In this embodiment, the operator pushes down the icon image displayed in the display region "I". The element member 2a is set as to surround at least the display region "I" of the icon image displayed on the display unit 29, to surround the base member portion 1b and to be surrounded by the base member portion 1a. The element member 2a shown in FIG. 32 corresponds to each of the element members E1 to E21 facing the icon image of the various kinds of function keys K1 to K21 shown in FIG. 8.

For the element member 2a, for example, polycarbonate-based transparent material of the film thickness it of around 100 μm, which forms one example of transparent material, is used. For the base member portions 1a, 1b, transparent silicon rubber member of hardness 20° to 40° for soft transparent material, which has a refractive index close to that of the polycarbonate-based transparent material, is used and the film thickness thereof becomes around 100 μm. When constituting the touch-sensitive input sheet 116 in this manner, it is possible to present an edge emphasized feeling which is attached to a first wall-shaped protrusion region for an instant along the sliding direction from one portion of the display surface and thereafter, which continues in a concavity shaped region and which is attached to a next wall-shaped protrusion region for an instant toward the other portion of the display surface. Also in this embodiment, it is also allowed to insert a surface plate into a position between the input detection unit 45 and the touch-sensitive input sheet 116. With respect to the insertion reason of this display plate, it is just the same as mentioned in the third embodiment. It should be noted that with respect to a formation example of the touch-sensitive input sheet 116, the explanation thereof will be omitted.

In this manner, according to the input device 314 as the sixteenth embodiment, the embodiment of the transparent touch-sensitive input sheet 116 relating to the present application is applied, so that even if the display surface is observed as a flat shape, when the icon image or the like of the various kinds of function keys K1 to K21 or the like which is displayed on the display unit 29 is touched by hand (finger or the like) of the operator and the finger or the like of the operator slides from the base member 1a to any one of the element members E1 to E21 or the like, it is possible to present the edge emphasized feeling which is attached to the first wall-shaped protrusion region for an instant along the sliding direction from one portion of the display surface and thereafter, which continues in the concavity shaped region and which is attached to the next wall-shaped protrusion region for an instant toward the other portion of the display surface. Thus, it is possible to provide the input device 314 with touch-sensitive input sheet for icon touch.

Embodiment 17

Figure 34:
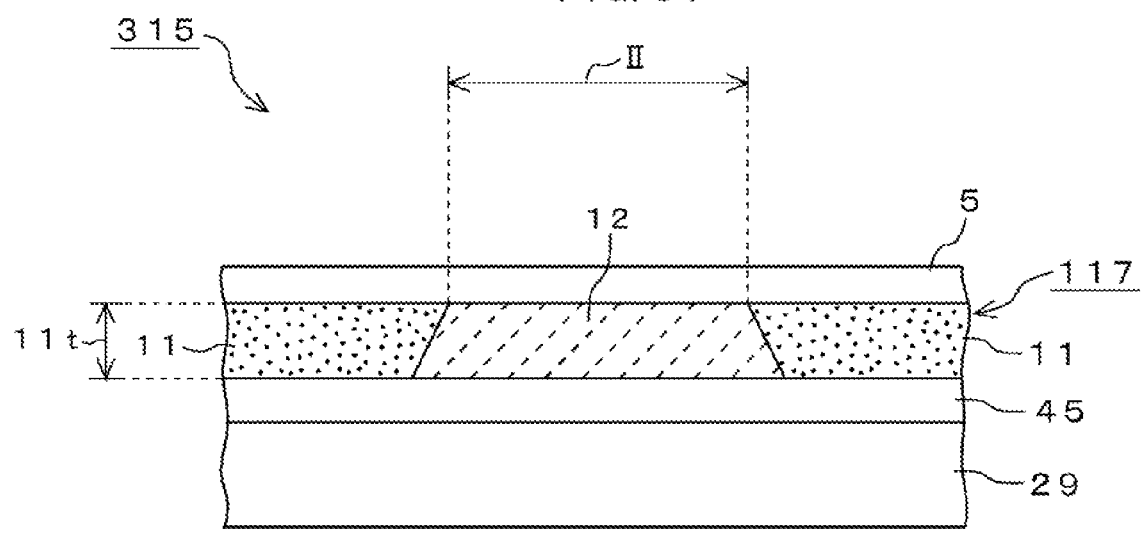
FIG. 34 is a cross-sectional view of one element of an icon image of an input device 315 according to a seventeenth embodiment showing a constitutional example thereof.

FIG. 34 shows a constitutional example of one element of an icon image of an input device 315 relating to the seventeenth embodiment.

In this embodiment, there is cited a case in which the hardness of each element member 12 of a touch-sensitive input sheet 117 is set to be low with respect to the hardness of a base member 11 of the touch-sensitive input sheet 117 and in which each of the element members 12 forms a trapezoid shaped cross-section and further, each of the element members 12 is not provided on the whole surface of the base member 11.

According to the input device 315 shown in FIG. 34, an input detection unit 45, the touch-sensitive input sheet 117 and a top member 5 are laminated on the display unit 29 in a similar order as the third embodiment. The touch-sensitive input sheet 117 provided on the input detection unit 45 contains the base members 11 of hardness 60° to 80°, which is formed as a sheet-shape, and the element members 12 of hardness of around 20° to 40°, each of which forms a block-shape. A symbol "II" in the drawing denotes a display region, and the display region "II" displays, for example, an icon image (input image) of the numeral key K1 of "1" explained in the third embodiment or the like. With respect to the icon images of other function keys K2 to K21, it is just the same as mentioned in the third embodiment that the display regions "II" are defined similarly.

In this embodiment, the element member 12 includes at least the display region "II" of the icon image displayed on the display unit 29, and is surrounded by the base member 11. A boundary region in which the base member 11 and the element member 12 are joined forms a slant-shape. It is just the same as mentioned in the third embodiment that the element member 12 shown in FIG. 34 corresponds to each of the element members E1 to E11 facing the icon image of the various kinds of function keys K1 to K11 shown in FIG. 8.

In this embodiment, the element member 12 has a trapezoid shaped cross-section and further, the element member 12 is provided in only the display region "II" without providing it on the whole surface of the base member 11. For the base member 11, for example, sheet-shaped and polycarbonate-based transparent material of the film thickness 11t of around 100 μm, which forms one example of a transparent material, is used. For the element member 12, transparent silicon rubber member of hardness 20° to 40° for soft transparent material, which has a refractive index close to that of the polycarbonate-based transparent material, is used, and the film thickness thereof is planarized so as to become around 100 μm.

When the touch-sensitive input sheet 117 is constituted in this manner, it is possible, as compared with the fifth embodiment, the seventh embodiment or the like, to present a concave shape feeling of being dug-down rapidly at an eaves-shaped region along the sliding direction from one portion of the display surface and also, of being dug-up rapidly at an eaves-shaped region toward the other portion of the display surface. Also in this embodiment, it is also allowed to insert a surface plate into a position between the input detection unit 45 and the touch-sensitive input sheet 117. With respect to the insertion reason of this display plate, it is just the same as mentioned in the third embodiment. It should be noted that with respect to a formation example of the touch-sensitive input sheet 117, the reader may understand to obtain a trapezoid shaped cross-section by reversing the direction of the element member 12 of the reversed-trapezoid shaped cross-section shown in FIG. 18, so that the explanation thereof will be omitted.

In this manner, according to the input device 315 as the seventeenth embodiment, the embodiment of the transparent touch-sensitive input sheet 117 relating to the present application is applied, so that even if the display surface is observed as a flat shape, when the icon image or the like of the various kinds of function keys K1 to K21 or the like which is displayed on the display unit 29 is touched by hand (finger or the like) of the operator and the finger or the like of the operator slides from the base member 11 to any one of the element members E1 to E21 or the like, it is possible to present the concave shape feeling of being dug-down rapidly at the eaves-shaped region along the sliding direction from one portion of the display surface and also, of being dug-up rapidly at the eaves-shaped region toward the other portion of the display surface. Thus, it is possible to provide the input device 315 with touch-sensitive input sheet for icon touch.

Embodiment 18

Figure 35A:
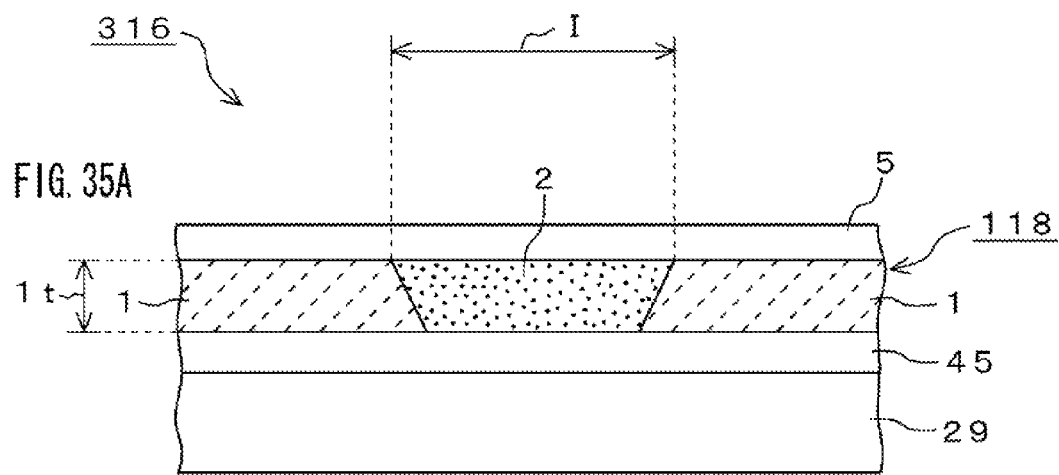
FIGS. 35A and 35B are cross-sectional views of one element of an icon image of input devices 316, 316a according to an eighteenth embodiment showing constitutional examples thereof.
Figure 35B:
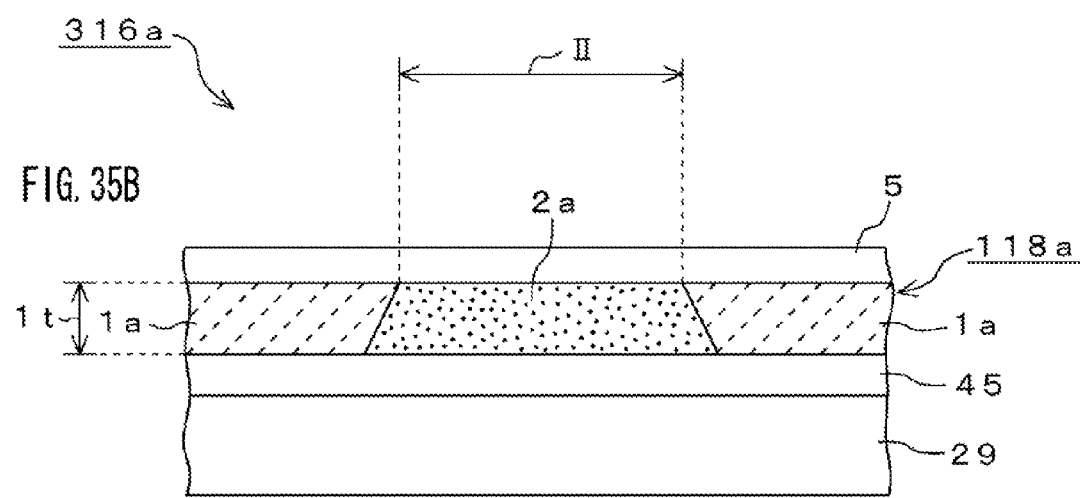

FIGS. 35A and 35B show a constitutional example of one element of an icon image of an input device 316 or 316*a* relating to an eighteenth embodiment.

In this embodiment, there is cited a case in which the hardness of each element member 2 of a touch-sensitive input sheet 118 is set to be high with respect to the hardness of a base member 1 of the touch-sensitive input sheet 118 and in which each of the element members 2 forms a reversed-trapezoid shaped cross-section or a trapezoid shaped cross-section and further, each of the element members 2 is not provided on the whole surface of the base member 1.

According to the input device 316 shown in FIG. 35A, an input detection unit 45, the touch-sensitive input sheet 118 and a top member 5 are laminated on the display unit 29 in a similar order as the third embodiment. The touch-sensitive input sheet 118 provided on the input detection unit 45 contains the base member 1 of hardness 20° to 40°, which is formed as a sheet-shape, and the element members 2 of hardness of around 60° to 80°, each of which forms a block-shape. A symbol "I" in the drawing denotes a display region, and the display region "I" displays, for example, an icon image (input image) of the numeral key K1 of "1" or the like, which is similar to the third embodiment. With respect to the icon images of other function keys K2 to K21, the display regions "I" are defined similarly.

In this embodiment, the element member 2 includes at least the display region "I" of the icon image displayed on the display unit 29, and is surrounded by the base member 1. It is just the same as mentioned in the third embodiment that the element member 2 shown in FIG. 35A corresponds to each of the element members E1 to E11 facing the icon image of the various kinds of function keys K1 to K11 shown in FIG. 8.

In this embodiment, each of the element members 2 has a reversed-trapezoid shaped cross-section and further, each of the element member 2 is provided in only the display region "I" without providing it on the whole surface of the base member 1. For the element member 2, for example, sheet-shaped polycarbonate-based transparent material of the film thickness It of around 100 μm, which forms one example of transparent material, is used. For the base member 1, soft transparent material which has a refractive index close to that of the polycarbonate-based transparent material, for example, transparent silicon rubber member of hardness of around 20° to 40° is used, and the film thickness thereof is planarized so as to become around 100 μm.

When constituting the touch-sensitive input sheet 118 in this manner, differently from the fourth to sixth embodiments, it is possible to present the convex shape feeling which becomes thicker rapidly from an eaves-shaped region along the sliding direction from one portion of the display surface and also which is fallen in rapidly from an eaves-shaped region toward the other portion of the display surface. Also in this embodiment, it is also allowed to insert a surface plate into a position between the input detection unit 45 and the touch-sensitive input sheet 118. With respect to the insertion reason of this display plate, it is just the same as mentioned in the third embodiment. It should be noted that with respect to a formation example of the touch-sensitive input sheet 118, if the high-low property is reversed with respect to the composition hardness of the base member 11 and the element member 12 described in the fifth embodiment and the base member 11 is read as the base member 1 and the element member 12 is read as the element member 2, the reader can be understood so that the explanation thereof will be omitted.

FIG. 35B shows a constitutional example of one element of an icon image of an input device 316*a*. In this embodiment, each element member 2*a* forms a trapezoid shaped cross-section. Namely, a shape of each of the element members 2 shown in FIG. 35A is reversed as each of the element members 2*a* shown in FIG. 35B.

According to the input device 316*a* shown in FIG. 35B, an input detection unit 45, a touch-sensitive input sheet 118*a* and a top member 5 are laminated on the display unit 29 in a similar order as the third embodiment. The touch-sensitive input sheet 118*a* provided on the input detection unit 45 contains the base member 1*a* of hardness 20° to 40°, which is formed as a sheet-shape, and the element members 2*a* of hardness of around 60° to 80°, each of which forms a block-shape. A symbol "II" in the drawing denotes a display region, and the display region "II" displays, for example, an icon image (input image) of the numeral key K1 of "1" or the like, which is similar to the third embodiment. With respect to the icon images of other function keys K2 to K21, it is just the same as mentioned in the third embodiment that the display regions "II" are defined similarly.

In this embodiment, each of the element members 2*a* includes at least the display region "II" of the icon image displayed on the display unit 29 and is surrounded by the base member 1*a*. A boundary region in which the base member 1*a* and each of the element members 2*a* are joined forms a slant-shape. It is just the same as mentioned in the third embodiment that the element member 2*a* shown in FIG. 35B corresponds to each of the element members E1 to E11 facing the icon image of the various kinds of function keys K1 to K11 shown in FIG. 8.

In this embodiment, each of the element members 2*a* has a trapezoid shaped cross-section and is provided in only the display region "II" without providing it on the whole surface of the base member 1*a*. For the base member 1*a*, for example, sheet-shaped polycarbonate-based transparent material of the film thickness it of around 100 μm, which forms one example of transparent material, is used. For each of the element members 2*a*, hardish transparent material which has a refractive index close to that of the polycarbonate-based transparent material is used and the film thickness thereof is planarized so as to become around 100 μm.

When constituting the touch-sensitive input sheet 118*a* in this manner, as compared with the fifth embodiment, the seventeenth embodiment or the like, it is possible to present the convex shape feeling which becomes thicker smoothly at a slant-shaped region along the sliding direction from one portion of the display surface and also which become thinner smoothly from a slant-shaped region toward the other portion of the display surface. Also in this embodiment, it is also allowed to insert a surface plate into a position between the input detection unit 45 and the touch-sensitive input sheet 118*a*. With respect to the insertion reason of this display plate, it is just the same as mentioned in the third embodiment. It should be noted that with respect to a formation example of the touch-sensitive input sheet 118a, it is enough if each of the element members 2a has a trapezoid shaped cross-section by reversing the direction of each of the element members 2 having the reversed-trapezoid shaped cross-section shown in FIG. 35A, so that the explanation thereof will be omitted.

In this manner, according to the input device 316 as the eighteenth embodiment, the embodiment of the transparent touch-sensitive input sheet 118 relating to the present application is applied, so that even if the display surface is observed as a flat shape, when the icon image or the like of the various kinds of function keys K1 to K21 or the like which is displayed on the display unit 29 is touched by hand (finger or the like) of the operator and the finger or the like of the operator slides from the base member 1 to any one of the element members E1 to E21 or the like, it is possible to present the convex shape feeling which become thicker rapidly from an eaves-shaped region along the sliding direction from one portion of the display surface and also which is fallen in rapidly from an eaves-shaped region toward the other portion of the display surface. Thus, it is possible to provide the input device 316a with touch-sensitive input sheet for icon touch.

Also, according to the input device 316a shown in FIG. 35B, the embodiment of the transparent touch-sensitive input sheet 118a relating to the present application is applied, so that even if the display surface is observed as a flat shape, when the icon image or the like of the various kinds of function keys K1 to K21 or the like which is displayed on the display unit 29 is touched by hand (finger or the like) of the operator and the finger or the like of the operator slides from the base member 1a to any one of the element members E1 to E21 or the like, it is possible to present the convex shape feeling which become thicker smoothly from a slant-shaped region along the sliding direction from one portion of the display surface and also which become thinner smoothly from a slant-shaped region toward the other portion of the display surface. Thus, it is possible to provide the input device 316a with touch-sensitive input sheet for icon touch.

Embodiment 19

Figure 36A:
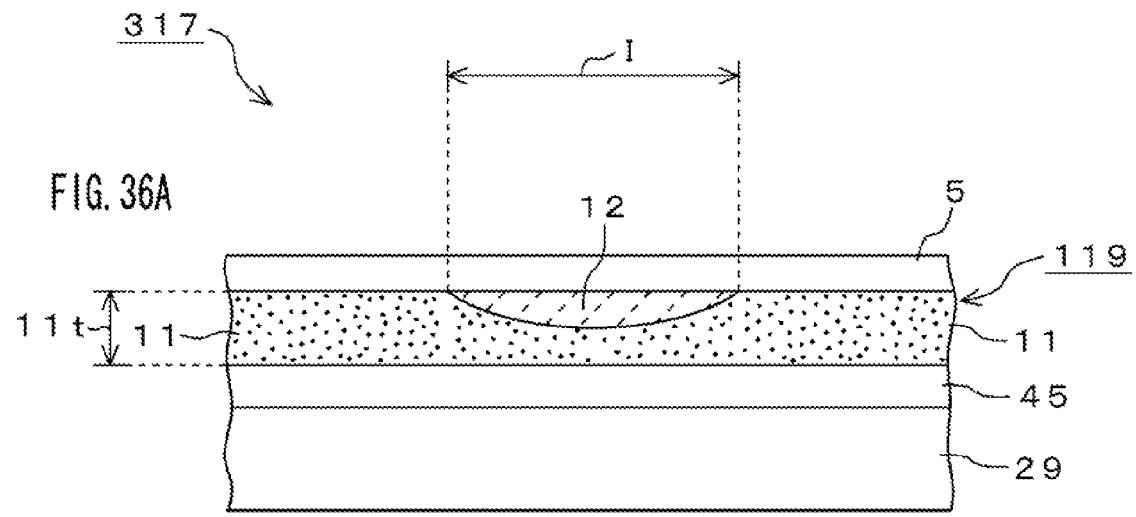
FIGS. 36A and 36B are cross-sectional views of one element of an icon image of input devices 317, 317a according to a nineteenth embodiment showing constitutional examples thereof.
Figure 36B:
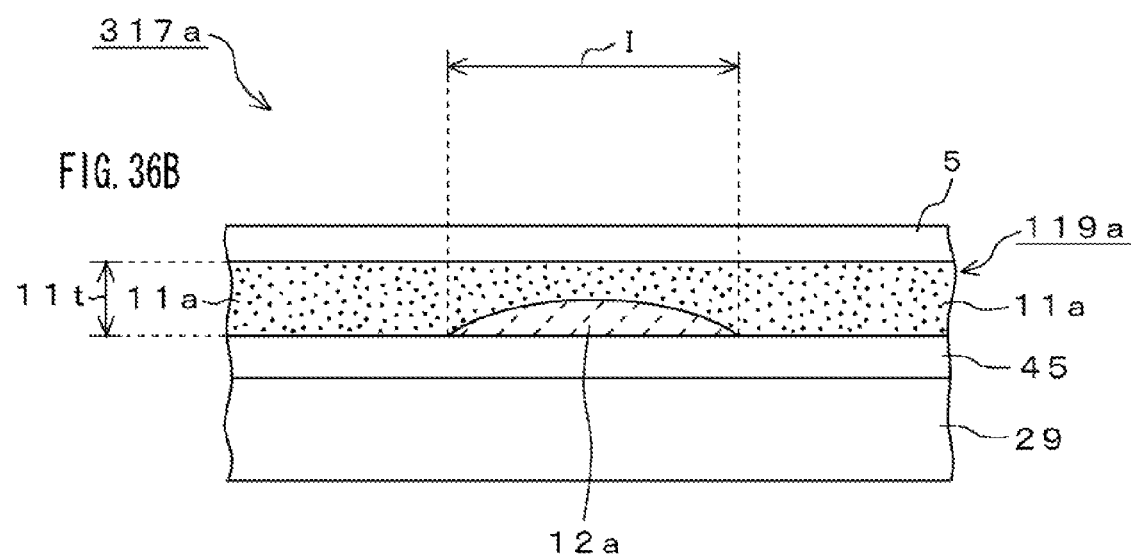

FIGS. 36A and 36B show a constitutional example of one element of an icon image of input device 317 or 317a relating to a nineteenth embodiment. In this embodiment, there is cited a case in which the hardness of each element member 12 of a touch-sensitive input sheet 119 is set to be low with respect to the hardness of a base member 11 of the touch-sensitive input sheet 119 and in which each of the element members 12 forms a downward semi-cylindrical or hemisphere shape and further, each of the element member 12 is not provided on the whole surface of the base member 11.

According to the input device 317 shown in FIG. 36A, an input detection unit 45, the touch-sensitive input sheet 119 and a top member 5 are laminated on the display unit 29 in a similar order as the third embodiment. The touch-sensitive input sheet 119 provided on the input detection unit 45 contains the base member 11 of hardness 60° to 80°, which is formed as a sheet-shape, and the element members 12 of hardness of around 20° to 40°, each of which forms a block-shape. A symbol "I" in the drawing denotes a display region, and the display region "I" displays, for example, an icon image (input image) of the numeral key K1 of "1" or the like, which is similar to the third and fourth embodiments. With respect to the icon images of other function keys K2 to K21, it is just the same as mentioned in the third embodiment that the display regions "I" are defined similarly.

In this embodiment, each of the element members 12 includes at least the display region "I" of the icon image displayed on the display unit 29 and is surrounded by the base member 11. For example, a boundary region in which the base member 11 and each of the element members 12 are joined forms a semi-cylindrical or hemisphere shape which is hung down toward the display unit 29. It is just the same as mentioned in the third embodiment that the element member 12 shown in FIG. 36A corresponds to each of the element members E1 to E11 facing the icon image of the various kinds of function keys K1 to K11 shown in FIG. 8.

In this embodiment, each of the element members 12 has a downward semi-cylindrical or hemisphere shape and further, each of the element members 12 is provided in only the display region "I" without providing it on the whole surface of the base member 11. For the base member 11, for example, polycarbonate-based transparent material of the film thickness 11t of around 100 μm, which forms one example of transparent material, is used. For the element members 12, transparent silicon rubber member of hardness 20° to 40° for soft transparent material, which has a refractive index close to that of the polycarbonate-based transparent material, is used and the film thickness thereof is embedded so as to become around 50 μm and the upper potion thereof is planarized.

When constituting the touch-sensitive input sheet 119 in this manner, similarly as the fifth embodiment, it is possible to present the concave shape feeling which slides-down from the downward semi-cylindrical or hemisphere shaped region along the sliding direction from one portion of the display surface and also which slides-up from the semi-cylindrical or hemisphere shaped region toward the other portion of the display surface. Furthermore, each of the element members 12 constitutes a concave lens, so that it is possible for the icon image to be demagnified and visually confirmed and it is possible to obtain the lens effect. Also in this embodiment, it is also allowed to insert a surface plate into a position between the input detection unit 45 and the touch-sensitive input sheet 119. With respect to the insertion reason of this display plate, it is just the same as mentioned in the third embodiment.

FIG. 36B shows a constitutional example of one element of an icon image of an input device 317a. In this embodiment, each element member 12a forms an upward semi-cylindrical or hemisphere shape. Namely, a shape of each of the element members 12 shown in FIG. 36A is reversed as each of the element member 12a shown in FIG. 36B. In particular, each of the element members 12a brings out the lens effect.

According to the input device 317a shown in FIG. 36B, an input detection unit 45, a touch-sensitive input sheet 119a and a top member 5 are laminated on the display unit 29 in a similar order as the third embodiment. The touch-sensitive input sheet 119a provided on the input detection unit 45 contains the base members 11a of hardness 60° to 80°, which is formed as a sheet-shape, and the element members 12a of hardness of around 20° to 40°, each of which forms a block-shape. A symbol "I" in the drawing denotes a display region, and the display region "I" displays, for example, an icon image (input image) of the numeral key K1 of "1" or the like, which is similar to the third and fourth embodiments. With respect to the icon images of other function keys K2 to K21, it is just the same as mentioned in the third embodiment that the display regions "I" are defined similarly.

In this embodiment, each of the element members 12a includes at least the display region "I" of the icon image displayed on the display unit 29 and is surrounded by the base member 11a. For example, a boundary region in which the base member 11a and each of the element members 12a are joined forms a semi-cylindrical or hemisphere shape extending toward the upward direction from the display unit 29. It is just the same as mentioned in the third embodiment that the element member 12*a* shown in FIG. 36B corresponds to each of the element members E1 to E11 facing the icon image of the various kinds of function keys K1 to K11 shown in FIG. 8.

In this embodiment, each of the element members 12*a* has the upward semi-cylindrical or hemisphere shape and further, each of the element members 12*a* is provided in only the display region "I" without providing it on the whole surface of the base member 11*a*. For the base member 11*a*, for example, polycarbonate-based transparent material of the film thickness 11*t* of around 100 μm, which forms one example of transparent material, is used. For the element members 12*a*, transparent silicon rubber member of hardness 20° to 40° for soft transparent material, which has a refractive index close to that of the polycarbonate-based transparent material, is used and the film thickness thereof is embedded so as to become around 50 μm and the base member 11*a* thereon is planarized.

When constituting the touch-sensitive input sheet 119*a* in this manner, as compared with the fifth embodiment, it is possible to present the concave shape feeling which is fallen in at the upward semi-cylindrical or hemisphere shaped region along the sliding direction from one portion of the display surface. Furthermore, each of the element members 12*a* constitutes a concave lens, so that it is possible for the icon image to be enlarged and visually confirmed and it is possible to obtain the lens effect. Also in this embodiment, it is also allowed to insert a surface plate into a position between the input detection unit 45 and the touch-sensitive input sheet 119*a*. With respect to the insertion reason of this display plate, it is just the same as mentioned in the third embodiment.

In this manner, according to the input device 317 as the nineteenth embodiment, the embodiment of the transparent touch-sensitive input sheet 119 relating to the present application is applied, so that even if the display surface is observed as a flat shape, when the icon image or the like of the various kinds of function keys K1 to K21 or the like which is displayed on the display unit 29 is touched by hand (finger or the like) of the operator and the finger or the like of the operator slides from the base member 11*a* to any one of the element members E1 to E21 or the like, it is possible to present an input operation accompanied by the convex shape feeling which slides-down from the downward semi-cylindrical or hemisphere shaped region along the sliding direction from one portion of the display surface and also which slides-up from the semi-cylindrical or hemisphere shaped region toward the other portion of the display surface. Thus, it is possible to provide the input device 317 with touch-sensitive input sheet for icon touch.

Also, according to the input device 317*a* shown in FIG. 36B, the embodiment of the transparent touch-sensitive input sheet 119*a* relating to the present application is applied, so that even if the display surface is observed as a flat shape, when the icon image or the like of the various kinds of function keys K1 to K21 or the like which is displayed on the display unit 29 is touched by hand (finger or the like) of the operator and the finger or the like of the operator slides from the base member 11*a* to any one of the element members E1 to E21 or the like, it is possible to present the convex shape feeling which is fallen in at the upward semi-cylindrical or hemisphere shaped region along the sliding direction from one portion of the display surface. Furthermore, each of the element members 12*a* constitutes a convex lens, so that it is possible for the icon image to be magnified and visually confirmed. Thus, it is possible to provide the input device 317*a* with touch-sensitive input sheet for icon touch.

Embodiment 20

FIGS. 37A and 37B show a constitutional example of one element of an icon image of input device 318 or 318*a* relating to a twentieth embodiment.

In this embodiment, there is cited a case in which the hardness of each element member 2 of a touch-sensitive input sheet 120 is set to be high with respect to the hardness of a base member 1 of the touch-sensitive input sheet 120 and in which each of the element member 2 forms a downward semi-cylindrical or hemisphere shape and further, each of the element member 2 is not provided on the whole surface of the base member 1.

According to the input device 318 shown in FIG. 37A, an input detection unit 45, the touch-sensitive input sheet 120 and a top member 5 are laminated on the display unit 29 in a similar order as the third embodiment. The touch-sensitive input sheet 120 provided on the input detection unit 45 contains the base member 1 of hardness 20° to 40°, which is formed as a sheet-shape, and the element members 2 of hardness of around 60° to 80°, each of which forms a block-shape. A symbol "I" in the drawing denotes a display region, and the display region "I" displays, for example, an icon image (input image) of the numeral key K1 of "1" or the like, which is similar to the third and fourth embodiments. With respect to the icon images of other function keys K2 to K21, it is just the same as mentioned in the third embodiment that the display regions "I" are defined similarly.

In this embodiment, each of the element members 2 includes at least the display region "I" of the icon image displayed on the display unit 29 and is surrounded by the base member 1. For example, a boundary region in which the base member 1 and each of the element members 2 are joined forms a semi-cylindrical or hemisphere shape which is hung down toward the display unit 29. It is just the same as mentioned in the third embodiment that the element member 2 shown in FIG. 37A corresponds to each of the element members E1 to E11 facing the icon image of the various kinds of function keys K1 to K11 shown in FIG. 8.

In this embodiment, each of the element members 2 has a downward semi-cylindrical or hemisphere shape and further, each of the element members 2 is provided in only the display region "I" without providing it on the whole surface of the base member 1. For the element member 2, for example, polycarbonate-based transparent material, which forms one example of transparent material, is used. Each of the element member 2 is embedded with the base member 1 so that the film thickness of each of the element members 2 becomes around 50 μm, and the upper potion of each of the element members 2 is planarized. For the base member 1, soft transparent material which has a refractive index close to that of the polycarbonate-based transparent material is used. For example, transparent silicon rubber member of hardness of around 20° to 40° is formed with the film thickness of around 100 μm.

When constituting the touch-sensitive input sheet 120 in this manner, similarly as the fifth embodiment, it is possible to present the convex shape feeling in which a reactive force increases at the downward semi-cylindrical or hemisphere shaped region along the sliding direction from one portion of the display surface. Furthermore, each of the element members 2 constitutes a concave lens, so that it is possible for the icon image to be demagnified and visually confirmed and it is possible to obtain the lens effect, which is similar to the nineteenth embodiment. Also in this embodiment, it is also allowed to insert a surface plate into a position between the input detection unit 45 and the touch-sensitive input sheet 120. With respect to the insertion reason of this display plate, it is just the same as mentioned in the third embodiment.

FIG. 37B shows a constitutional example of one element of an icon image of an input device 318a. In this embodiment, each element member 2a forms an upward semi-cylindrical or hemisphere shape. Namely, a shape of each of the element members 2 shown in FIG. 37A is reversed as each of the element member 2a shown in FIG. 37B. Also in this embodiment, each of the element members 2a brings out the convex lens effect.

According to the input device 318a shown in FIG. 37B, an input detection unit 45, a touch-sensitive input sheet 120a and a top member 5 are laminated on the display unit 29 in a similar order as the third embodiment. The touch-sensitive input sheet 120a provided on the input detection unit 45 contains the base members 1a of hardness 20° to 40°, which is formed as a sheet-shape, and the element members 2a of hardness of around 60° to 80°, each of which forms a block-shape. A symbol "I" in the drawing denotes a display region, and the display region "I" displays, for example, an icon image (input image) of the numeral key K1 of "1" or the like, which is similar to the third and fourth embodiments. With respect to the icon images of other function keys K2 to K21, it is just the same as mentioned in the third embodiment that the display regions "I" are defined similarly.

In this embodiment, each of the element members 2a includes at least the display region "I" of the icon image displayed on the display unit 29 and is surrounded by the base member 1a. For example, a boundary region in which the base member 1a and each of the element members 2a are joined forms a semi-cylindrical or hemisphere shape extending toward the upward direction from the display unit 29. It is just the same as mentioned in the third embodiment that the element member 2a shown in FIG. 37B corresponds to each of the element members E1 to E11 facing the icon image of the various kinds of function keys K1 to K11 shown in FIG. 8.

In this embodiment, each of the element members 2a has the upward semi-cylindrical or hemisphere shape and further, each of the element members 2a is provided in only the display region "I" without providing it on the whole surface of the base member 1a. For the base member 1a, for example, polycarbonate-based transparent material of the film thickness of around 100 μm, which forms one example of transparent material, is used. For the element members 2a, hardish transparent material which has a refractive index close to that of the polycarbonate-based transparent material is used and the base member 1a is embedded with each of the element members 2a so that the film thickness of each of the element members 2a becomes around 50 μm and the base member 1a thereon is planarized.

When constituting the touch-sensitive input sheet 120a in this manner, as compared with the fifth embodiment, it is possible to present the concave shape feeling in which the reactive force decreases at the upward semi-cylindrical or hemisphere shaped region along the sliding direction from one portion of the display surface. Furthermore, each of the element members 2a constitutes a convex lens, so that it is possible for the icon image to be magnified and visually confirmed and it is possible to obtain the lens effect. Also in this embodiment, it is also allowed to insert a surface plate into a position between the input detection unit 45 and the touch-sensitive input sheet 120. With respect to the insertion reason of this display plate, it is just the same as mentioned in the third embodiment.

In this manner, according to the input device 318 as the twentieth embodiment, the embodiment of the transparent touch-sensitive input sheet 120 relating to the present application is applied, so that even if the display surface is observed as a flat shape, when the icon image or the like of the various kinds of function keys K1 to K21 or the like which is displayed on the display unit 29 is touched by hand (finger or the like) of the operator and the finger or the like of the operator slides from the base member 1 to any one of the element members E1 to E21 or the like, it is possible to present an input operation accompanied by the convex shape feeling in which the reactive force increases at the downward semi-cylindrical or hemisphere shaped region along the sliding direction from one portion of the display surface. Thus, it is possible to provide the input device 318 with touch-sensitive input sheet for icon touch.

Also, according to the input device 318a shown in FIG. 37B, the embodiment of the transparent touch-sensitive input sheet 120a relating to the present application is applied, so that even if the display surface is observed as a flat shape, when the icon image or the like of the various kinds of function keys K1 to K21 or the like which is displayed on the display unit 29 is touched by hand (finger or the like) of the operator and the finger or the like of the operator slides from the base member 1a to any one of the element members E1 to E21 or the like, it is possible to present the convex shape feeling in which the reactive force decreases at the upward semi-cylindrical or hemisphere shaped region along the sliding direction from one portion of the display surface. Furthermore, each of the element members 2a constitutes a convex lens, so that it is possible for the icon image to be magnified and visually confirmed. Thus, it is possible to provide the input device 318a with touch-sensitive input sheet for icon touch.

In the above-mentioned third to thirteenth, fifteenth, seventeenth and nineteenth embodiments, although it has been described that the polycarbonate-based transparent material of hardness of around 60° to 80° is used for the base members 11, 11a, 11b of the touch-sensitive input sheets 103 to 113, 115, 117, 119 and the transparent silicon rubber member of hardness of around 20° to 40° is used for the element members 12, they are not limited to this; transparent silicon rubber member of hardness of around 60° to 80° may be used for the base members 11, 11a, 11b and transparent silicon rubber member of hardness of around 20° to 40° is used for the element members 12 thereof.

Further, polyethylene terephthalate-based transparent material of hardness of around 60° to 80° may be used for the base members 11 and the like of the touch-sensitive input sheets 103 to 113, 115, 117, 119 and transparent silicon rubber member of hardness of around 20° to 40° may be used for the element members 12.

Also, polyethersulfone-based transparent material of hardness of around 60° to 80° may be used for the base members 11 and the like of the touch-sensitive input sheets 103 to 113, 115, 117, 119 and transparent silicon rubber member of hardness of around 20° to 40° may be used for the element members 12. Further, transparent optical member of hardness of around 60° to 80° (Zeonor (trade mark), Arton (trade mark) or the like) may be used for the base members 11 and the like of the touch-sensitive input sheets 103 to 113, 115, 117, 119 and transparent silicon rubber member of hardness of around 20° to 40° may be used for the element members 12.

In the above-mentioned fourteenth, sixteenth, eighteenth and twentieth embodiments, although it has been described that transparent silicon rubber member of hardness of around 20° to 40° is used for the base members 1 of the touch-sensitive input sheets 114, 116, 118, 120 and polycarbonate-based transparent material of hardness of around 60° to 80° is used for the element members 2, they are not limited to this;

transparent silicon rubber member of hardness 20° to 40° may be used for the base members 1 of the touch-sensitive input sheets 114, 116, 118, 120 and transparent silicon rubber member of hardness 60° to 80° may be used for the element members 2 thereof.

Also, transparent silicon rubber member of hardness 20° to 40° may be used for the base members 1 of the touch-sensitive input sheets 114, 116, 118, 120 and polycarbonate-based transparent material of hardness of around 60° to 80° may be used for the element members 2 thereof. Further, transparent silicon rubber member of hardness 20° to 40° may be used for the base members 1 of the touch-sensitive input sheets 114, 116, 118, 120 and polyethylene terephthalate-based transparent material of hardness of around 60° to 80° may be used for the element members 2 thereof.

Also, transparent silicon rubber member of hardness 20° to 40° may be used for the base members 1 of the touch-sensitive input sheets 114, 116, 118, 120 and polyethersulfone-based transparent material of hardness of around 60° to 80° may be used for the element members 2 thereof. Further, transparent silicon rubber member of hardness 20° to 40° may be used for the base members 1 of the touch-sensitive input sheets 114, 116, 118, 120 and transparent optical member (Zeonor (trade mark), Arton (trade mark) or the like) of hardness of around 60° to 80° may be used for the element members 2 thereof. In this manner, the touch-sensitive input sheets 103 to 120 can present the concavity and convexity feeling to the finger or the like of the operator 30 without spoiling visibility of the display unit 29 at a time of the input operation by using at least two species of the transparent members whose refractive indexes are approximately equal and whose bending elasticity are different on the operation surface.

Embodiment 21

Figure 38:
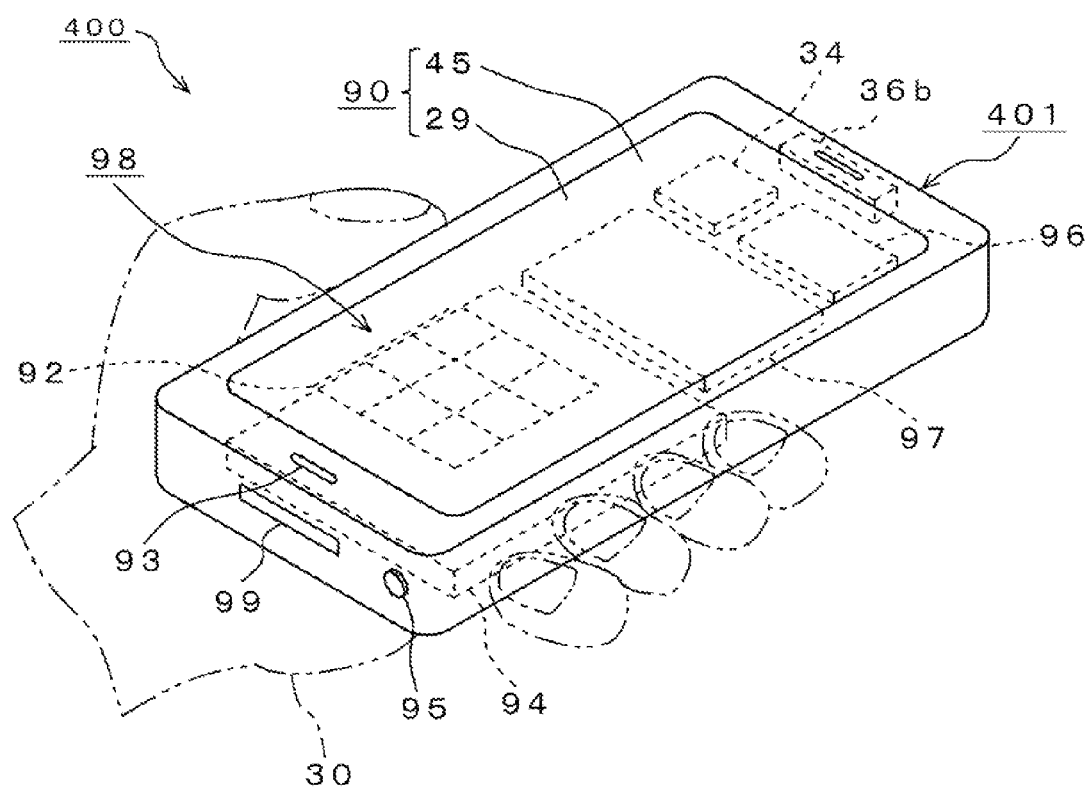
FIG. 38 is a perspective view showing a constitutional example of a non-foldable mobile phone 400, as a twenty-first embodiment, which includes an embodiment of an input device 90 according to the present application.

FIG. 38 shows a constitutional example of a non-foldable mobile phone 400 as a twenty-first embodiment according to the present application, which includes an input device 90 as an embodiment according to the present application.

The mobile phone 400 shown in FIG. 38 constitutes the electronic apparatus and includes the input device 90 with a touch-sensitive input sheet for icon touch. The mobile phone 400 is the electronic apparatus with a touch-sensitive input function which presents sense of touch to an operation body (operator) at a time of information input operation. The mobile phone 400 also executes various kinds of data processing including a sound and image processing other than a telephone function. Here, the touch-sensitive input sheet for icon touch is referred to as a touch sheet by which an input operation accompanied by a concavity and convexity feeling can be realized when an icon image displayed on the display unit 29 is touched by hand (finger or the like) of an operator. Of course, such touching is not limited to the operator's finger 30*a*; an operation body such as a pen can be used when executing the input operation. The mobile phone 400 can take a subject picture and record ambient sound.

The mobile phone 400 includes a single body housing 401 having an operation surface and the input device 90 with touch-sensitive input function. The input device 90 is provided in the housing 401 and inputs information by a slide or/and pushdown operation depending on the finger 30*a* or the like of the operator. Any one of the input devices 301 to 318, 318*a* with touch-sensitive input sheet explained in the first to twentieth embodiments relating to the present application is applied to this input device 90.

An ultra-miniaturized speaker 36*b* with an actuator function is provided at an upper middle portion of a surface of the housing 401 and has both functions of a receiver for phone call (telephone receiver) and an actuator function for presenting the sense of touch. The speaker 36*b* receives vibration control signal for presenting the sense of touch, the vibration control signal having 200 Hz, other than a sound signal. The input device 90 with touch-sensitive function is provided in the lower direction of the speaker mounting surface of the housing 401, that is, approximately on the whole region of the front surface of the housing 401.

The input device 90 contains the input detection unit 45 and the display unit 29 and gives (presents) the sense of touch in response to any pushdown operation by the operation body to the input detection surface on the display screen. The input detection unit 45 having an operation surface is provided on the display unit 29 and detects a slide position and a push operation of the finger 30*a* or the like of the operator 30. For example, the input device 301 mounted with the touch-sensitive input sheet 103 relating to the third embodiment is applied to the input device 90.

In this case, the transparent touch-sensitive input sheet 103 covers a portion or the whole of the input detection unit 45. The finger 30*a* or the like of the operator 30 slides on the transparent touch-sensitive input sheet 103 along the operation surface of the input detection unit 45 or/and pushes down the transparent touch-sensitive input sheet 103. The touch-sensitive input sheet 103 includes a base member 11 having a predetermined hardness which forms a sheet shape and element members 12 having a predetermined sized block-shape which is distributed in spots or at predetermined positions of the base member 11, wherein the both of the base member 11 and the element members 12 are approximately equal in the light transmissive properties, and each of the element members 12 has the different hardness from the hardness of the base member 11 (see FIG. 9).

In this embodiment, the display unit 29 has the display region which is divided into two display regions. Any input information of a plurality of button icons or the like is displayed on an upper display region and an operation panel 98 is displayed on a lower display region. Also in this embodiment, when the finger 30*a* or the like of the operator 30 operates an icon image for the input operation displayed on the display unit 29, the speaker 36*b* presents any clicking sound (cyber switch operation sound) and the sense of touch is presented to the operator's finger 30*a* touching on the display screen.

In this embodiment, further, even if the display surface of the display unit 29 is observed as a flat shape, when the icon image or the like of the various kinds of function keys K1 to K21 or the like which is displayed on the display unit 29 is touched by hand (finger or the like) of the operator and the finger or the like of the operator slides from the base member 11 to any one of the element members E1 to E21 or the like, it is possible to present an input operation accompanied with the concave shape feeling of being dug-down stepwise along the sliding direction from one portion of the display surface and also, of being dug-up stepwise toward the other portion of the display surface. Such an input operation enables the input of the button icon or the like displayed on the display unit 29 to be determined in the mobile phone 400.

In this embodiment, the operation panel 98 displayed on the display unit 29 is constituted by a plurality of push button switches 92. For example, the push button switches 92 are constituted by numeral keys from 0 to 9, symbol keys of "*", "#" and the like, hook buttons of "ON", "OFF" and the like and a menu key or the like (see FIG. 8). A camera 34 is mounted on the back surface of the display unit 29 and is operated so as to take a subject picture. A microphone 93 for phone call is mounted on the downward side of the upper surface of the housing 401, and functions as a telephone transmitter.

It should be noted that a connector 99 such as a USB terminal is arranged on the outside of the front surface of the housing 401, and can perform any communication processing to external equipment. A module type antenna 96 is mounted on the inside of the housing 401. A speaker for loud sound, which is not shown, is provided at the inner periphery thereof and emits the incoming melody or the sound (music) or the like which is added to image data. A circuit board 97 is provided on the inside of the housing 401. Further, a battery 94 is built-in in the housing 401 and supplies power to the circuit board 97, the display unit 29 and the like.

Figure 39:
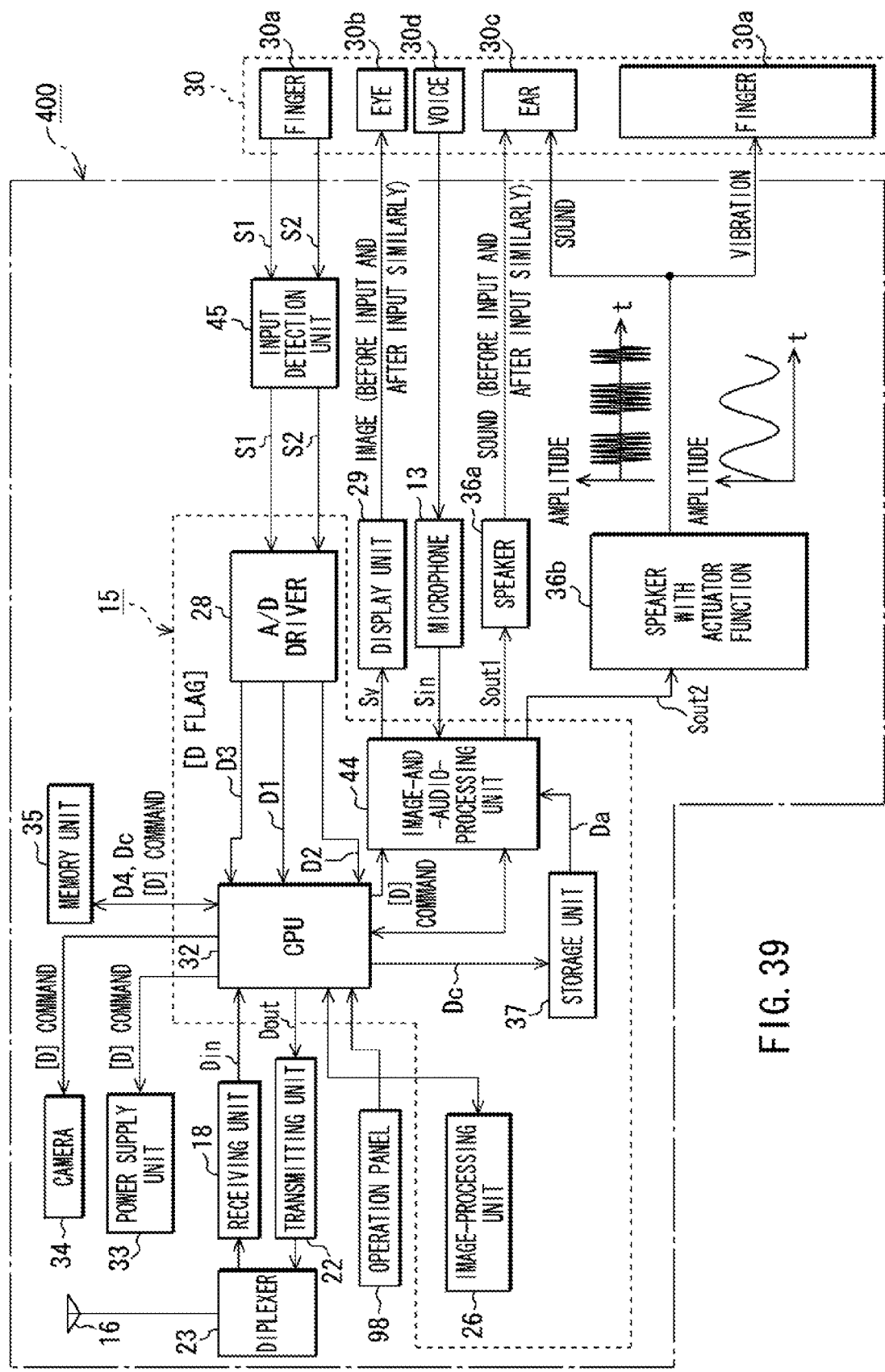
FIG. 39 is a block diagram showing a constitutional example of a control system of the mobile phone 400 and a feeling feedback function example thereof.

The following will describe the mobile phone 400 with touch-sensitive function including the touch-sensitive input sheet. FIG. 39 shows a constitution example of a control system of the mobile phone 400 and its feeling feedback function example.

The mobile phone 400 shown in FIG. 39 is constituted by mounting a block of each function on the circuit board 97 of the housing 401. It should be noted that in FIG. 39, portions corresponding to respective portions shown in FIG. 38 are shown by the same reference numerals. The mobile phone 400 contains a control unit 15, a receiving unit 18, a transmitting unit 22, an antenna diplexer 23, an input detection unit 45, the display unit 29, a power supply unit 33, a camera 34, a memory unit 35, a speaker 36a for incoming melody, a speaker 36b including actuator function and an operation panel 98.

For the input detection unit 45 shown in FIG. 39, as shown in FIG. 8, an input device such as an electrostatic capacitance system, a resistance film system, a surface acoustic wave (SAW) system, an optical system, and a tact switch of a multi stage system is used. The input detection unit 45 outputs any position detection information and any force detection information to the control unit 15. The input detection unit 45 detects a slide position of the finger 30a of the operator 30 and the pressing thereby and outputs at least a position detection signal S1 and an input detection signal S2 which indicates an amount of input (pushed-down force; pressured force "F").

The control unit 15 contains an image-processing unit 26, an A/D-driver 28, a CPU 32, a storage unit 37 and an image-and-audio-processing unit 44. The input detection unit 45 supplies the A/D-driver 28 with the position detection signal S1 and the input detection signal S2. The A/D-driver 28 converts an analogue signal composed of the position detection signal S1 and the input detection signal S2 to digital data in order to distinguish the function of the cursoring and the function of the icon selection. Other than this, the A/D-driver 28 calculates this digital data to detect which is the cursoring input or the icon selection information, and supplies flag data D3 by which the cursoring input or the icon selection is distinguished, the position detection information D1 or the input detection information D2 to the CPU 32. These calculations may be executed in the CPU 32.

The A/D-driver 28 is connected with the CPU 32. The CPU 32 controls the whole of the phone based on a system program. A memory unit 35 stores system program data for controlling the whole of the phone. A RAM, which is not shown, is used as a work memory. The CPU 32 reads out the system program data from the memory unit 35 to expand the program data in the RAM at the same time when turning the power ON, and starts up the system to control the whole mobile phone. For example, the CPU 32 performs a control so as to receive the position detection information D1, the input detection information D2 and the flag data D3 (hereinafter, simply also referred to as input data) from the A/D-driver 28 to supply predetermined instruction data "D" to the devices of the power supply unit 33, the camera 34, the memory unit 35, the storage unit 37, the image-and-audio-processing unit 44 or the like. The CPU 32 also performs a control so as to take-in the reception data from the receiving unit 21 and to transfer the transmission data to the transmitting unit 22.

In this embodiment, the CPU 32 compares the input detection information D2 obtained from the input detection unit 45 with a preset pushdown determination threshold Fth and controls the storage unit 37 so as to vibration-control the speaker 36b with actuator function based on the comparison result. For example, when the senses of touch propagated from the input detection surface in the pushdown position of the input detection unit 45 are assumed to be "A" and "B", a sense of touch "A" is obtained by changing the input detection surface in response to the pressured force "F" by the operator's finger 30a in the pushdown position thereof from a low frequency and small amplitude vibration pattern to a high frequency and large amplitude vibration pattern. Also, a sense of touch "B" is obtained by changing the input detection surface in response to pressured force "F" by the operator's finger 30a in the pushdown position thereof from a high frequency and large amplitude vibration pattern to a low frequency and small amplitude vibration pattern.

The above-mentioned CPU 32 is connected with the memory unit 35 which records display information D4 for displaying the display screen for input item selection, for example, three-dimensionally, control information Dc relating to the selection position of the icon corresponding to the display information D4 and the vibration mode, and the like in every display screen. The control information Dc includes algorism. The algorism can generate a plurality of different senses of touch synchronized with application (three-dimensional display and various kinds of display contents) in the display unit 29. The algorism sets a plurality of specific vibration waveforms which generate the senses of touch thereof and sets specific sense of touch generation mode for every application. For the memory unit 35, an EEPROM, an ROM, an RAM or the like is used.

In this embodiment, the CPU 32 executes the display control of the display unit 29 and the output-control of the speaker 36b with actuator function based on the position detection information D1, the input detection information D2 and the flag data D3, which are outputted from the A/D-driver 28. For example, the control unit 15 controls the input detection unit 45 and the memory unit 35 to read out the control information Dc from the memory unit 35 based on the position detection signal S1 and the input detection signal S2, which are obtained from the input detection unit 45, so that the control unit 15 accesses to the storage unit 37 and supplies a vibration generating signal Sout2 to the speaker 36b with actuator function.

For example, the CPU 32 performs any read-out-controls on the storage unit 37 to start up the sense of touch "A" when the input detection unit 45 detects the input detection information D2 which exceeds the pushdown determination threshold Fth and then, to start up the sense of touch "B" when the input detection unit 45 detects the input detection information D2 which is less than the pushdown determination threshold Fth. Owing to this control, it happens that a different vibration patterns in conformity with "pressured force" by the operator's finger 30a or the like is generated.

The CPU 32 is connected with the storage unit 37, from which vibration generating data Da is read based on the control information Dc from the CPU 32. The vibration generating data Da includes an output waveform composed of a sinusoidal waveform. The storage unit 37 is connected with the image-and-audio-processing unit 44 to which each vibration generating data Da is supplied. The vibration generating data Da thereof is audio-processed (digital/analogue conversion, amplification or the like) and becomes the vibration generating signal Sout2. The image-and-audio-processing unit 44 supplies the vibration generating signal Sout2 to the speaker 36b with actuator function. The speaker 36b vibrates based on the vibration generating signal Sout2.

In this embodiment, the storage unit 37 stores the pushdown determination threshold Fth corresponding to each application. For example, the pushdown determination threshold Fth is stored beforehand in the ROM or the like provided in the memory unit 35 as trigger parameter. The memory unit 35 receives the input detection information D2 under the control of the CPU 32 and compares the pressured force "F" obtained from the input detection information D2 with the preset pushdown determination threshold Fth to execute the determination process of Fth>F and the determination process of Fth≦F or the like.

For example, when the pushdown determination threshold Fth=100 gf is set in the storage unit 37, the input detection surface vibrates based on the vibration pattern for obtaining the sense of touch like a classic switch. Also, when the pushdown determination threshold Fth=20 gf is set, the input detection surface vibrates based on the vibration pattern for obtaining the sense like touch of a cyber switch.

The CPU 32 is connected with an image-processing unit 26 other than the storage unit 37, in which the display information D4 for displaying the button icon or the like three-dimensionally is image-processed. The display information D4 after the image processing is supplied to the display unit 29. In this embodiment, the CPU 32 controls the display unit 29 to display the button icon three-dimensionally with the perspective in the depth direction of the display screen.

In the input device 90 constituted in this manner, the operator 30 can execute the screen input operation accompanied by the sense of touch when pushing down (contacting), for example, one of a plurality of button icons displayed on the display screen for the input item selection to push down the input detection unit 45 in the Z-direction on the display screen. The operator 30 receives vibrations by the finger 30a thereof to feel vibration for every button icon as the sense of touch.

Each function is judged by the sense of sight depending on the eyes of the operator for the display contents of the display unit 29 and by the sense of hearing depending on the ears of the operator for the sound release from the speakers 36a, 36b or the like. The above-mentioned CPU 32 is connected with the display unit 29 and the input detection unit 45, which constitute an operation panel 98 which is used, for example, when a phone number of the partner is inputted manually. The display unit 29 may display a received picture based on a picture signal Sv other than the above-mentioned icon selection screen.

Also, an antenna 16 shown in FIG. 39 is connected with the antenna diplexer 23 and receives a radio wave from the partner through a base station or the like when receiving calls. The antenna diplexer 23 is connected with the receiving unit 18 which receives the reception data introduced from the antenna 16, demodulates the image and audio or the like and outputs image and audio data Din thus demodulated to the CPU 32 or the like. The receiving unit 18 is connected through the CPU 32 with the image-and-audio-processing unit 44 which converts digital audio data to an analog audio signal Sout to output it and/or converts digital image data to an analog image signal Sv to output it.

The image-and-audio-processing unit 44 is connected with the speaker 36a which constitutes a big sound use and the speaker 36b with actuator function which constitutes a receiver. The speaker 36a rumbles the received sound, the incoming melody or the like based on an acoustic signal Sout1 when receiving calls. The speaker 36b receives the audio signal Sout2 and magnifies a speaking voice 30d or the like of the partner. Also, the speaker 36b vibrates based on the vibration generating signal Sout2 when presenting the sense of touch.

This image-and-audio-processing unit 44 is connected other than the speakers 36a, 36b with a microphone 13 constituting a transmitter by which the operator's voice is gathered and an audio signal Sin is outputted. The image-and-audio-processing unit 44 converts the analogue audio signal Sin for transmitting to the partner to digital audio data to output it when transmitting calls, or converts the analogue image signal Sv to digital image data to output it.

The CPU 32 is connected other than the receiving unit 18 with the transmitting unit 22 which performs modulation processing on the image and audio data Dout or the like for transmitting to the partner and supplies modulated transmission data to the antenna 16 through the antenna diplexer 23. The antenna 16 radiates a radio wave supplied from the antenna diplexer 23 toward a base station or the like.

The above-mentioned CPU 32 is connected other than the transmitting unit 22 with the camera 34 which takes a subject and transmits, for example, still image information or operation information to the partner through the transmitting unit 22. The camera 34 is provided on the rear surface side of the housing 401. The power supply unit 33 includes a battery 94, and supplies a DC power to the receiving unit 18, the transmitting unit 22, the display unit 29, the CPU 32, the camera 34, the memory unit 35, the storage unit 37, the image-and-audio-processing unit 44 and the input detection unit 45. It should be noted that in this embodiment, although a case has been described in which the storage unit 37 is provided separately from the image-and-audio-processing unit 44, any memory device included in the image-and-audio-processing unit 44 may be compatibly used. Thereby, the number of parts can be reduced.

In this manner, according to the mobile phone 400 as the twenty-first embodiment, with respect to the input device 90 with touch-sensitive function, any embodiment of the input devices 301 to 318 according to the present application is provided. Therefore, when the hardness of each of the element members 12 is set to be low with respect to the hardness of the base member 11, with respect to the slide or/and pressing operation depending on the finger 30a of the operator 30 who operates the mobile phone 400, it is possible to present the concave shape feeling of being dug-down along the sliding direction from one portion of the display surface and also, of being dug-up toward the other portion of the display surface.

Consequently, even if the display surface of the display unit 29 is observed as a flat shape, when the icon image or the like of the various kinds of function keys K1 to K21 or the like displayed on the display unit 29 is touched by hand (finger or the like) of the operator and the finger or the like of the operator slides from the base member 11 to any one of the element members E1 to E21 or the like, it is possible to present the sense of touch combined with the concavity and convexity feeling by the touch-sensitive input sheet 103 and the vibration of 200 Hz by the speaker 36b to the finger 30a of the operator 30 who operates the mobile phone 400.

Thus, it is possible to provide the mobile phone 400 including the touch-sensitive input sheet for icon touch and the input device 90 with function for presenting the sense of touch. Furthermore, the pressing-into button switch is made as an image and the speaker 36b and the actuator are commonly used, so that miniaturization and operability of the input device 90 can be improved. Consequently, it is possible to attempt reduction of malfunction, cost reduction and simplification of the manufacturing process of the mobile phone 400.

With respect to the input function which is difficult to be constituted on the display unit 29 in the past because adequate concavity and convexity expression may have been necessary, in the mobile phone 400, it is possible to constitute the input button or the like which is able to confirm the position by touch even in the dark on the display unit 29. As a result thereof, area and cubic volume in which the input function such as an operation panel has been arranged become unnecessary in the mobile phone 400 and miniaturization and thinner fabrication of the mobile phone 400 become possible.

Embodiment 22

Figure 40:
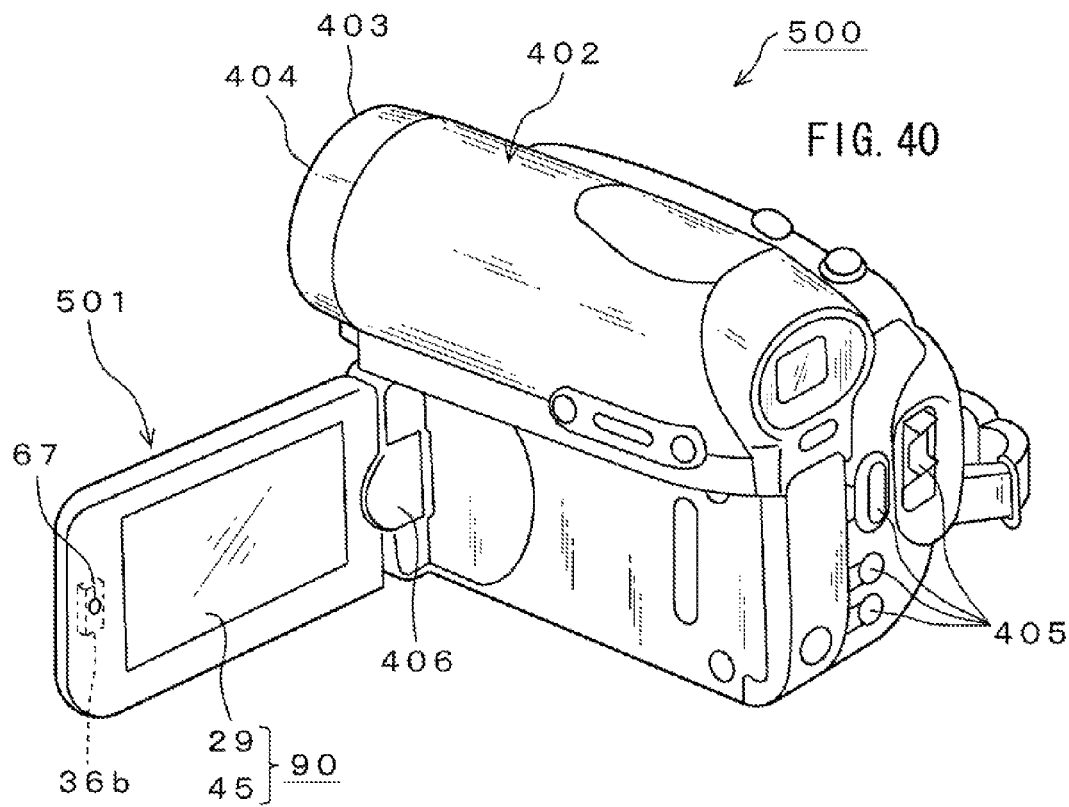
FIG. 40 is a perspective view of a video camera 500, as a twenty-second embodiment, which includes the embodiment of the input device 90 according to the present application, showing a constitutional example thereof.

FIG. 40 shows a constitution example of a video camera 500 as a twenty-second embodiment including an embodiment of the input device 90 according to the present application.

The video camera 500 shown in FIG. 40 constitutes another embodiment of an electronic apparatus and includes the input device 90 with a touch-sensitive input sheet for icon touching. The video camera 500 is the electronic apparatus with a touch-sensitive function which presents a sense of touch to an operation body (operator) at the time of an information input operation, images a subject image and also records the surrounding sound.

The video camera 500 includes a case 402 constituting an exterior and is provided with a lens mirror cylinder 403 including an imaging optical system 404 at the front surface upper portion of the case 402. An image pickup device (not shown in drawings) for imaging a subject image introduced by an imaging optical system 404 is built-in in the rear end of the lens mirror cylinder 403.

Various kinds of operation switches 405 such as a power switch, an imaging start/stop switch, a zoom switch and the like are provided on the rear surface, the upper surface and the side surfaces of the case 402. On the left side surface of the case 402, a touch panel display device 501 with a touch-sensitive input function is coupled to the case 402 through a hinge so as to be closable. The touch panel display device 501 displays the image imaged by an image pickup device which is not shown.

The touch panel display device 501 includes an operation surface. The touch panel display device 501 is provided with the input device 90 which receives information inputted by a slide or/and pushdown operation depending on a finger 30a or the like of an operator. To this touch panel display device 501, any embodiment of the input devices 301 to 318, 318a with touch-sensitive input sheet according to the present application, which have explained in the first to twentieth embodiments, is applied.

The input device 90 has the input detection unit 45 and the display unit 29, and gives (presents) a sense of touch in response to the pushdown operation of the operation body in the input detection surface on the display screen. The input detection unit 45 having the operation surface is provided on the display unit 29, and detects a slide position or a push operation of the finger 30a or the like of the operator 30. For example, the input device 303 mounted with the touch-sensitive input sheet 105 relating to the fifth embodiment is applied to the input device 90 (see FIG. 13).

In this case, the transparent touch-sensitive input sheet 105 covers a portion or the whole of the input detection unit 45 and the finger 30a or the like of the operator 30 slides or/and pushes down the transparent touch-sensitive input sheet 105 along the operation surface of the input detection unit 45. The touch-sensitive input sheet 105 includes the base member 11 having a predetermined hardness which forms a sheet shape and the element members 12 each having a predetermined sized block-shape which are distributed in spots or at predetermined positions of the base member 11. The both of base member 11 and each of the element members 12 are approximately equal in the light transmissive properties and each of the element members 12 has the different hardness from the hardness of the base member 11 (see FIG. 13).

In this embodiment, even if the display surface of the display unit 29 is observed as a flat shape, when the icon image or the like of the various kinds of function keys K1 to K21 or the like which is displayed on the display unit 29 is touched by hand (finger or the like) of the operator and the finger or the like of the operator slides from the base member 11 to any one of the element members E1 to E21 or the like, it is possible to present the concave shape feeling of being dug-down smoothly from a slant-shaped region along the sliding direction from one portion of the display surface and also, of being dug-up smoothly from a slant-shaped region toward the other portion of the display surface. Also in the mobile phone 500, it is possible to determine the input of the button icon or the like displayed on the display unit 29 by this input operation.

Also in this embodiment, when the icon image for input operation displayed on the display unit 29 for monitor of the touch panel display device 501 is operated by the finger 30a, it is constituted so as to present clicking sound (cyber switch operation sound) from the speaker 36b and at the same time, so as to present a sense of touch to the operator's finger touching the display screen.

In this manner, according to the video camera 500 with touch-sensitive function as the twenty-second embodiment, with respect to the touch panel display device 501 with touch-sensitive function, any embodiment of the input devices 301 to 318, 318a according to the present application is provided. Therefore, when the hardness of each of the element members 12 is set to be high with respect to the hardness of the base member 11, in response to the slide or/and pressing-into operation depending on the finger 30a of the operator who operates the video camera 500, it is possible to present the concave shape feeling of being dug-down smoothly from the slant-shaped region along the sliding direction from one portion of the display surface and also, of being dug-up smoothly from the slant-shaped region toward the other portion of the display surface.

Consequently, even if the display surface of the display unit 29 in the touch panel display device 501 is observed as a flat shape, when the icon image or the like of the various kinds of function keys K1 to K21 or the like displayed on the display unit 29 is touched by hand (finger or the like) of the operator and the finger or the like of the operator slides from the base member 11 to any one of the element members E1 to E21 or the like, it is possible to present the sense of touch combined with the concavity and convexity feeling by the touch-sensitive input sheet 105 and the vibration of 200 Hz by the speaker 36b to the finger 30a of a person who operates the video camera 500.

This enables to be provided the video camera 500 including the touch-sensitive input sheet for icon touch and the touch panel display device 501 with function for presenting the sense. Furthermore, the pressing-into button switch is made as an image and the speaker 36b and the actuator are commonly used, so that miniaturization and operability of the touch panel display device 501 can be improved. Consequently, it is possible to attempt reduction of malfunction, cost reduction and simplification of the manufacturing process of the video camera 500.

Embodiment 23

Figure 41:
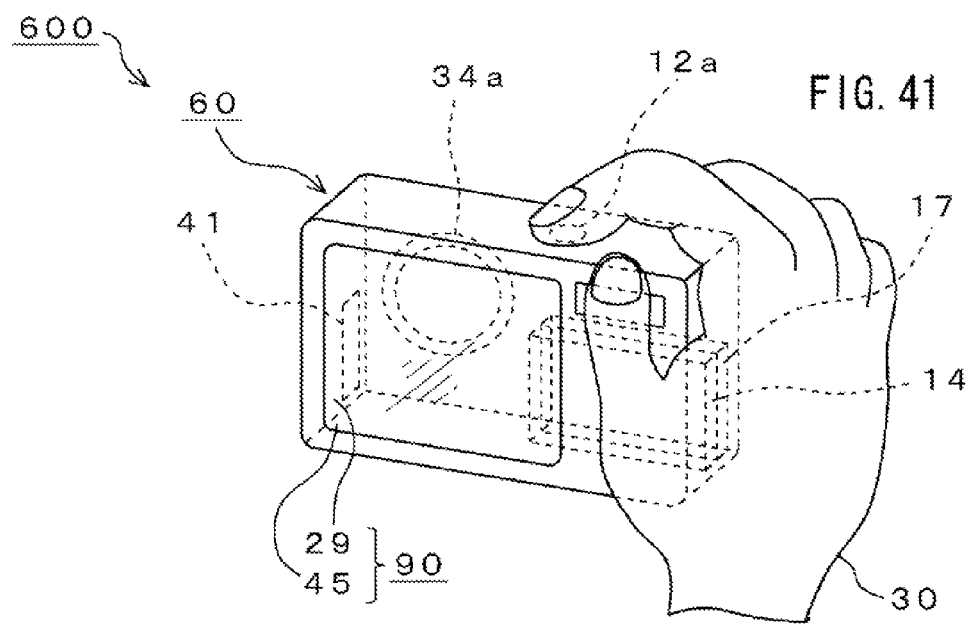
FIG. 41 is a perspective view of a digital camera 600, as a twenty-third embodiment, which includes the embodiment of the input device 90 according to the present application, showing a constitutional example thereof.

FIG. 41 shows a constitution example of a digital camera 600 as a twenty-third embodiment including an embodiment of the input device 90 according to the present application. The digital camera 600 shown in FIG. 41 constitutes the electronic apparatus, includes the input device 90 with a touch-sensitive input sheet for icon touching and processes still picture information obtained by taking a picture of a subject.

The digital camera 600 includes a main body case 60 constituting an exterior and an imaging unit 34a is built in the front surface side of the main body case 60. The imaging unit 34a contains an imager lens, a lens drive mechanism, an image pickup device, which are not shown, and the like. The image pickup device is provided at the posterior end of the imager lens and operates as to take a picture of a subject introduced by an imaging optical system of the imager lens, a lens drive mechanism and the like.

Various kinds of pushdown button switches 92 such as a power supply switch, a mode switch, a zoom switch, a shutter switch 12a and the like are arranged on the rear surface, the upper surface and the side surfaces of the main body case 60. The power supply switch is a switch for turning on or off the power supply of the digital camera 600.

The zoom switch, which is not shown, is operated when zoom-up displaying or zoom-down displaying a subject image. The shutter switch 12a is ON-operated when sending instruction to a control system in order to take-in the still picture information of a picture of a subject displayed on the display unit 29.

Further, the display unit 29 is provided on the back surface side of the main body case 60 and moving-picture-displays (monitors) a picture of a subject which is taken by the imaging unit 34a. For example, the display unit 29 displays a picture (moving picture) when taking a picture, the still picture or the moving picture at a time of a shutter-ON operation or at a time of reproduction. For the display unit 29, for example, a color liquid crystal display device of around 2 to 3 inches is used.

The input detection unit 45 has an operation surface. The input device 90 contains the input detection unit 45 and the display unit 29. The display unit 29 receives any input information by the slide or/and pushdown operation depending on the finger 30a or the like of the operator. Any one of the input devices 301 to 318, 318a with touch-sensitive input sheet explained in the first to twentieth embodiments relating to the present application is applied to this input device 90.

The input device 90 gives (presents) the sense of touch in response to the pushdown operation of the operation body in the input detection surface on the display screen. The input detection unit 45 having the operation surface is provided on the display unit 29, and detects a slide position or a pushdown operation of the finger 30a or the like of the operator 30. For example, the input device 309 mounted with the touch-sensitive input sheet 111 relating to the eleventh embodiment is applied to the input device 90 (see FIG. 25).

In this case, the transparent touch-sensitive input sheet 111 covers a portion or the whole of the input detection unit 45 and the finger 30a or the like of the operator 30 slides or/and pushes down the transparent touch-sensitive input sheet 111 along the operation surface of the input detection unit 45. The touch-sensitive input sheet 111 includes the base member 21 having a predetermined hardness which forms a sheet shape and the element members 12 each having a predetermined sized block-shape, which are distributed in spots or at predetermined positions of the base member 21. Both of the base member 21 and each of element members 12 are approximately equal in the light transmissive properties, and each of the element members 12 has the different hardness from the hardness of the base member 21 (see FIG. 13).

In this embodiment, even if the display surface of the display unit 29 is observed as a flat shape, when the icon image or the like of the various kinds of function keys K1 to K21 or the like which is displayed on the display unit 29 is touched by hand (finger or the like) of the operator and the finger or the like) of the operator slides from the base member 11 to any one of the element members E1 to E21 or the like, it is possible to present the concave shape feeling of being dug-down smoothly from a slant-shaped region along the sliding direction from one portion of the display surface and also, of being dug-up smoothly from a slant-shaped region toward the other portion of the display surface. Also in the digital camera 600, it is possible to determine the input of the button icon or the like displayed on the display unit 29 by this input operation.

A circuit board 17 is provided on the inside of the main body case 60. On the circuit board 17, a memory such as recording media and a media slot is mountable or attachable, and records still picture information of the subject obtained by taking a picture thereof. A control system including the memory is mounted on the circuit board 17.

Other than the circuit board 17, a battery 14 is mounted on the inside of the main body case 60, and supplies a DC power to the circuit board 17, the display unit 29, the imaging unit 34a and the memory. An external interface 41 or the like is provided on the external side of the main body case 60 and can be connected to connectors for image & audio and communication cable kind from external equipment. The external interface 41 is used when outputting the image & audio to the external equipment, and terminals for communication cable is used when communication is executed with the external equipment.

Also in this embodiment, when the icon image for input operation displayed on the display unit 29 for a monitor of the input device 90 is operated by the finger 30a, a speaker 36b, which is not shown, presents clicking sound (cyber switch operation sound) and at the same time, a sense of touch is presented to the operator's finger 30a touching the display screen.

In this manner, according to the digital camera 600 as the twenty-third embodiment, the input device 90 with touch-sensitive function is provided with the embodiment of the input devices 309 according to the present application. Therefore, when the hardness of the element member 12 is set to be high with respect to the hardness of the base member 21, in response to the slide or/and pressing-into operation depending on the finger 30a of the operator who operates the digital camera 600, it is possible to present the input operation accompanied by the concave shape feeling of being dug-down smoothly from a slant-shaped region along the sliding direction from one portion of the display surface and also, of being dug-up smoothly from a slant-shaped region toward the other portion of the display surface.

Consequently, even if the display surface of the display unit 29 in the touch panel display device 501 is observed as a flat shape, when the icon image or the like of the various kinds of function keys K1 to K21 or the like displayed on the display unit 29 is touched by hand (finger or the like) of the operator and the finger or the like of the operator slides from the base member 11 to any one of the element members E1 to E21 or the like, it is possible to present the sense of touch combined with the concavity and convexity feeling by the touch-sensitive input sheet 111 and the vibration of 200 Hz by the speaker 36b to the finger 30a of a person who operates the digital camera 600.

Thus, it is possible to provide the digital camera 600 including the touch-sensitive input sheet for icon touch and the input device 90 with function for presenting the sense of touch. Furthermore, the pressing-into button switch is made as an image and the speaker 36b and the actuator are commonly used, so that miniaturization and operability of the input device 90 can be improved. Consequently, it is possible to attempt reduction of malfunction, cost reduction and simplification of the manufacturing process of the digital camera 600.

With respect to the input function which is difficult to be constituted on the display unit 29 in the past because adequate concavity and convexity expression may have been necessary, in the above-mentioned digital camera 600, it is possible to constitute the shutter switch 12a on the display unit 29. As a result thereof, area and cubic volume in which the input function such as an operation panel has been arranged become unnecessary in the digital camera 600 and miniaturization and thinner fabrication of the digital camera 600 become possible.

Embodiment 24

Figure 42:
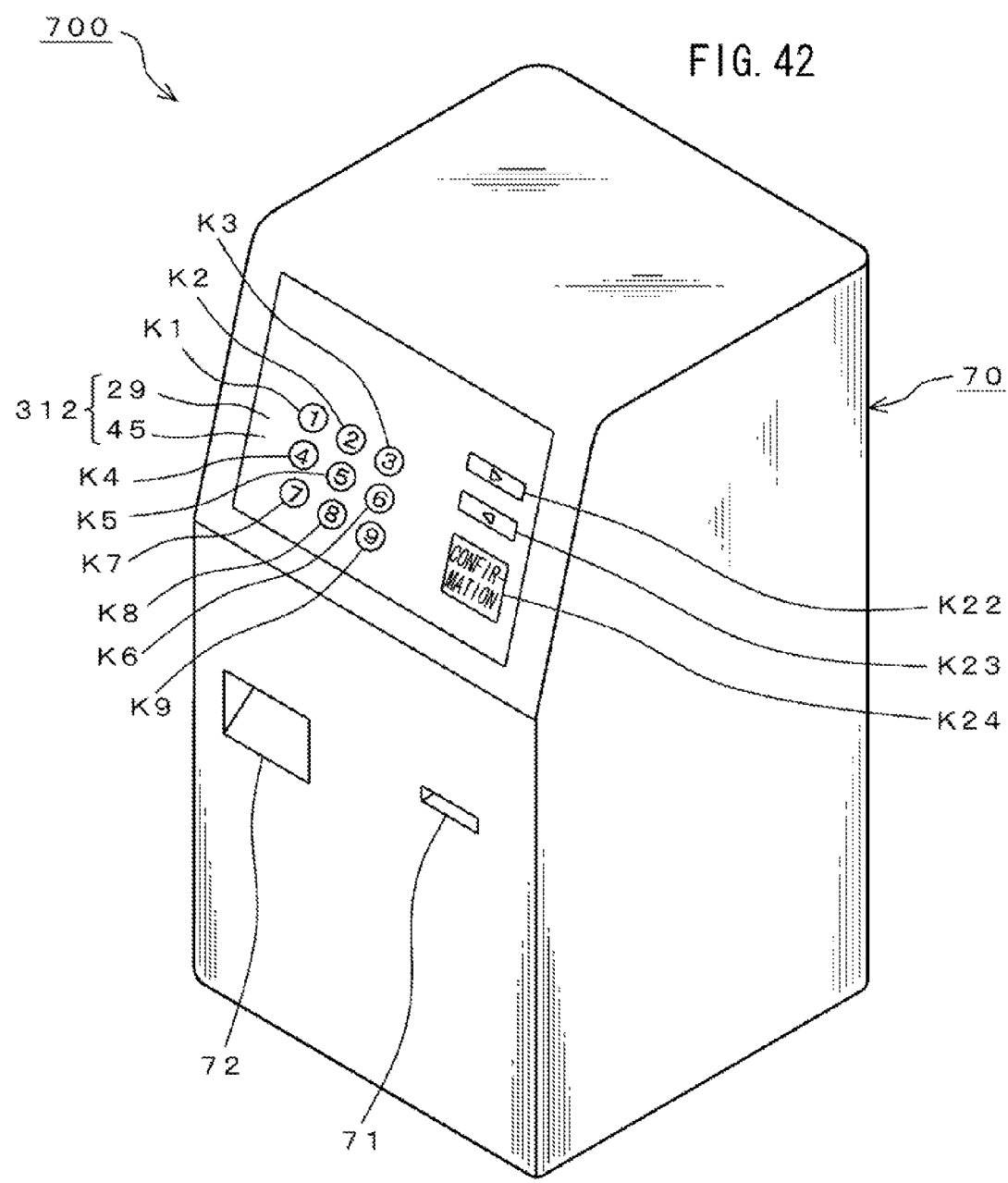
FIG. 42 is a perspective view of an automated teller machine 700, as a twenty-fourth embodiment, which includes an embodiment of an input device 312 according to the present application, showing a constitutional example thereof.

FIG. 42 shows a constitution example of an automated teller machine 700 as a twenty-fourth embodiment including an embodiment of an input device 312 relating to the present application.

The automated teller machine (Automated Teller Machine; hereinafter, referred to as ATM 700) shown in FIG. 42 constitutes the electronic apparatus and includes the input device 312 with touch-sensitive input sheet for icon touch. The ATM 700 usually has a receiving window, a payment window and the like of bills (and coins), a bank-book, a magnetic card or the like, and can trade the service or the like, which is offered by a financial organization, by a money lender or by a trader who deals a cash transaction, by the operation of a customer himself.

The ATM 700 handles, for example, affairs of to deposit a cash in a deposit account, to pay loans by cash, to withdraw savings or loaned money, to refer bank account balance, transaction-record, market price information or the like, to enter the transaction which is not entered in a bankbook, to renew a bankbook, money transfer (money transfer utilized by cash or a cash card), money transfer (payment from one of own bank account transfers to the other bank account), to change a personal identification number registered in a cash card, purchase application of foreign bond or money, purchase application of lottery ticket or the like. A magnetic card, an IC card or the like is used for a medium necessary for the affairs. In the ATM 700, a system is introduced in which venous patterns of the finger or palm of a depositor are registered beforehand and a living body is authenticated by verifying the region of the user for every time of the trading.

The ATM 700 has a main body case 70 constituting an exterior, a display unit 29 is provided on the front surface side of the main body case 70 and displays a guidance necessary for the affairs, a display screen for the trading operation, a plurality of push button switch images or the like. The push button switch images constitute icon images for the input operation, and contain, for example, numeral keys K1 to K9 of "0" to "9" for a personal identification number input and for being operated on an occasion of an input of cash appointment or the like, a button key 24 of "confirmation", "cancel" or the like, a forward key K22, a return key K23 or the like. A "0" numeral key, a "\" key, an operation menu key and the like are omitted in the drawing.

For the display unit 29, a color liquid crystal display device (LCD device) is used. For the display unit 29, for example, a color liquid crystal display device of around 15 to 17 inches is used. In the lower direction of the display unit 29, an insertion payment window 71 is provided which is used when handling a necessary medium for the affairs of bills, coins, bankbook, ledger sheet and other, a magnetic card or the like. A card insert slot 72 is provided adjacent to the insertion payment window 71 and is handled such that a magnetic card, an electronic card or the like is inserted therein.

The input detection unit 45 has an operation surface. The input detection unit 45 and the display unit 29 constitute the input device 312. The input device 312 receives information inputted by the slide or/and pushdown operation depending on the finger 30a or the like of the operator. The input device 312 contains a liquid crystal touch panel unified an operation screen display and a plurality of push button switch images. The input device 312, for example, is arranged vertically with respect to the main body case 70. This input device 312 has a touch-sensitive input function such as the input device 90. To the input device 312, any embodiment of the input devices 301 to 311, 313 to 318, 318a with touch-sensitive input sheet explained in the first to eleventh, thirteenth to twentieth embodiments according to the present application is applied.

The input device 312 gives (presents) the sense of touch in response to the pushdown operation of the operation body in the input detection surface on the display screen. The input detection unit 45 having an operation surface is provided on the display unit 29 and detects a slide position or a push operation of the finger 30a or the like of the operator 30. For example, the touch-sensitive input sheet 114 relating to the fourteenth embodiment is applied to the input device 312 (see FIG. 31).

In this case, the transparent touch-sensitive input sheet 114 covers a portion or the whole of the input detection unit 45 and the finger 30a or the like of the operator 30 slides or/and pushes down the transparent touch-sensitive input sheet 114 along the operation surface of the input detection unit 45. The touch-sensitive input sheet 114 includes the base member 1 having a predetermined hardness which forms a sheet shape and the element members 2 each having a predetermined sized block-shape, which are distributed in spots or at predetermined positions of the base member 1. Both of the base member 1 and each of the element members 2 are approximately equal in the light transmissive properties, and each of the element members 2 has the different hardness from the hardness of the base member 1 (see FIG. 31).

In this embodiment, even if the display surface of the display unit 29 is observed as a flat shape, when the icon image or the like of the various kinds of function keys K1 to K21 or the like which is displayed on the display unit 29 is touched by hand (finger or the like) of the operator and the finger or the like of the operator slides from the base member 1 to any one of the element members E1 to E21 or the like, it is possible to present the convex shape feeling which become thicker stepwise along the sliding direction from one portion of the display surface and also which become thinner stepwise toward the other portion of the display surface. Also in the ATM 700, it is possible to determine the input of the button icon or the like displayed on the display unit 29 by this input operation. With respect to a configuration of the inside of the main body case 70, the explanation thereof will be omitted in the interests of crime prevention.

Also in this embodiment, when the icon image for the input operation displayed on the display unit 29 for a monitor of the input device 312 is operated by the finger 30a, the speaker 36b, which is not shown, presents the clicking sound (cyber switch operation sound) and at the same time, the sense of touch is presented to the operator's finger 30a touching the display screen.

Figure 43:
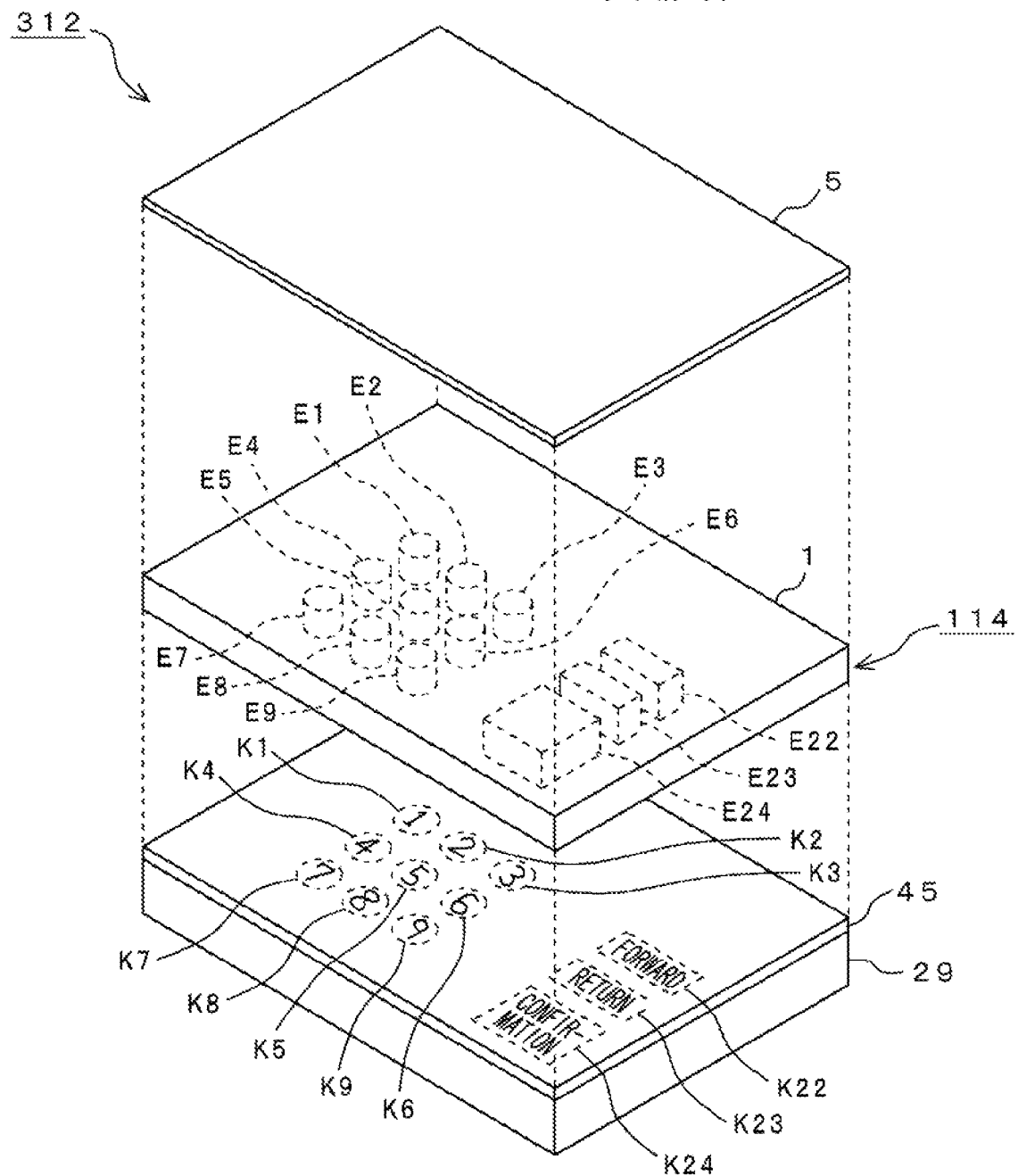
FIG. 43 is a perspective view of the input device 312 in the ATM 700 showing a constitutional example of the input device 312.

FIG. 43 shows a constitutional example of the input device 312 in the ATM 700. The input device 312 shown in FIG. 43 is mounted on the ATM 700 and is a device which inputs information by the slide or/and pushdown operation depending on the finger or the like (operation body) of the operator 30. The input device 312 contains the display unit 29, the input detection unit 45 and the touch-sensitive input sheet 114.

The display unit 29 displays a plurality of push button switch images on an occasion of the input operation. The push button switch images constitute icon images for the input operation. The push button switch images includes numeral keys K1 to K10 (not shown) of "0" to "9", symbol keys K11, K12 (not shown) of "*", "#" or the like, menu operation keys K15 to K19 (not shown), a forward key K22, a return key K23, a confirmation key K24, a cancel key (not shown) and the like.

A liquid crystal display device is used for the display unit 29, but it is also allowed so as to provide a polarization plate on an upper portion of the touch-sensitive input sheet 114. When the polarization plate is installed, a reflected light of the front face (light of specific vibration component) is visually confirmed without being polarized, but an oblique reflected light is polarized, so that it is possible to narrow a view of angle on the display screen intentionally. Thus, on an occasion of inputting a personal identification number or the like, screen contents disappear by an angle seeing the display unit 29, so that it becomes difficult to look furtively at this.

The input detection unit 45 is provided by laminating on the upper portion of the display unit 29. The input detection unit 45 has an operation surface. The input detection unit 45 is provided on the upper portion of the display unit 29 and detects a slide position of the operator's finger or the like. For example, a touch panel of an electrostatic capacitance system is used for the input detection unit 45. With respect to the input detection unit 45, anything is available only if the cursoring and the selection function can be distinguished, and other than the input device of the electrostatic capacitance system, for example, it also may be the input device of a resistance film system, a surface acoustic wave system (SAW), an optical system, a tact switch of a multi stage system or the like. Preferably, it is enough if the input device has a constitution such that position detection information and force detection information can be applied to a control system.

The transparent touch-sensitive input sheet 114 constituting the touch-sensitive sheet member is provided on the upper portion of the input detection unit 45. The touch-sensitive input sheet 114 covers the whole of the input detection unit 45, and the finger of the like of the operator slides or/and pushes down the transparent touch-sensitive input sheet 114 along the operation surface of the input detection unit 45. Of course, the touch-sensitive input sheet 114 may cover a portion of the input detection unit 45. The touch-sensitive input sheet 114 is provided with an embodiment of the touch-sensitive sheet member according to the present application and a protection film.

For example, the touch-sensitive input sheet 114 has a plurality of element members E1 to E9, E22 to E24 each of which has a predetermined sized block-shape and which are distributed at predetermined positions of the base member 1. In this embodiment, the numeral keys K1 to K9 of "1" to "9" corresponding to the icon image for a personal identification number or a cash appointment operation have cylindrical shapes. The element member E22 for a forward key, the element member E23 for a return key and the element member E24 for a confirmation key have rectangular shapes. Each of the respective element members E1 to E9, E22 to E24 has the hardness 60° to 80° which is different from the hardness 20° to 40° of the base member 1.

The above-mentioned element members E1 to E9, E22 to E24 are arranged corresponding to the function keys K1 to K9, K22 to K24. For example, the element member E1 is located on the numeral key K1 of "1", the element member E2 is located on the numeral key K2 of "2", the element member E3 is located on the numeral key K3 of "3", the element member E4 is located on the numeral key K4 of "4", the element member E5 is located on the numeral key K5 of "5", the element member E6 is located on the numeral key K6 of "6", the element member E7 is located on the numeral key K7 of "7", the element member E8 is located on the numeral key K8 of "8", the element member E9 is located on the numeral key K9 of "9". The element member E22 is located on the forward key K22, the element member E23 is located on the return key K23 and the element member E24 is located on the confirmation key K24.

In this embodiment, a film-shaped top member 5 constituting the protection film is provided on the upper portion of the base member 1 and the element members E1 to E9, E22 to E24. For the top member 5, transparent material having a transmissivity and refractive index which is approximately equal to a transmissivity and refractive index of the touch-sensitive input sheet 114 is used. For example, the Zeonor (trade mark) of the film thickness of around 25 μm which forms one example of the transparent material is used. The hardness thereof is around 20° to 40°. When constituting the touch-sensitive input sheet 114 in this manner, it is possible to present the convex shape feeling which become thicker stepwise along the sliding direction from one portion of the display surface and also which become thinner stepwise toward the other portion of the display surface.

In this manner, according to the ATM 700 relating to the twenty-third embodiment, with respect to the input device with touch-sensitive function 90, the embodiment of the input device 312 relating to the present application is provided. With respect to the slide or/and pressing-into operation depending on the finger 30a of the operator who operates the ATM 700, the hardness of each of the element members E1 to E9, E22 to E24 is set to be high with respect to the hardness of the base member 1, so that it is possible to present the convex shape feeling which become thicker stepwise along the sliding direction from one portion of the display surface and also which become thinner stepwise toward the other portion of the display surface.

Consequently, even if the display surface of the display unit 29 in the input device 312 is observed as a flat shape, when the icon image or the like of the various kinds of function keys K1 to K21 or the like displayed on the display unit 29 is touched by hand (finger or the like) of the operator and the finger or the like of the operator slides from the base member 1 to any one of the element members E1 to E21 or the like, it is possible to present the sense of touch combined with the concavity and convexity feeling by the touch-sensitive input sheet 114 and the vibration of 200 Hz by the speaker 36b to the finger 30a of a person who operates the ATM 700.

Thus, it is possible to provide the ATM 700 including the touch-sensitive input sheet for icon touch and the input device 312 with function for presenting the sense of touch. Furthermore, the pressing-into button switch is made as an image and the speaker 36b and the actuator are commonly used, so that miniaturization and operability of the input device 312 can be improved. Consequently, it is possible to attempt reduction of malfunction, cost reduction and simplification of the manufacturing process of the ATM 700.

Embodiment 25

Figure 44A:
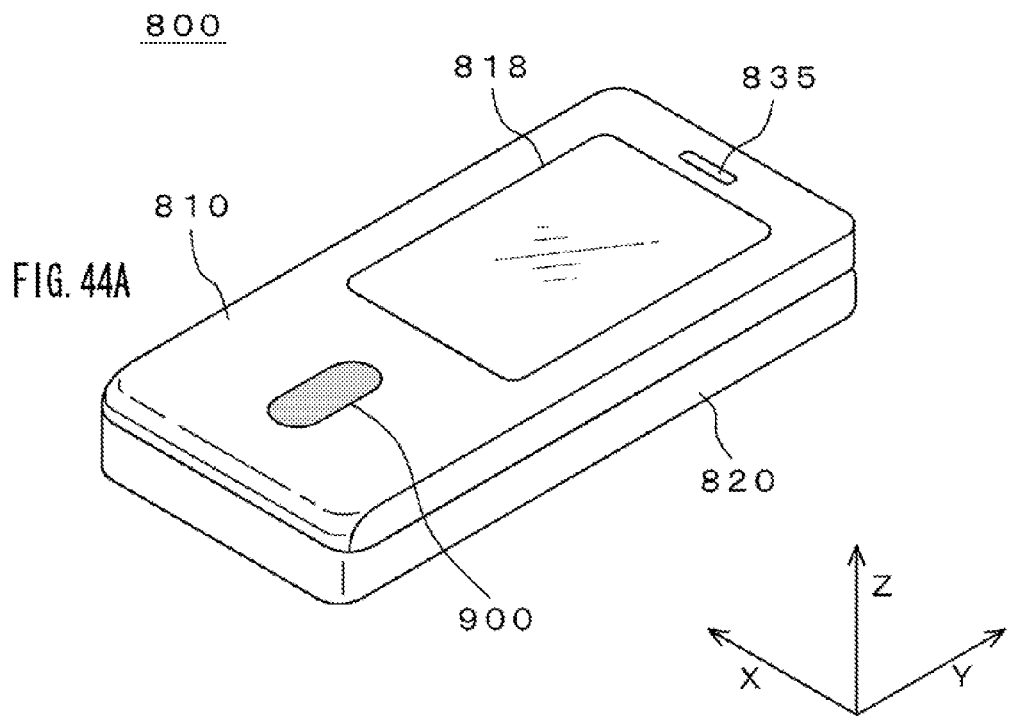
FIGS. 44A and 44B are perspective views of a mobile phone 800 according to a twenty-fifth embodiment showing a constitutional example thereof.
Figure 44B:
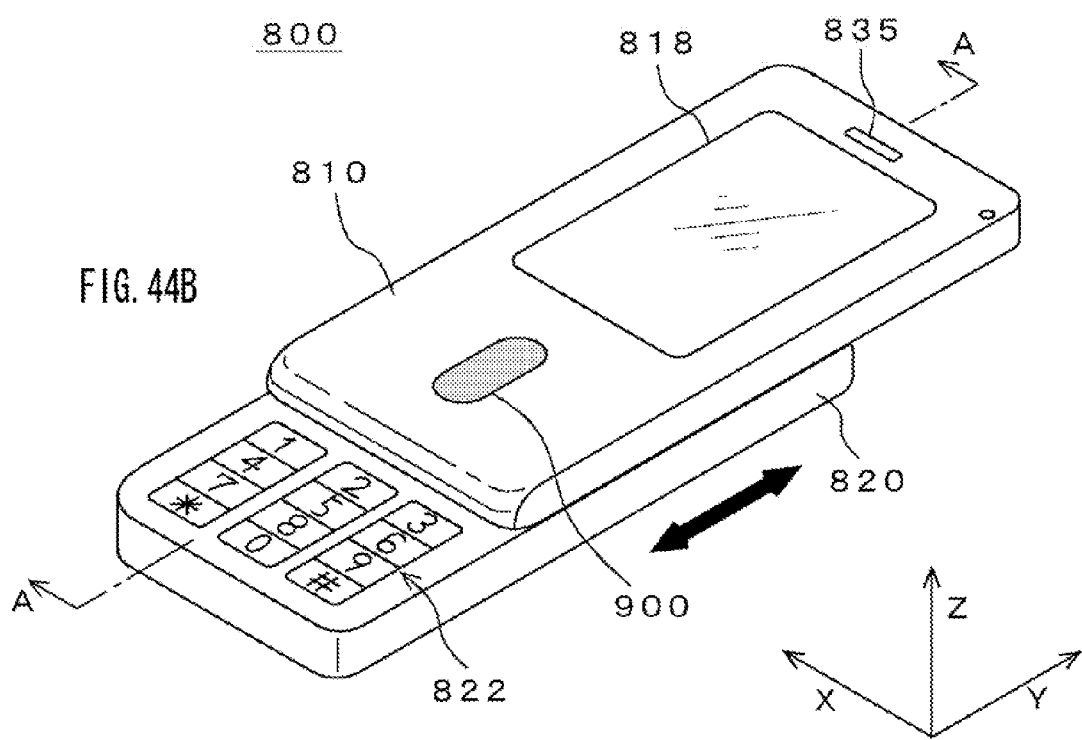
Figure 45:
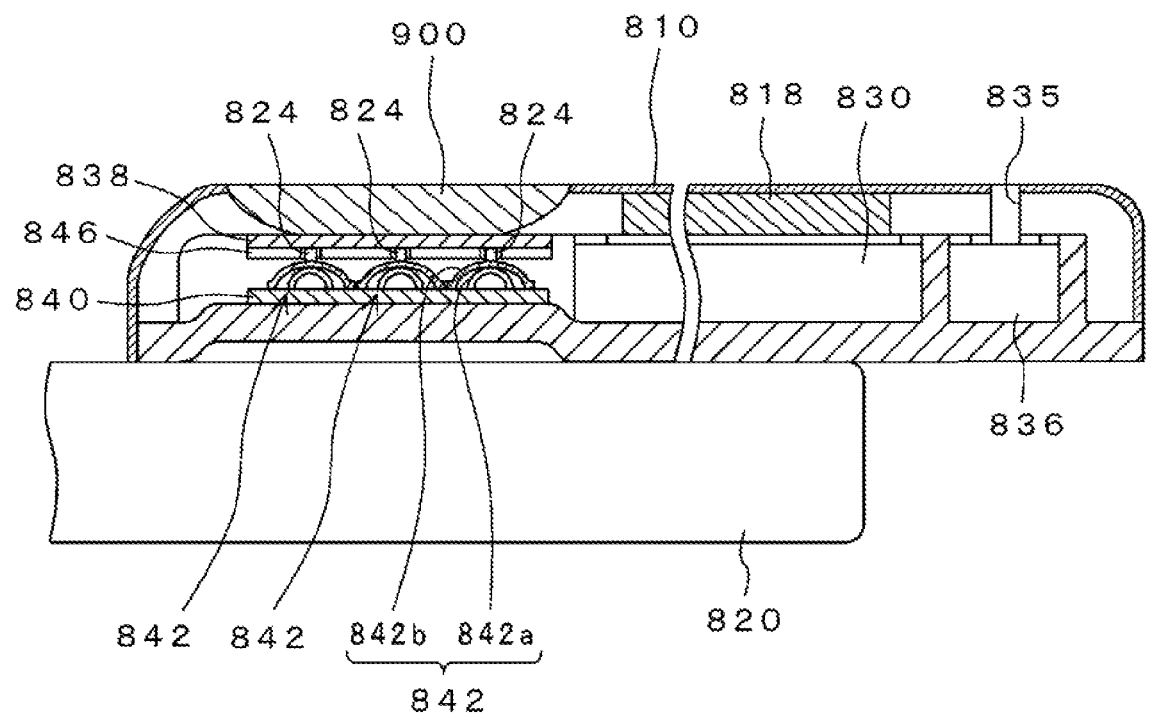
FIG. 45 is a cross-sectional view of the mobile phone 800 for showing a constitutional example thereof.

The following will describe a mobile phone 800 to which an embodiment of the present application is applied. It should be noted that an explanation of a constitution, an operation and a manufacturing method or the like that are in common with the above-mentioned electronic apparatus of the mobile phone 400 or the like will be omitted. FIG. 44A and FIG. 44B show a configuration of the mobile phone 800. FIG. 45 is a cross-sectional view of the mobile phone 800 taken along an A-A line of FIG. 44B. FIG. 46 is an exploded perspective view of the mobile phone 800 showing a configuration thereof. In the FIG. 44 to FIG. 52 hereinafter, the direction of the short side of an upper housing 810 and a lower housing 820 is estimated to be an X axis, the longitudinal direction thereof is estimated to be a Y axis, and the direction perpendicular to the X, Y axes is estimated to be a Z axis. Also, in FIG. 45, for the sake of convenience, the upper housing 810 is shown by being simplified.

The mobile phone 800 includes the upper housing (housing) 810, an operation unit 900 and the lower housing 820. The upper housing 810 and the lower housing 820 are coupled relatively slidably along the Y axis, as shown in FIG. 44A and FIG. 44B, and constitutes a so-called slide type mobile phone terminal.

The upper housing 810 includes a front cover 812 and a front case 814, as shown in FIG. 46. The front case 814 has a bottom plate 814a and a wall portion 814b which stands at the peripheral edge portion of this bottom plate 814a. The front case 814 has a box shape, an upper surface of which is opened. Fixed portions 814c for fixing the front cover 812 is provided at corner portions of the front case 814. Electronic parts of a circuit board 840 or the like described later are housed in the front case 814.

The front cover 812 is a lid body molded by the insert molding and is mounted on the front case 814 and fixed through the fixed portions 814c of the front case 814. The front cover 812 is made of a hard material which is opaque and also has the higher hardness than that of the operation unit 900. For a material of the upper housing 810, for example, polycarbonate (PC), acrylonitrile-butadiene-styrene (ABS), PC+ABS, polyethylene terephthalate (PET), polyether sulfone (PES), poly lactic acid (PLA), polyamide (PA), acrylic resin (PMMA) or the like is preferably used.

A transparent panel 818 is attached on a surface of the front cover 812. The transparent panel 818 is made of, for example, transparent material of acrylic resin (PMMA) or the like. The front cover 812 has a sound output opening 835 for outputting any sound generated from a receiver 836 described later on the upper side of the transparent panel 818.

The operation unit 900 inputs position information by the slide operation or the pushdown operation by an operator and applies the concavity and convexity feeling to the operator when inputting this position information. The operation unit 900 is attached to the front cover 812 through an opening portion, which is not shown, that is formed in the lower side region than the transparent panel 818 of the surface of the front cover 812. The upper surface of the operation unit 900 is formed in a flat surface so as to not protrude from the surface of the upper housing 810, and the upper surface of the operation unit 900 and the surface of the upper housing 810 constitute a continuous flat surface.

Also, the operation unit 900 has an elliptical shape as viewed in a plane, forms a hemisphere shaped cross-section (see FIG. 45) and is made of material which is opaque and also has the lower hardness than that of the upper housing 810. For material of the operation unit 900, for example, the overall polymeric material is used. For the polymeric material, for example, rubber, elastomer of thermoplastic elastomer or the like, plastic, skin, fiber or the like is preferably used. Further, for the rubber, for example, silicone rubber or the like is preferably used. For the thermoplastic elastomer, for example, urethane elastomer or the like is preferably used.

Electronic parts of a display unit 830, the receiver 836, a sensor 846, a circuit board 840 and the like are housed in the inside of the upper housing 810 constituted by the front cover 812 and the front case 814. A printed wiring, which is not shown, is formed on the circuit board 840, and a plurality of metal dome switches 842 are mounted on the circuit board 840 including this printed board.

The metal dome switch 842 contains a switch portion 842a and a cover member 842b covering this switch portion, as shown in FIG. 45. The switch portion 842a is composed of a conductive member having elasticity and the cover member 842b is composed of an insulation member. The plurality of metal dome switches 842 are respectively located at positions corresponding to a center portion, an upper portion and a lower portion of the operation unit 900, as shown in FIG. 46.

The sensor 846 constitutes the detection unit, is constituted, for example, by an input device of an electrostatic capacitance system, and detects position information inputted by the slide operation by the operator in the X-Y axis direction of the operation unit 900. This sensor 846 is composed of a sheet-shaped member having flexibility, and is attached to the rear surface of the operation unit 900 which forms a curvature shape and installed.

A silicone rubber 838 is inserted into a position between the sensor 846 and the rear surface of the operation unit 900. A plurality of protrusion portions 824 for depressing the metal dome switches 842 in response to the pushdown by the operator in the Z-axis direction of the operation unit 900 are mounted on the rear surface side of the silicone rubber 838. The plurality of protrusion portions 824 are provided at four places corresponding to the up/down and right/left directions of the operation unit 900 and one place corresponding to the center thereof, and protrude from the rear surface of the sensor 846 through opening portions formed on the sensor 846. In the present embodiment, the input device includes the above-mentioned upper housing 810, the above-mentioned operation unit 900, the above-mentioned protrusion portions 824, the above-mentioned sensor 846 and the above-mentioned metal dome switches 842.

The display unit 830 is provided at position facing the transparent panel 818, and is constituted, for example, by a liquid crystal display, an organic EL (Electro Luminescence) display or the like. The receiver 836 is arranged at a position corresponding to the sound output opening 835, and outputs the sound based on a sound signal supplied from the image-and-audio-processing unit 44 (see FIG. 39).

In the lower housing 820, as shown in FIG. 44B, a key operation unit 822 having operation keys of numeral keys, a "#" key, a "*" key and the like are provided. The key operation unit 822 is exposed when the lower housing 820 slides relatively with respect to the upper housing 810 and the mobile phone 800 becomes an open state.

The embodiment of the mobile phone 800 according to the present application is formed by the double mold, which has been explained in the above-mentioned embodiments. First, the upper housing 810 of a primary side is molded. For example, the upper housing 810 is molded by pouring a material of a PC or the like which is mentioned above into a die, and an opening portion to which the operation unit 900 is attached is formed on the upper housing 810. Next, the operation unit 900 of a secondary side is molded in the same die. For example, the operation unit 900 is molded integrally on the opening portion of the upper housing 810 by pouring the above-mentioned polymeric material into the die, and the mobile phone 800 is manufactured.

As explained above, according to the present embodiment, the since the material of the operation unit 900 has lower hardness than that of the upper housing 810, it is possible to present the sense of touch like the concavity and convexity feeling on an occasion of the operation of the operation unit 900 by the operator. Further, according to the present embodiment, the operation unit 900 is not provided on the display unit 830, so that it is not necessary to use transparent material and further, it is not necessary to consider about the transmissivity or the like between the members of the operation unit 900 and the upper housing 810. Consequently, it is freed from constrained condition of the material, the transmissivity or the like, so that the material selection or the like becomes easy, thereby enabling improvement of the design freedom and simplification of the design to be realized.

Modified Example 1

Figure 47A:
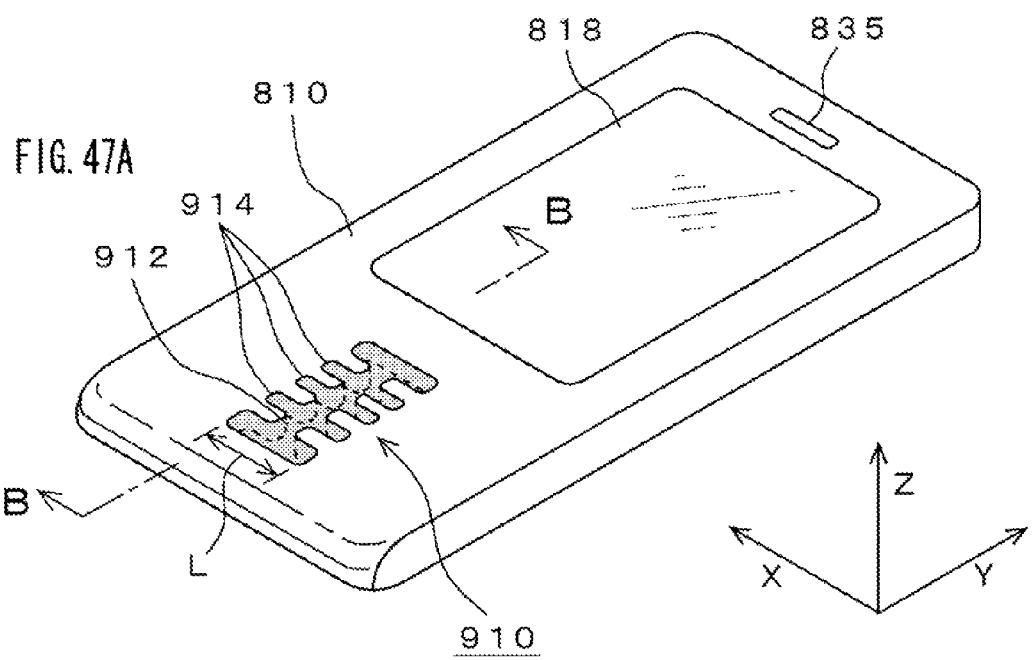
FIGS. 47A and 47B are diagrams showing a constitutional example of a modified example of the mobile phone 800 (No. 1 thereof)
Figure 47B:
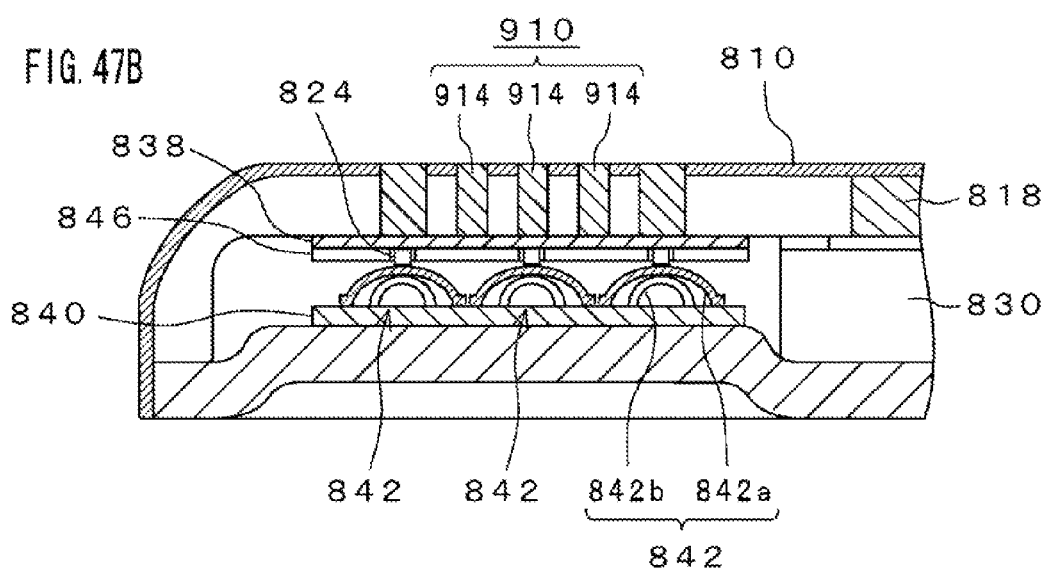

The following will describe an operation unit 910 of a modified example of the operation unit 900. FIG. 47A shows a configuration of the operation unit 910 and FIG. 47B is a cross-sectional view thereof taken along a B-B line of FIG. 47A. It should be noted that in the explanation of the modified examples 1 to 6 hereinafter, only the upper housing 810 is shown for the sake of convenience. Also, in the modified examples 1 to 6 hereinafter, the same reference numerals are applied to the components that are in common with the mobile phone 800 explained in the twenty-fifth embodiment, so that the detailed explanation thereof will be omitted.

The operation unit 910 contains a linear portion 912 extending along the Y axis of the upper housing 810 and a plurality of branch portions 914 extending along the X axis of the upper housing 810 from the linear portion 912. The plurality of branch portions 914 are provided in the left-right symmetrically linear away from a predetermined distance in a longitudinal direction of the linear portion 912, and the mobile phone 800 forms a so-called antenna shape.

A length "L" of each of the branch portions 914 is selected so as to become longer at least than a width of a finger of the operator, which can present the sense of touch like the concavity and convexity feeling reliably when the finger of the operator slides. Also, it is also possible to present the different sense of touch like the concavity and convexity feeling at a space between the adjacent branch portions 914, 914 when the finger of the operator slides, by making pitches of adjacent branch portions 914, 914 differ.

The operation unit 910 is made of material which is opaque and also has the lower hardness than that of the upper housing 810. For the operation unit 910, for example, the overall polymeric material as explained in the twenty-fifth embodiment is used. Also, the operation unit 910 is formed in a flat surface so that the upper surface thereof is not protruded from the surface of the upper housing 810, and the upper surface of the operation unit 910 and the surface of the upper housing 810 constitute a continuous flat surface.

The metal dome switches 842 are, respectively, located at positions corresponding to, for example, the center portion, the upper portion, the lower portion, the right portion and the left portion of the operation unit 900, which can perform the determination operation and the up/down and right/left direction operation.

According to the present modified example, similarly as the above-mentioned twenty-fifth embodiment, it is possible to present the sense of touch like the concavity and convexity feeling to the operator on an occasion of the operation of the operator.

Modified Example 2

Figure 48A:
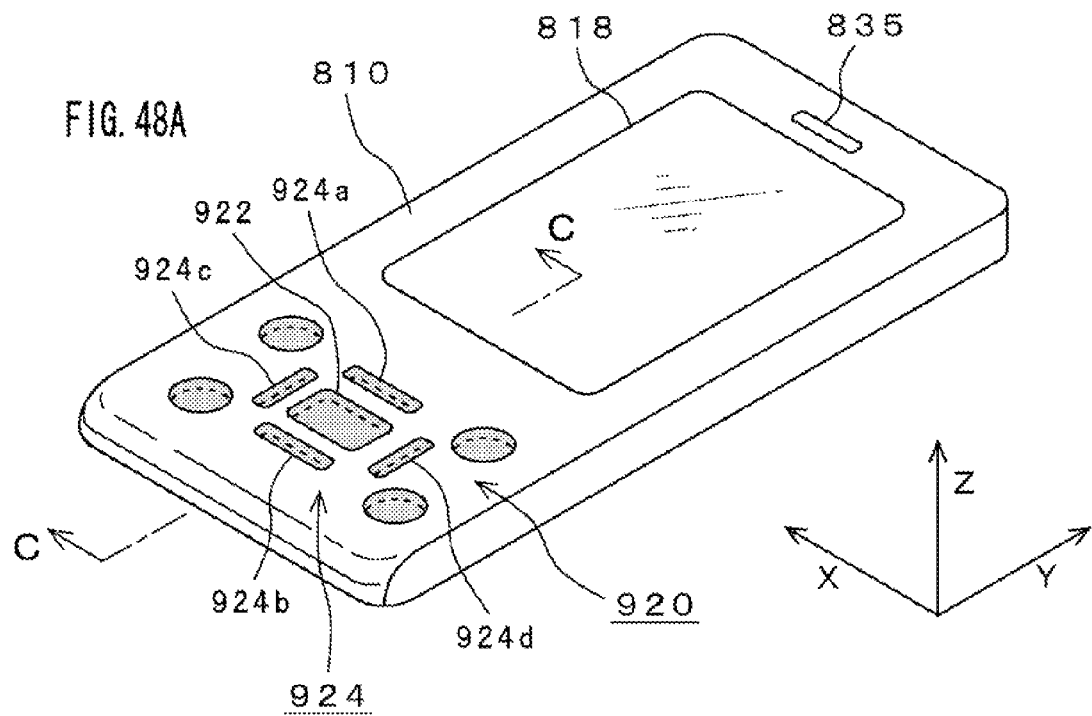
FIGS. 48A and 48B are diagrams showing a constitutional example of a modified example of the mobile phone 800 (No. 2 thereof)
Figure 48B:
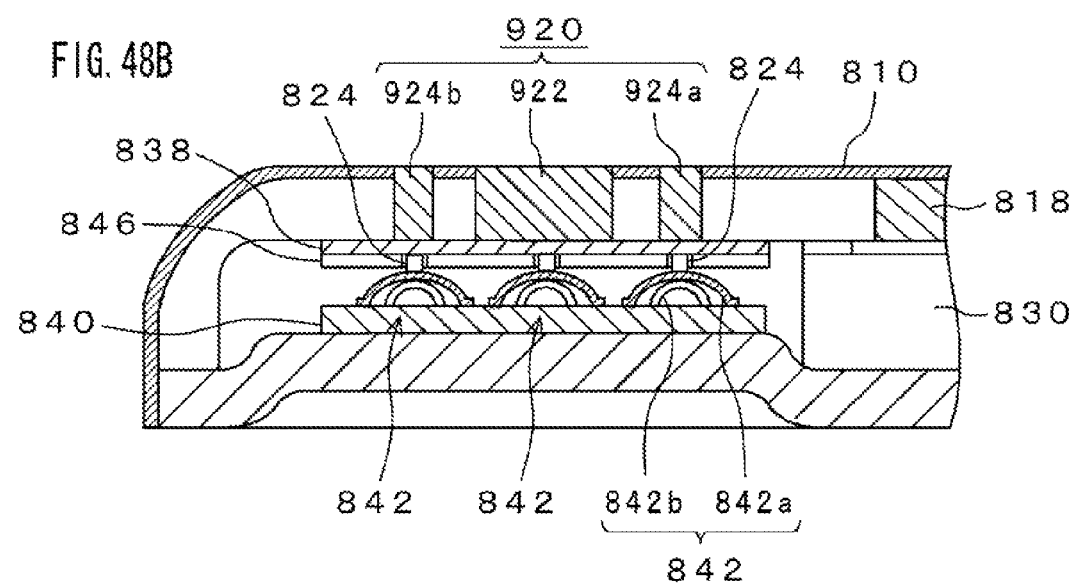

FIG. 48A shows a configuration of an operation unit 920 and FIG. 48B is a cross-sectional view thereof taken along a C-C line of FIG. 48A. The operation unit 920 contains a determination key 922 provided at the center and direction keys 924 located at the up/down and right/left of the determination key 922. The direction keys 924 are provided independently away from the determination key 922 provided at the center with a predetermined distance, and include an up direction key 924a, a down direction key 924b, a left direction key 924c and a right direction key 924d. These determination key 922 and direction keys 924 have functions of scrolling the screen and also moving the cursor by performing any sliding operation on the operation surface, in addition to carrying out the determination of the input and the determination of the direction.

The operation unit 920 is made of material which is opaque and also has the lower hardness than that of the upper housing 810. For the operation unit 920, for example, the overall polymeric material as explained in the twenty-fifth embodiment is used. Also, the operation unit 920 is formed in a flat surface so that the upper surface of the operation unit 920 is not protruded from the surface of the upper housing 810, and the upper surface of the operation unit 920 and the surface of the upper housing 810 constitute a continuous flat surface.

According to the present modified example, similarly as the above-mentioned twenty-fifth embodiment, it is possible to present the sense of touch like the concavity and convexity feeling to the operator on an occasion of the operation of the operator.

Modified Example 3

Figure 49A:
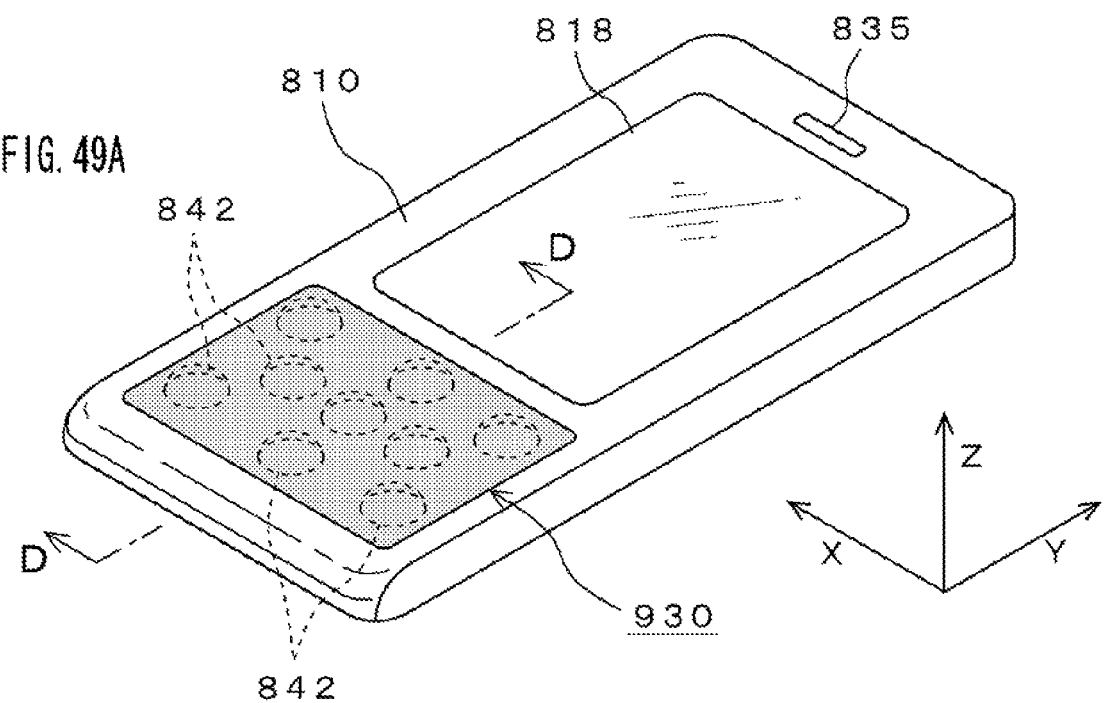
FIGS. 49A and 49B are diagrams showing a constitutional example of a modified example of the mobile phone 800 (No. 3 thereof)
Figure 49B:
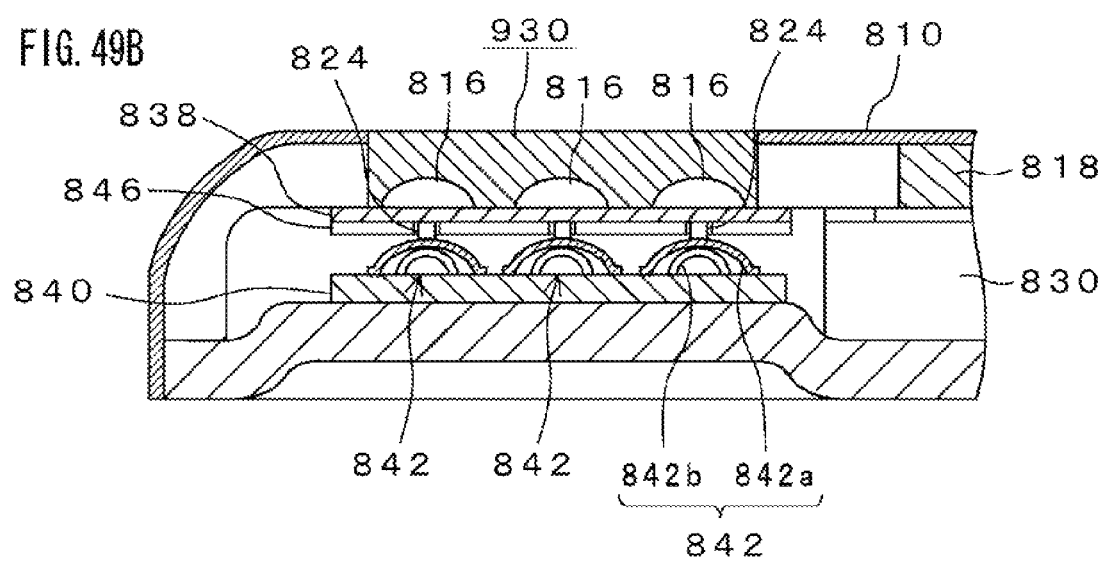

FIG. 49A shows a configuration of an operation unit 930 and FIG. 49B is a cross-sectional view thereof taken along a D-D line of FIG. 49A. The operation unit 930 is provided in a rectangular shape as viewed in a plane on approximately the whole area of the lower side of the display unit 830. The operation unit 930 is made of material which is opaque and also has the lower hardness than that of the upper housing 810. For the operation unit 930, for example, the overall polymeric material as explained in the twenty-fifth embodiment is used. Also, the operation unit 930 is formed in a flat surface so that the upper surface thereof is not protruded from the surface of the upper housing 810, and the upper surface of the operation unit 930 and the surface of the upper housing 810 constitute a continuous flat surface.

Convex portions 816 each for applying the sense of touch like the concavity and convexity feeling to the operator on an occasion of the operation of the operator are buried on the rear surface side (a side of the metal dome switches 842) of the operation unit 930. Each of the convex portions 816 forms a dome shape, a curved surface thereof is faced to the upper direction (opposite side of the metal dome switches 842) and they are integrally formed with the operation unit 930. Each of the convex portions 816 is made of material of, for example, PC or the like, which is similar to the upper housing 810, and the convex portions 816 are located at positions or the like corresponding to the up/down and right/left directions and the center. The metal dome switches 842 are provided at positions facing the convex portions 816.

According to the present modified example, similarly as the above-mentioned twenty-fifth embodiment, it is possible to present the sense of touch like the concavity and convexity feeling to the operator on an occasion of the operation of the operator.

Modified Example 4

Figure 50A:
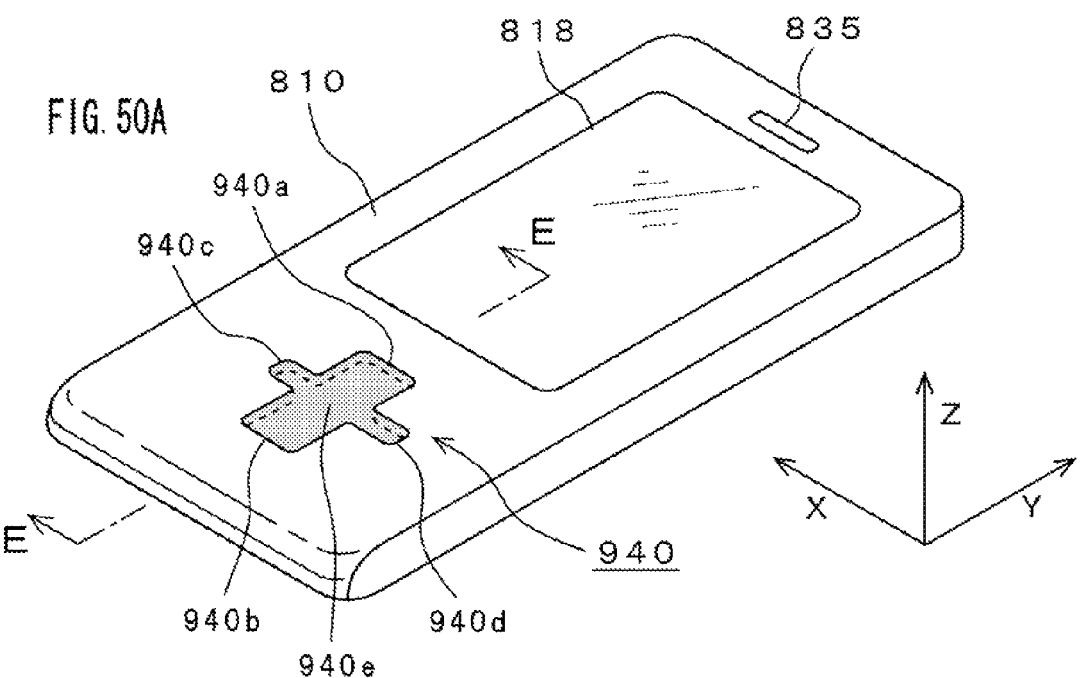
FIGS. 50A and 50B are diagrams showing a constitutional example of a modified example of the mobile phone 800 (No. 4 thereof)
Figure 50B:
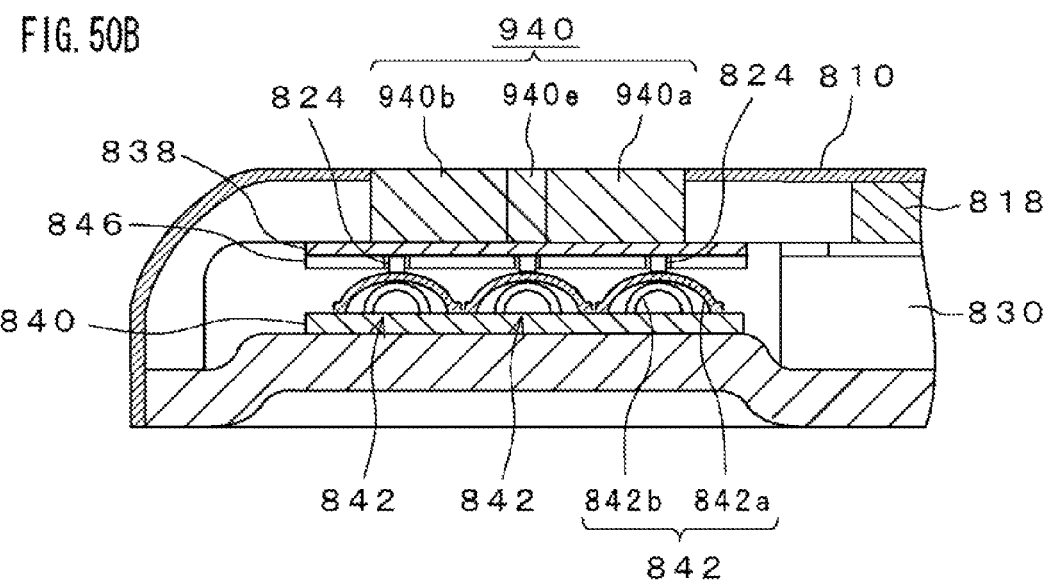

FIG. 50A shows a configuration of an operation unit 940 and FIG. 50B is a cross-sectional view thereof taken along an E-E line of FIG. 50A. The operation unit 940 forms a cross shape as viewed in a plane and extends in the up/down and right/left (X-Y axes) directions. Metal dome switches 842 are provided at positions corresponding to a center 940e, an upper portion 940a, a lower portion 940b, a left portion 940c and a right portion 940d of the operation unit 940, respectively.

The operation unit 940 is made of material which is opaque and also has the lower hardness than that of the upper housing 810. For the operation unit 940, for example, the overall polymeric material as explained in the twenty-fifth embodiment is used. Also, the operation unit 940 is formed in a flat surface so that the upper surface thereof is not protruded from the surface of the upper housing 810. The upper surface of the operation unit 940 and the surface of the upper housing 810 constitute a continuous flat surface.

According to the present modified example, similarly as the above-mentioned twenty-fifth embodiment, it is possible to present the sense of touch like the concavity and convexity feeling to the operator on an occasion of the operation of the operator.

Modified Example 5

Figure 51A:
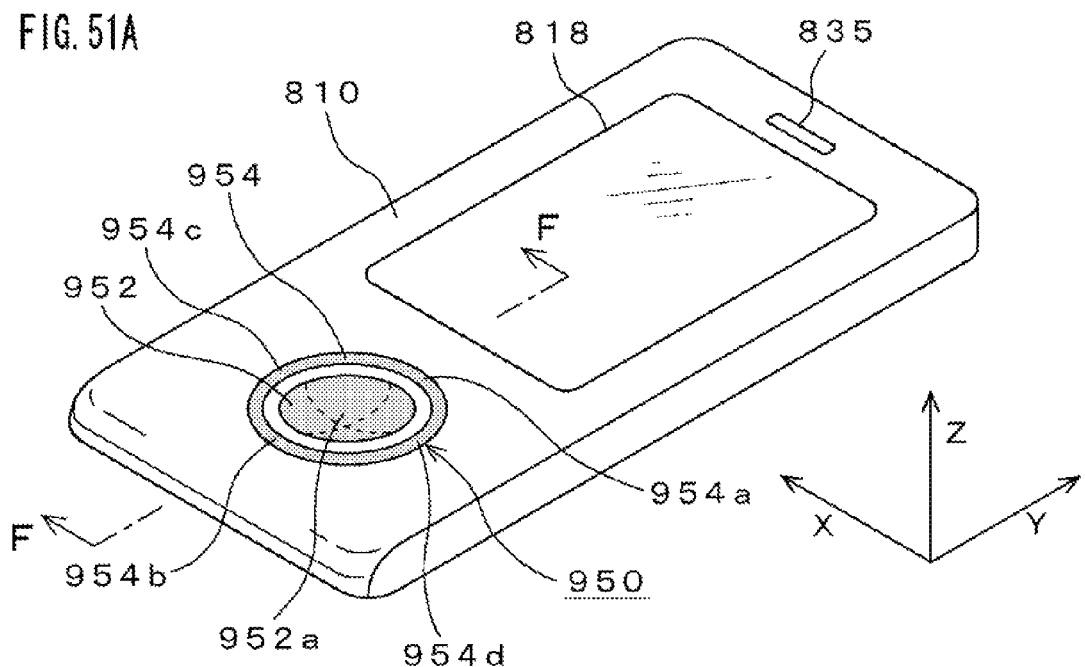
FIGS. 51A and 51B are diagrams showing a constitutional example of a modified example of the mobile phone 800 (No. 5 thereof)
Figure 51B:
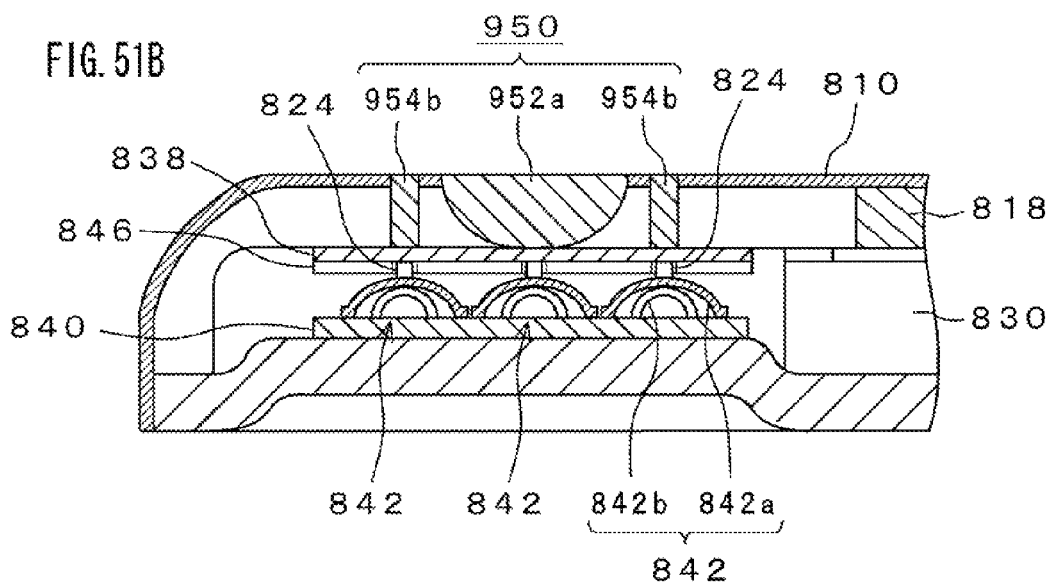

FIG. 51A shows a configuration of an operation unit 950 and FIG. 51B is a cross-sectional view thereof taken along an F-F line of FIG. 51A. The operation unit 950 contains a circular portion 952 and a ring-shaped portion 954 provided in a ring shape around the outer circumference of the circular portion 952. For example, a center 952a of the circular portion 952 corresponds to a determination key, and positions corresponding to an upper potion 954a, a lower portion 954b, a left portion 954c and a right portion 954d of the ring-shaped portion 954 respectively correspond to keys in the up/down and right/left directions. Also, the metal dome switches 842 are respectively provided at positions corresponding to the center 952a of the circular portion 952 and the upper potion 954a, the lower portion 954b, the left portion 954c and the right portion 954d of the ring-shaped portion 954. It should be noted that by sliding operation on the operation surface of the circular portion 952 or the ring-shaped portion 954, it is also possible to obtain the sense of touch.

The operation unit 950 is made of material which is opaque and also has the lower hardness than that of the upper housing 810. For the operation unit 950, for example, the above-mentioned overall polymeric material is used. Also, the operation unit 950 is formed in a continuous flat surface with a surface of the upper housing 810 so that the upper surface of the operation unit 950 is not protruded from the surface of the upper housing 810.

According to the present modified example, similarly as the above-mentioned twenty-fifth embodiment, it is possible to present the sense of touch like the concavity and convexity feeling to the operator on an occasion of the operation of the operator.

Modified Example 6

Figure 52A:
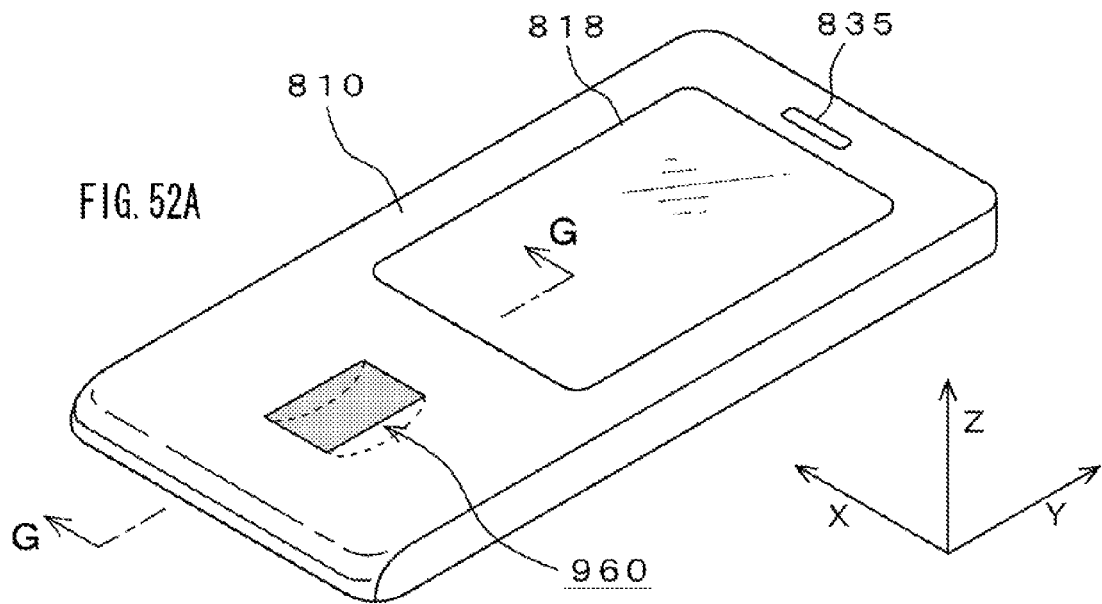
FIGS. 52A and 52B are diagrams showing a constitutional example of a modified example of the mobile phone 800 (No. 6 thereof).
Figure 52B:
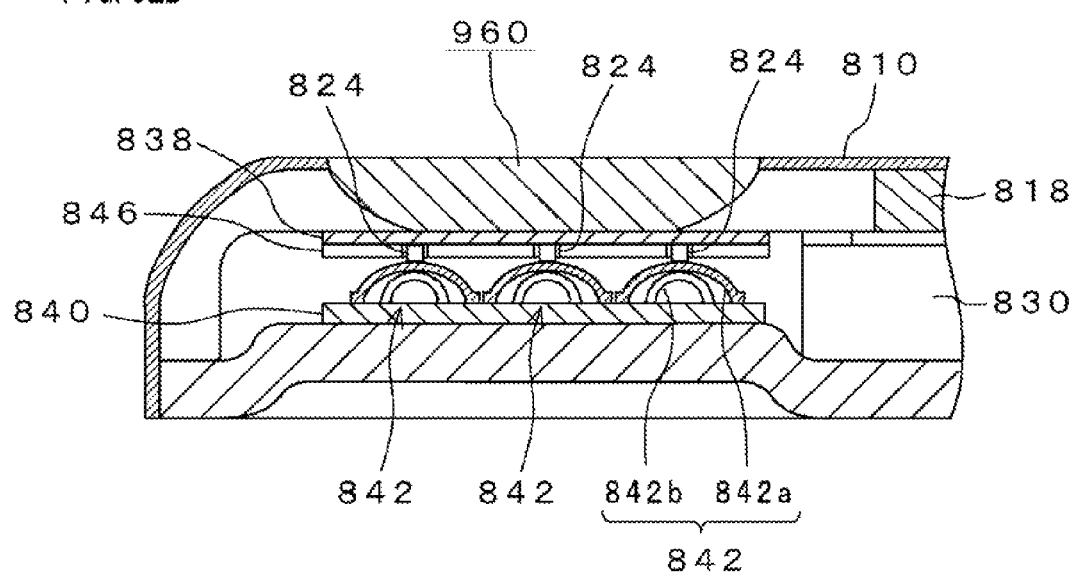

FIG. 52A shows a configuration of an operation unit 960 and FIG. 52B is a cross-sectional view thereof taken along a G-G line of FIG. 52A. The operation unit 960 forms a half-cylindrical shape and is mounted on the upper housing 810 so as to attach a curved portion thereof to a sensor 846 (silicone rubber 838). Metal dome switches 842 are provided at positions corresponding to a center, an upper portion, a lower portion, a left portion and a right portion of the operation unit 960, respectively.

The operation unit 960 is made of material which is opaque and also has the lower hardness than that of the upper housing 810. For the operation unit 960, for example, the above-mentioned overall polymeric material is used. Also, the operation unit 960 is formed in a continuous flat surface with a surface of the upper housing 810 so that the upper surface of the operation unit 960 is not protruded from the surface of the upper housing 810.

According to the present modified example, similarly as the above-mentioned twenty-fifth embodiment, it is possible to present the sense of touch like the concavity and convexity feeling to the operator on an occasion of the operation of the operator.

The embodiments of the present application are very preferably applied to an electronic apparatus such as a digital camera, a video camera, a mobile phone, a mobile terminal device, a desk-top type personal computer, a note type PC, and an ATM, which has a touch-sensitive input function presenting the sense of touch when touching an icon screen.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A touch-sensitive sheet member comprising:
   a first raw material member having predetermined hardness; and
   a second raw material member being disposed in the first raw material member,
   wherein the second raw material member has hardness different from the hardness of the first raw material member, and
   wherein the first raw material member and the second raw material member are configured to present an operator with a sliding sense of touch including at least one of a repeated concavity feeling and a repeated convexity feeling in response to a sliding operation across the touch-sensitive sheet member.

2. The touch-sensitive sheet member according to claim 1, wherein the first raw material member and the second raw material member have approximately equal refractive index and have different bending elasticity.

3. The touch-sensitive sheet member according to claim 1, wherein the first raw material member and the second raw material member have approximately equal transmissivity and have different bending elasticity.

4. The touch-sensitive sheet member according to claim 1, wherein the first raw material member and the second raw material member have approximately equal refractive index and transmissivity and have different bending elasticity.

5. The touch-sensitive sheet member according to claim 1, wherein one or more kinds of the second raw material members are disposed in the first raw material member.

6. An input device comprising:
a display unit;
a detection unit that is provided on the display unit and detects a slide position inputted based on a sliding operation by an operation body, the detection unit having an operation surface; and
a transparent touch-sensitive sheet member that covers at least a portion of the detection unit and is operated along the operation surface of the detection unit,
wherein the touch-sensitive sheet member includes:
a first raw material member having predetermined hardness;
a second raw material member being disposed in the first raw material member; and
the second raw material member has hardness different from the hardness of the first raw material member, and
wherein the first raw material member and the second raw material member are configured to present an operator with a sliding sense of touch including at least one of a repeated concavity feeling and a repeated convexity feeling in response to the sliding operation across the touch-sensitive sheet member.

7. The input device according to claim 6, further comprising a transparent protection film that is provided on the touch-sensitive sheet member, the transparent protection film having transmissivity and refractive index approximately equal to the transmissivity and refractive index of the touch-sensitive sheet member.

8. The input device according to claim 6, wherein the second raw material member of the touch-sensitive sheet member has hardness less than the hardness of the first raw material member of the touch-sensitive sheet member.

9. The input device according to claim 6, wherein the second raw material member is disposed at least at a portion of the touch-sensitive sheet member on a display region of the display unit displaying an input image, the portion of the touch-sensitive sheet member being surrounded by the first raw material member.

10. The input device according to claim 6, wherein the second raw material member is disposed at a portion of the touch-sensitive sheet member on a portion of the display unit obtained by partitioning a display region of an input image of the display unit, the portion of the touch-sensitive sheet member being partitioned by the first raw material member.

11. The input device according to claim 6, wherein a boundary region at which the first raw material member and the second raw material member are joined forms a slant-shape.

12. The input device according to claim 6, wherein a boundary region at which the first raw material member and the second raw material member are joined forms a semi-cylindrical or hemisphere shape hung down toward the display unit.

13. The input device according to claim 6, wherein a boundary region at which the first raw material member and the second raw material member are joined forms a semi-cylindrical or hemisphere shape extending toward an upper portion from the display unit.

14. The input device according to claim 6, wherein a transparent silicon rubber member of hardness 60° to 80° is used for the first raw material member of the touch-sensitive sheet member, and
wherein a transparent silicon rubber member of hardness 20° to 40° is used for the second raw material member of touch-sensitive sheet member.

15. The input device according to claim 6, wherein polycarbonate-based transparent material is used for the first raw material member of the touch-sensitive sheet member, and
wherein a transparent silicon rubber member of hardness 20° to 40° is used for the second raw material member of the touch-sensitive sheet member.

16. The input device according to claim 6, wherein polyethylene terephthalate-based transparent material is used for the first raw material member of the touch-sensitive sheet member, and
wherein a transparent silicon rubber member of hardness 20° to 40° is used for the second raw material member of the touch-sensitive sheet member.

17. The input device according to claim 6, wherein polyethersulfone-based transparent material is used for the first raw material member of the touch-sensitive sheet member, and
wherein a transparent silicon rubber member of hardness 20° to 40° is used for the second raw material member of the touch-sensitive sheet member.

18. The input device according to claim 6, wherein a transparent optical member is used for the first raw material member of the touch-sensitive sheet member, and
wherein a transparent silicon rubber member of hardness 20° to 40° is used for the second raw material member of the touch-sensitive sheet member.

19. The input device according to claim 6, wherein the second raw material member of the touch-sensitive sheet member has hardness higher than the hardness of the first raw material member of the touch-sensitive sheet member.

20. The input device according to claim 19, wherein the second raw material member is disposed at least at a portion of the touch-sensitive sheet member on a display region of the display unit displaying an input image, the portion of the touch-sensitive sheet member being surrounded by the first raw material member.

21. The input device according to claim 19, wherein the second raw material member is disposed at a portion of the touch-sensitive sheet member on a portion of the display unit obtained by partitioning a display region of an input image of the display unit, the portion of the touch-sensitive sheet member being partitioned by the first raw material member.

22. The input device according to claim 19, wherein a boundary region at which the first raw material member and the second raw material member are joined forms a slant-shape.

23. The input device according to claim 19, wherein a boundary region at which the first raw material member and the second raw material member are joined forms a semi-cylindrical or hemisphere shape hung down toward the display unit.

24. The input device according to claim 19, wherein a boundary region at which the first raw material member and the second raw material member are joined forms a semi-cylindrical or hemisphere shape extending toward an upper portion from the display unit.

25. The input device according to claim 19, a transparent silicon rubber member of hardness 20° to 40° is used for the first raw material member of the touch-sensitive sheet member, and
wherein a transparent silicon rubber member of hardness 60° to 80° is used for the second raw material member of touch-sensitive sheet member.

26. The input device according to claim 19, wherein a transparent silicon rubber member of hardness 20° to 40° is used for the first raw material member of the touch-sensitive sheet member, and
wherein polycarbonate-based transparent material is used for the second raw material member of the touch-sensitive sheet member.

27. The input device according to claim 19, wherein a transparent silicon rubber member of hardness 20° to 40° is used for the first raw material member of the touch-sensitive sheet member, and
wherein polyethylene terephthalate-based transparent material is used for the second raw material member of the touch-sensitive sheet member.

28. The input device according to claim 19, wherein a transparent silicon rubber member of hardness 20° to 40° is used for the first raw material member of the touch-sensitive sheet member, and
wherein polyethersulfone-based transparent material is used for the second raw material member of the touch-sensitive sheet member.

29. The input device according to claim 19, wherein a transparent silicon rubber member of hardness 20° to 40° is used for the first raw material member of the touch-sensitive sheet member, and
wherein a transparent optical member is used for the second raw material member of the touch-sensitive sheet member.

30. An input device comprising:
a housing;
an operation unit that is provided at the housing, has an operation surface, and inputs position information by operating the operation surface; and
a detection unit that detects the position information inputted by the operation unit,
wherein the operation unit is constituted by a first material having lower hardness than a second material constituting the housing, and
wherein the first material and the second material are configured to present an operator with a sliding sense of touch including at least one of a repeated concavity feeling and a repeated convexity feeling in response to a sliding operation across the operation surface.

31. The input device according to claim 30, wherein opaque polymeric material is used for the operation unit.

32. The input device according to claim 31, wherein the polymeric material is any one of an elastomer, a plastic, a skin and a fiber.

33. An electronic apparatus comprising:
a housing; and
an input device that is provided at the housing and inputs information depending on an operation by an operation body,
wherein the input device includes:
a display unit;
a detection unit that is provided on the display unit and detects a slide position by an operation body, the detection unit having an operation surface; and
a transparent touch-sensitive sheet member that covers at least a portion of the detection unit and is operated along the operation surface of the detection unit, and
wherein the touch-sensitive sheet member includes:
a first raw material member having predetermined hardness;
a second raw material member that presents sense of touch, the second raw material member being disposed in the first raw material member; and
the second raw material member has hardness different from the hardness of the first raw material member, and
wherein the first raw material member and the second raw material member are configured to present an operator with a sliding sense of touch including at least one of a repeated concavity feeling and a repeated convexity feeling in response to a sliding operation across the touch-sensitive sheet member.

* * * * *